US012436676B2

(12) United States Patent
Kasatani

(10) Patent No.: US 12,436,676 B2
(45) Date of Patent: Oct. 7, 2025

(54) APPARATUS, EXTERNAL APPARATUS, DISPLAY METHOD, AND RECORDING MEDIUM

(71) Applicant: Kiyoshi Kasatani, Kanagawa (JP)

(72) Inventor: Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/765,000

(22) PCT Filed: Oct. 12, 2020

(86) PCT No.: PCT/JP2020/038524
§ 371 (c)(1),
(2) Date: Mar. 30, 2022

(87) PCT Pub. No.: WO2021/070972
PCT Pub. Date: Apr. 15, 2021

(65) Prior Publication Data

US 2022/0374142 A1 Nov. 24, 2022

(30) Foreign Application Priority Data

Oct. 11, 2019 (JP) ................................ 2019-188188
Oct. 6, 2020 (JP) ................................ 2020-168992

(51) Int. Cl.
*G06F 3/048* (2013.01)
*G06F 3/04842* (2022.01)
*G06F 3/04845* (2022.01)
*G06F 3/04883* (2022.01)
*G06V 30/32* (2022.01)

(52) U.S. Cl.
CPC ...... *G06F 3/04883* (2013.01); *G06F 3/04842* (2013.01); *G06F 3/04845* (2013.01); *G06V 30/347* (2022.01)

(58) Field of Classification Search
CPC ............. G06F 3/04883; G06F 3/04842; G06F 3/0484; G06V 30/347; H04N 1/40012
See application file for complete search history.

(56) References Cited

U.S. PATENT DOCUMENTS 5,612,792 A 3/1997 Ichikawa et al.
5,638,192 A * 6/1997 Yoshida ............ H04N 1/40012 358/530
6,008,913 A 12/1999 Yoshida
(Continued)

FOREIGN PATENT DOCUMENTS

JP S63-278469 11/1988
JP 2017-139678 8/2017

OTHER PUBLICATIONS

International Search Report Issued on Feb. 4, 2021 in PCT/JP2020/038524 filed on Oct. 12, 2020, 10 pages.
(Continued)

*Primary Examiner* — Mahelet Shiberou
(74) *Attorney, Agent, or Firm* — XSENSUS LLP

(57) ABSTRACT

An object is to provide a display apparatus capable of identifying handwritten data drawn by a particular display apparatus. A display apparatus for displaying data, in which indication of handwritten input originated data drawn by the display apparatus is recorded in association with the handwritten data.

27 Claims, 71 Drawing Sheets

(56) References Cited

U.S. PATENT DOCUMENTS

| | | | | |
|---|---|---|---|---|
| 2007/0283248 | A1* | 12/2007 | Yoshida | G09F 9/372 715/273 |
| 2008/0297489 | A1 | 12/2008 | Funo et al. | |
| 2010/0225938 | A1* | 9/2010 | Nara | H04N 1/62 358/1.9 |
| 2012/0218570 | A1 | 8/2012 | Tanaka et al. | |
| 2012/0242603 | A1* | 9/2012 | Engelhardt | G06F 21/32 345/173 |
| 2013/0135191 | A1 | 5/2013 | Shiokawa | |
| 2014/0281866 | A1* | 9/2014 | Kishimoto | G06F 40/166 715/211 |
| 2015/0073779 | A1 | 3/2015 | Ahn et al. | |
| 2015/0123988 | A1* | 5/2015 | Ohmori | G06F 3/03545 345/594 |
| 2015/0154444 | A1 | 6/2015 | Kurita | |
| 2016/0154769 | A1* | 6/2016 | Ikeda | G06F 3/04842 715/268 |
| 2017/0019630 | A1 | 1/2017 | Kanematsu et al. | |
| 2017/0293826 | A1 | 10/2017 | Kemmochi et al. | |
| 2017/0310830 | A1 | 10/2017 | Kemmochi et al. | |
| 2018/0069962 | A1 | 3/2018 | Kato et al. | |
| 2018/0082663 | A1 | 3/2018 | Kemmochi et al. | |
| 2018/0131991 | A1 | 5/2018 | Kanematsu et al. | |
| 2019/0035065 | A1 | 1/2019 | Yazawa et al. | |
| 2019/0087653 | A1 | 3/2019 | Resendez Rodriguez et al. | |
| 2019/0208066 | A1* | 7/2019 | Sakata | H04N 1/00212 |
| 2019/0286894 | A1* | 9/2019 | Maruoka | G06V 30/1423 |

OTHER PUBLICATIONS

Office Action issued Nov. 22, 2023 in Chinese Patent Application No. 202080069958.X, 24 pages.

Office Action issued Apr. 29, 2024 in European Patent Application No. 20 797 212.6, 6 pages.

* cited by examiner

[Fig. 1A]
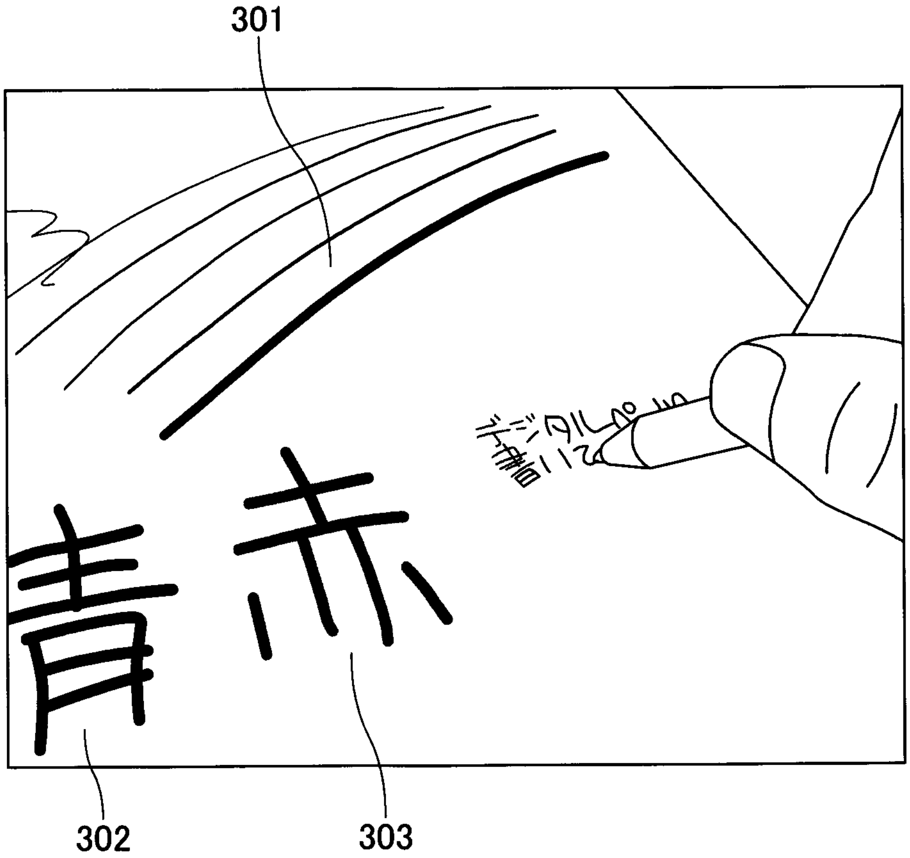

[Fig. 1B]
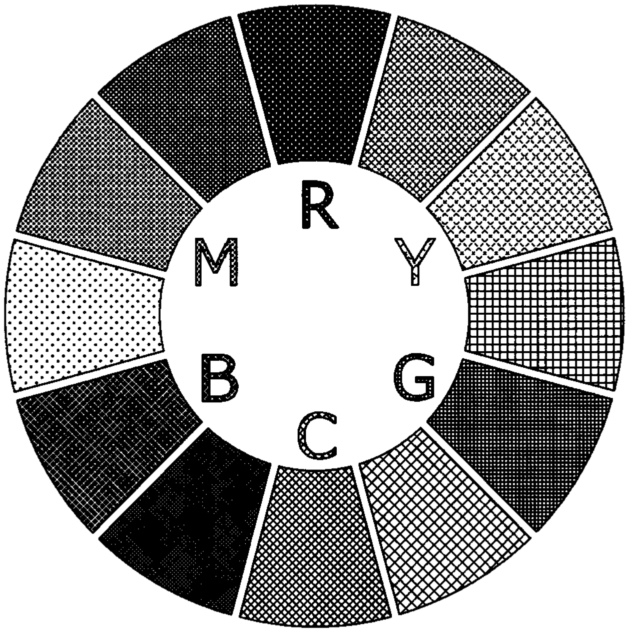
[Fig. 1C]
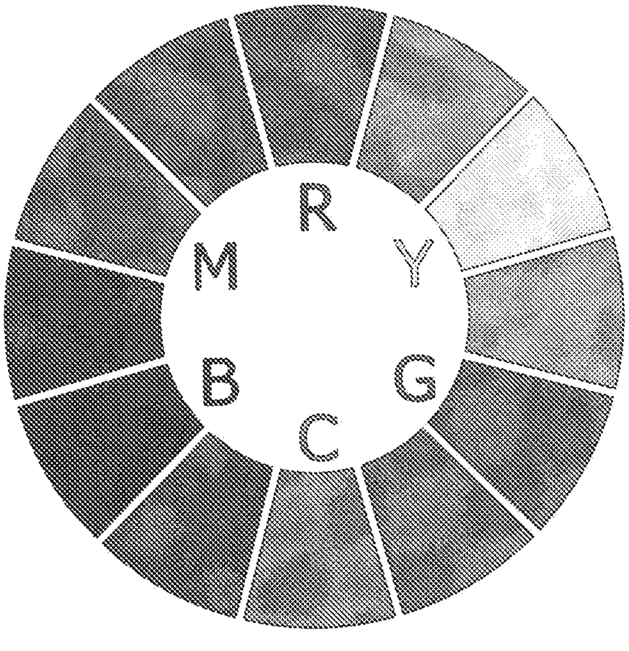

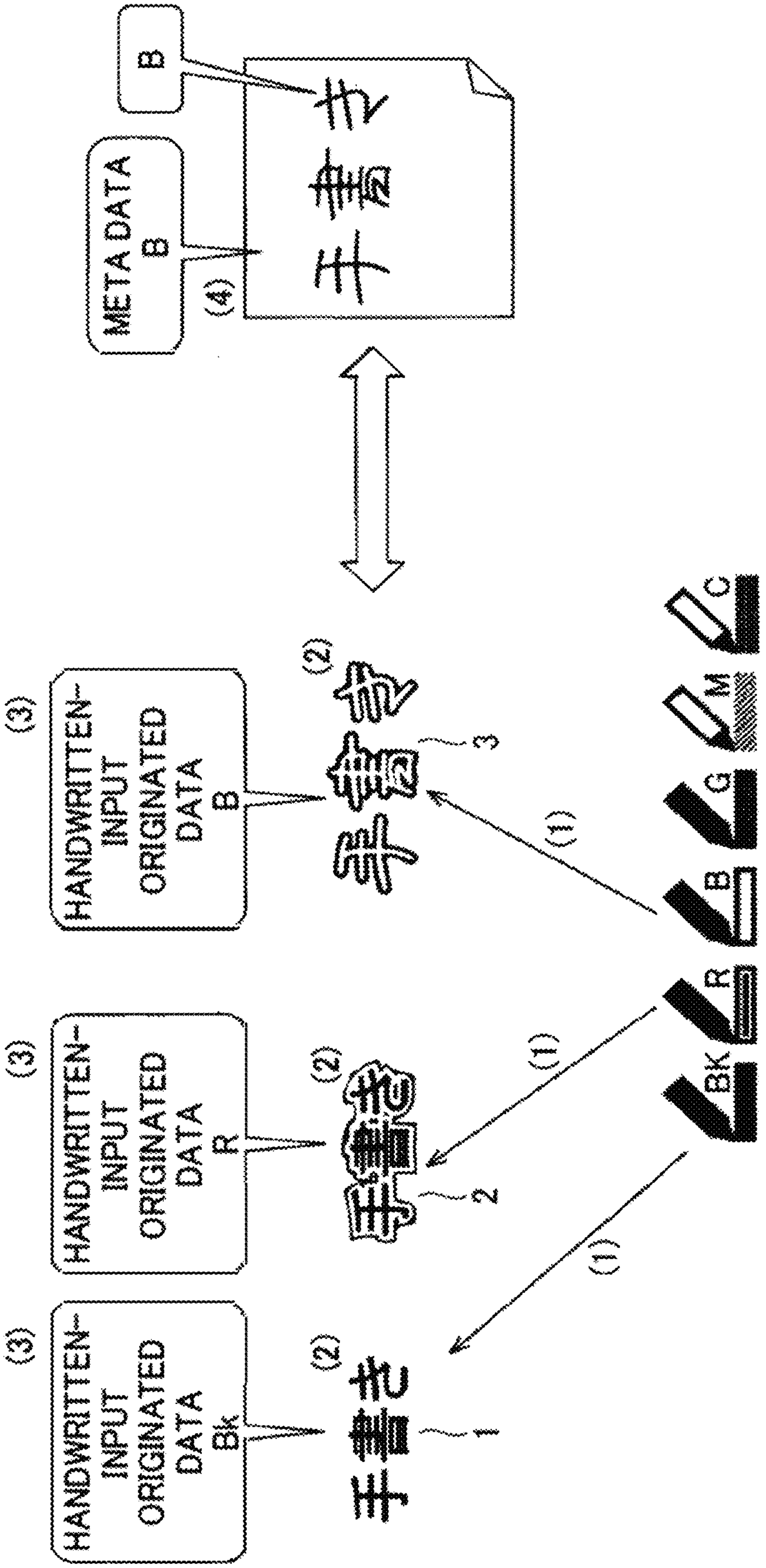
[Fig. 2]

[Fig. 3]
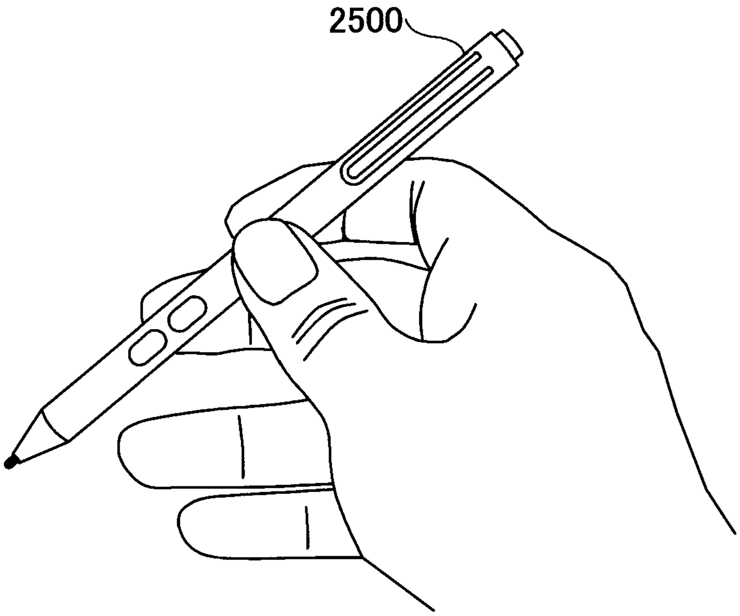

[Fig. 4]
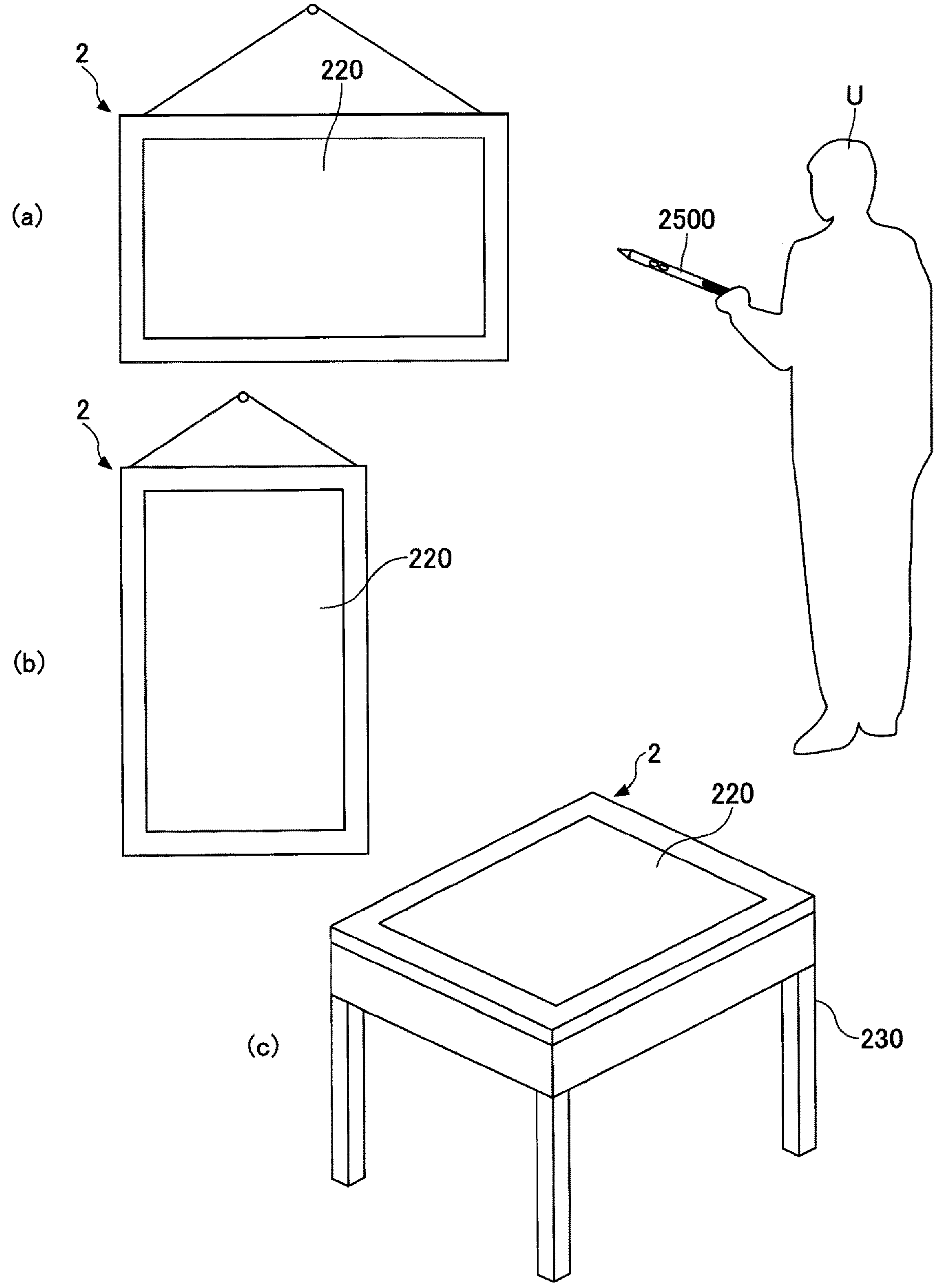

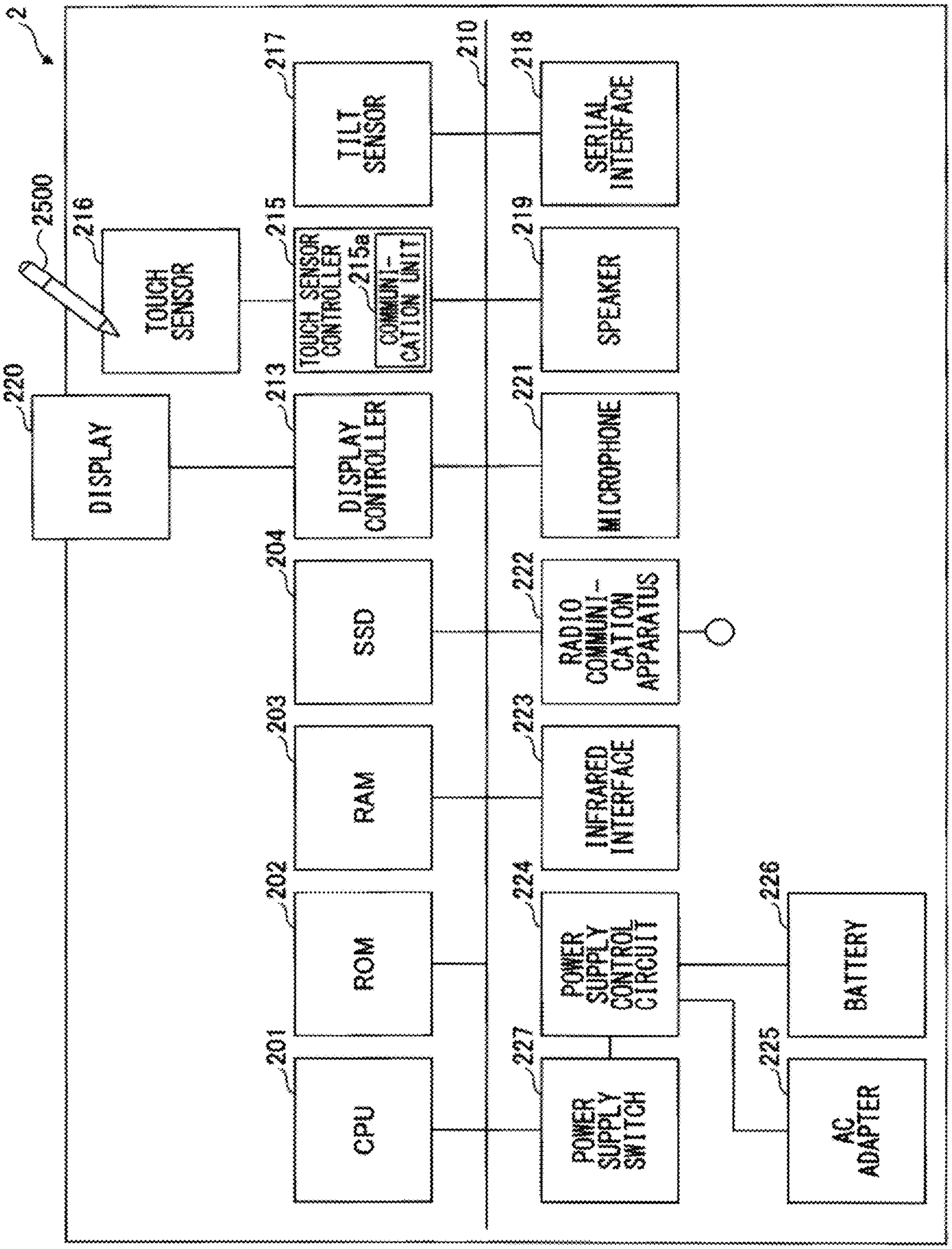
[Fig. 5]

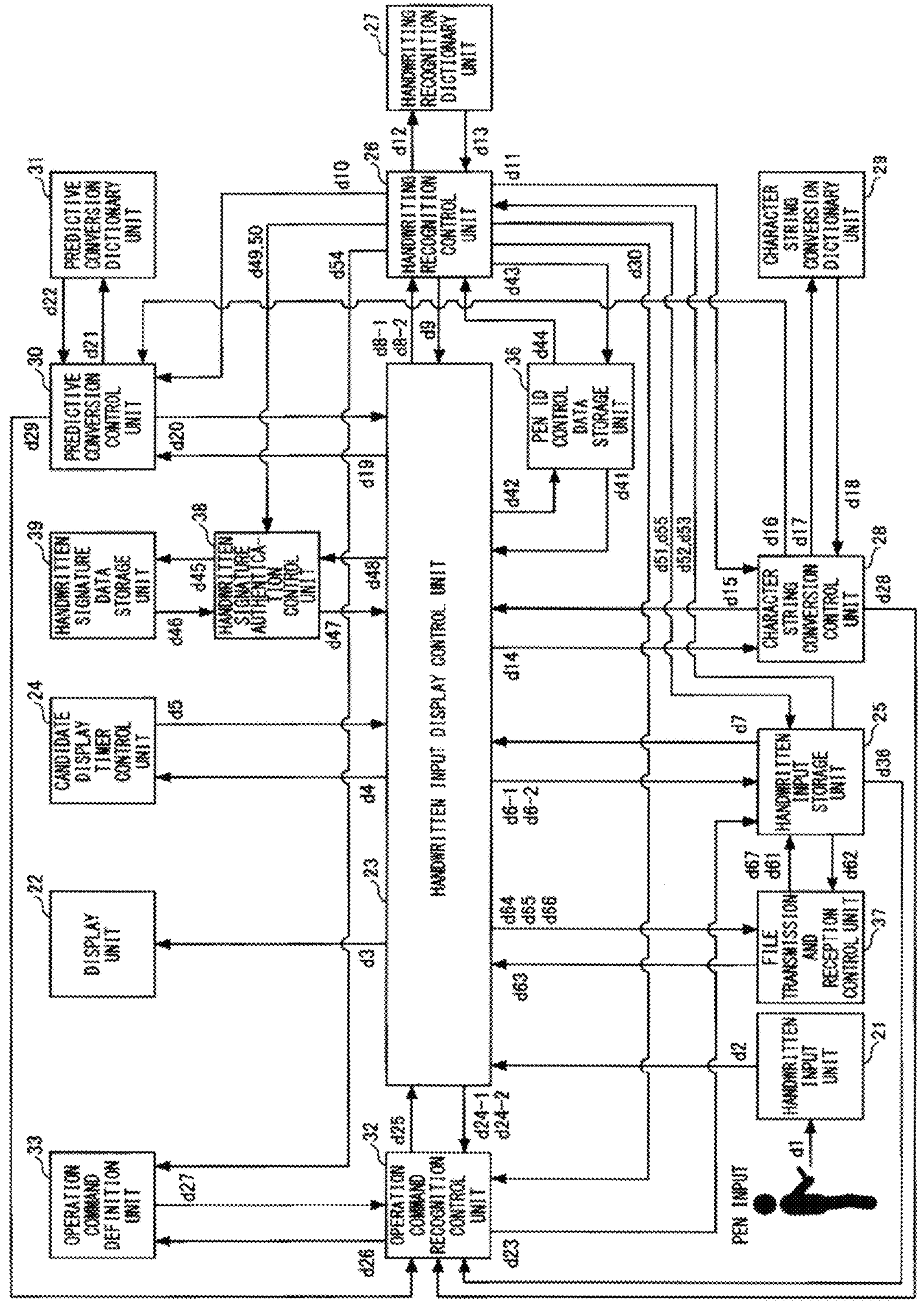
[Fig. 6A]

[Fig. 6B]
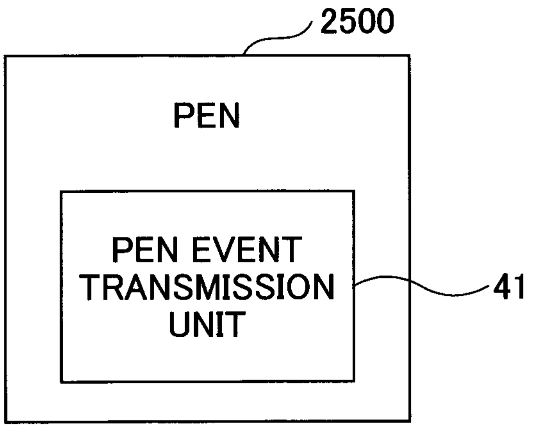

| | | DEFINED CONTROL ITEM EXAMPLE | DEFINED CONTROL DATA EXAMPLE |
|---|---|---|---|
| | 401 | SELECTABLE CANDIDATE DISPLAY TIMER | TimerValue="500 ms" |
| | 402 | SELECTABLE CANDIDATE DELETE TIMER | TimerValue="5000 ms" |
| | 403 | HANDWRITTEN OBJECT NEIGHBORING RECTANGULAR AREA | Horizontal="50%" Vertical="80%" |
| | 404 | ESTIMATED WRITING CHARACTER DIRECTION/CHARACTER SIZE DETERMINATION CONDITION | MinDiff="10 mm" MinTime="1000 ms" DefDir="Horizontal" |
| 405 | 405a | SMALL-SIZE CHARACTER | FontStyle="明朝体" FontSize="25 mm" |
| 405 | 405b | MIDDLE-SIZE CHARACTER | FontStyle="明朝体" FontSize="50 mm" |
| 405 | 405c | LARGE-SIZE CHARACTER | FontStyle="ゴシック体" FontSize="100 mm" |
| | 406 | EXTENDING-OVER LINE DETERMINATION CONDITION | MinLenLongSide="100 mm" MaxLenShortSide="50 mm" MinOverlapRate="80%" |
| | 407 | ENCLOSING LINE DETERMINATION CONDITION | MinOverLapRate="100%" |

HANDWRITING RECOGNITION DICTIONARY DATA EXAMPLE

| | BEFORE CONVERSION | AFTER CONVERSION | PROBABILITY |
|---|---|---|---|
| 604 | ぎ | 議 | 0.55 |
| | ぎ | 技 | 0.45 |
| 605 | ぎし | 技士 | 0.55 |
| | ぎし | 技師 | 0.45 |
| 606 | ぎじ | 疑似 | 0.30 |
| | ぎじ | 議事 | 0.25 |
| | ぎじ | 擬似 | 0.20 |
| | ぎじ | ギジ | 0.15 |

[Fig. 9]

CHARACTER STRING CONVERSION DICTIONARY DATA EXAMPLE

| | BEFORE CONVERSION | AFTER CONVERSION | PROBABILITY |
|---|---|---|---|
| 607 | 議 | 議事録 | 0.95 |
| | 技 | 技量試 | 0.85 |
| 608 | 技士 | 技士会 | 0.65 |
| | 技師 | 技師長 | 0.75 |
| 609 | ぎじ | 議事録 | 0.95 |
| | ぎじ | 技術士 | 0.85 |
| | ぎじ | 技術 | 0.75 |
| 610 | 擬似 | 擬似相関 | 0.55 |
| | 擬似 | 擬似的 | 0.50 |
| | 擬似 | 擬似乱数 | 0.40 |

[Fig. 10]

PREDICTIVE CONVERSION DICTIONARY DATA EXAMPLE

| | BEFORE CONVERSION | AFTER CONVERSION | PROBABILITY |
|---|---|---|---|
| 611 | 議事録 | 議事録の送付先 | 0.65 |
| 611 | 技量試 | 技量試を決裁 | 0.75 |
| 612 | 技士 | 技士会連合会 | 0.95 |
| 612 | 技術 | 技師エンジニア | 0.85 |
| 613 | 技術 | 技術雑誌社 | 0.65 |
| 614 | 擬似 | 擬似体験 | 0.45 |
| 614 | 擬似 | 擬似逆行列 | 0.35 |

| | OPERATION COMMAND DEFINITION DATA EXAMPLE (IN A CASE WHERE THERE IS NO SELECTED OBJECT) |
|---|---|
| 701 | Name="議事録テンプレートを読み込む" String="議事録" String="テンプレート"<br>Command="ReadFile https://%username%:%password%@server.com/template/minutes.pdf" |
| 702 | Name="議事録フォルダーに保存する" String="議事録" String="保存"<br>Command="WriteFile https://%username%:%password%@server.com/minutes/%machinename%_%yyyy-mm-dd%.pdf" |
| 703 | Name="印刷する" String="印刷" String="プリント"<br>Command="PrintFile https://%username%:%password%@server.com/print/%machinename%-"%yyyy-mm-dd%.pdf" |
| 709 | Name="黒ペン" String="黒" String="くろ" String="ペン" Command="ChangePen Black" |
| 710 | Name="赤ペン" String="赤" String="あか" String="ペン" Command="ChangePen Red" |
| 711 | Name="青ペン" String="青" String="あお" String="ペン" Command="ChangePen Blue" |
| 720 | Name="緑ペン" String="緑" String="みどり" String="ペン" Command="ChangePen Green" |
| 721 | Name="マゼンタペン" String="マゼンタ" String="まぜんた" String="ペン" Command="ChangePen Magenta" |
| 722 | Name="シアンペン" String="シアン" String="しあん" String="ペン" Command="ChangePen Cyan" |
| 719 | Name="ファイルを読み込む" String="ファイル" String="読み込む" String="読み込み"<br>Command="ReadFile https://%usename%:%password%@server.com/files/" |
| 712 | Name="テキスト方向を揃える" String="テキスト" String="向き" String="方向"<br>Command="AlignTextDirection" |
| 713 | Name="手書きサイン登録する" String="サイン" String="登録" Command="RegistSignature" |
| 714 | Name="手書きサインインする" String=%signature% Command="Signin" |
| 715 | Name="手書きサインアウトする" String="サイン" String="アウト" Command="Signout" |
| 716 | Name="設定変更する" String="設定" String="変更" Command="ConfigSettings" |

[Fig. 11A]

| | |
|---|---|
| | SYSTEM DEFINITION DATA EXAMPLE |
| 704 | username="taro.tokkyo" |
| 705 | password="x2PDHTyS" |
| 706 | machinename="My-Machine" |

[Fig. 11B]

[Fig. 12]
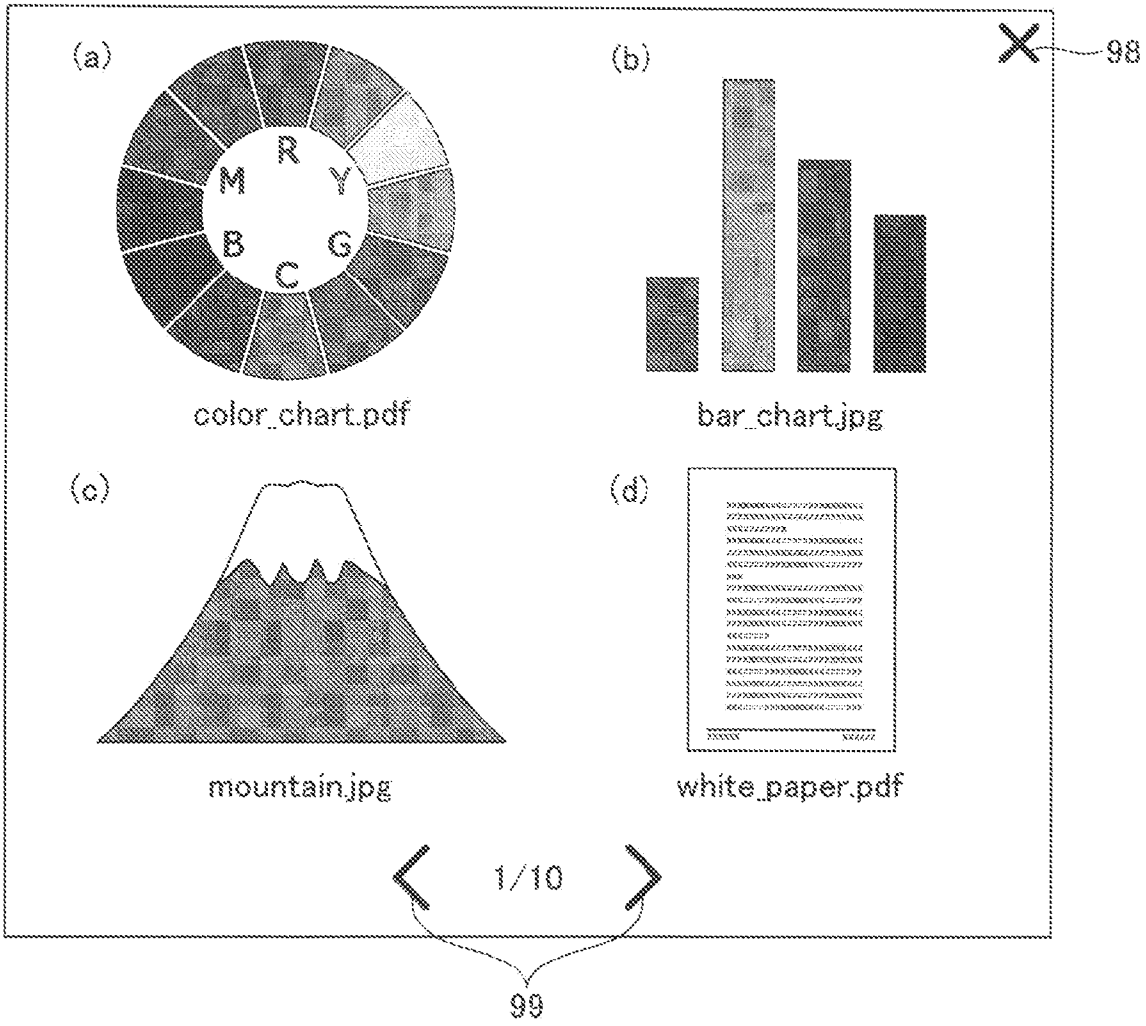

| | |
|---|---|
| | OPERATION COMMAND DEFINITION DATA EXAMPLE (IN A CASE WHERE THERE IS SELECTED OBJECT) |
| 707 | Name="消去" Group="Edit" Command="Delete" |
| | Name="移動" Group="Edit" Command="Move" |
| | Name="回転" Group="Edit" Command="Rotate" |
| | Name="選択" Group="Edit" Command="Select" |
| 708 | Name="太く" Group="Decorate" Command="Thick" |
| | Name="細く" Group="Decorate" Command="Thin" |
| | Name="大きく" Group="Decorate" Command="Large" |
| | Name="小さく" Group="Decorate" Command="Small" |
| | Name="下線" Group="Decorate" Command="Underline" |

[Fig. 13]

| | |
|---|---|
| | USER DEFINED DATA EXAMPLE |
| 717 | AccountId="1" AccountUsername="鈴木" AccountPassword="" SignatureId="1" username="ichiro.suzuki" password="DG9wEvda" machinename="whiteboard" |
| 718 | Name="名前" Data=%AccountName% |
| | Name="パスワード" Data=%AccountPassword% |
| | Name="フォルダーユーザー名" Data=%username% |
| | Name="フォルダーパスワード" Data=%password% |
| | Name="フォルダーファイル名" Data=%machinename% |

[Fig. 14]

| HANDWRITTEN SIGNATURE DATA EXAMPLE |
| --- |
| SignatureId="1" Data="xx,xx,xx,xx,...,xx" |
| SignatureId="2" Data="xx,xx,xx,xx,...,xx" |

[Fig. 15]

| | HANDWRITTEN INPUT RETAINED DATA EXAMPLE |
|---|---|
| 801 | DataId="1" Type="Stroke" PenId="1" ColorId="Black" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 802 | DataId="2" Type="Stroke" PenId="1" ColorId="Red" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" Point="x1,y1,x2,y2,x3,y3,...,yn,yn" Pressure="p1,p2,p3,...pn" |
| 803 | DataId="3" Type="Group" PenId="2" StartPoint="x1,y1" StartTime="yyyy-mm-ddThh:mm:ss.sss+09:00" EndPoint="xn,yn" EndTime="yyyy-mm-ddThh:mm:ss.sss+09:00" DataId="1" DataId="2" |
| 804 | DataId="4" Type="Text" PenId="2" ColorId="Red" Angle="180 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="POP" FontSize="50.0 pt" Text="What you dream" |
| 805 | DataId="5" Type="Text" Penid="3" Colorid="Blue" Angle="270 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="ゴシック体" FontSize="10.0 pt" Text="I want to be an innovator" |
| 806 | DataId="6" Type="Text" PenId="1" ColodId="#e6001200" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" FontName="Meiyo" FontSize="50.0 pt" Text="Original Text" |
| 807 | DataId="7" Type="Image" PenId="1" FileId="xxxxxxxx-xxxx-xxxx-xxxx-xxxxxxxxxxxx" FileName="image.jpg" Angle="0 dig" StartPoint="x1,y1" StartTime="yyyy-mm-ddThh:mm:ss.sss+09:00" EndPoint="xn,yn" EndTime="yyyy-mm-ddThh:mm:ss.sss+09:00" |

[Fig. 16]

| | CONTROL DATA EXAMPLE |
|---|---|
| 901 | PenId="1" ColorId="Black" Angle="0 dig" AccountId="1" |
| 902 | PenId="2" ColorId="Red" Angle="90 dig" |
| 903 | PenId="3" ColorId="Blue" Angle="180 dig" |
| 904 | PenId="4" ColorId="Green" Angle="270 dig" |

[Fig. 17A]

[Fig. 17B]
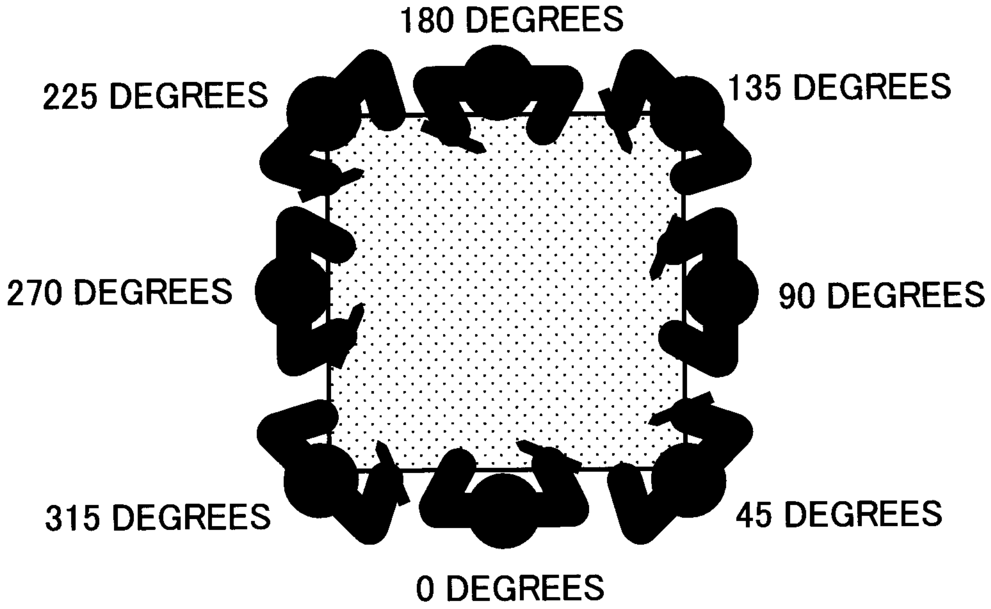

| | COLOR DEFINITION DATA EXAMPLE |
|---|---|
| 1001 | ColorId="Black" Pattern="SolidBlack 5 px" Edged="None" Color="#00000000" Width="5 px" |
| 1002 | ColorId="Red" Pattern="SolidBlack 3 px" Edged="Black 1 px, White 2 px" Color="#e6001200" Width="5 px" |
| 1003 | ColodId="Blue" Pattern="SolidWhite 4 px" Edged="Black 1 px" Color="#1d208800" Width="5 px" |
| 1004 | ColorId="Green" Pattern="BlackDotPattern 4 px" Edged="Black 1 px" Color="#00994400" Width="5 px" |
| 1005 | ColorId="Magenta" Pattern="AlphaBlackUpDiagonalPattern 5 px" Edged="None" Color="#e4007f99" Width="5 px" |
| 1006 | ColorId="Cyan" Pattern="AlphaBlackHorizontalPattern 5 px" Edged="None" Color="#00a0e999" Width="5 px" |

[Fig. 18]

[Fig. 19A]
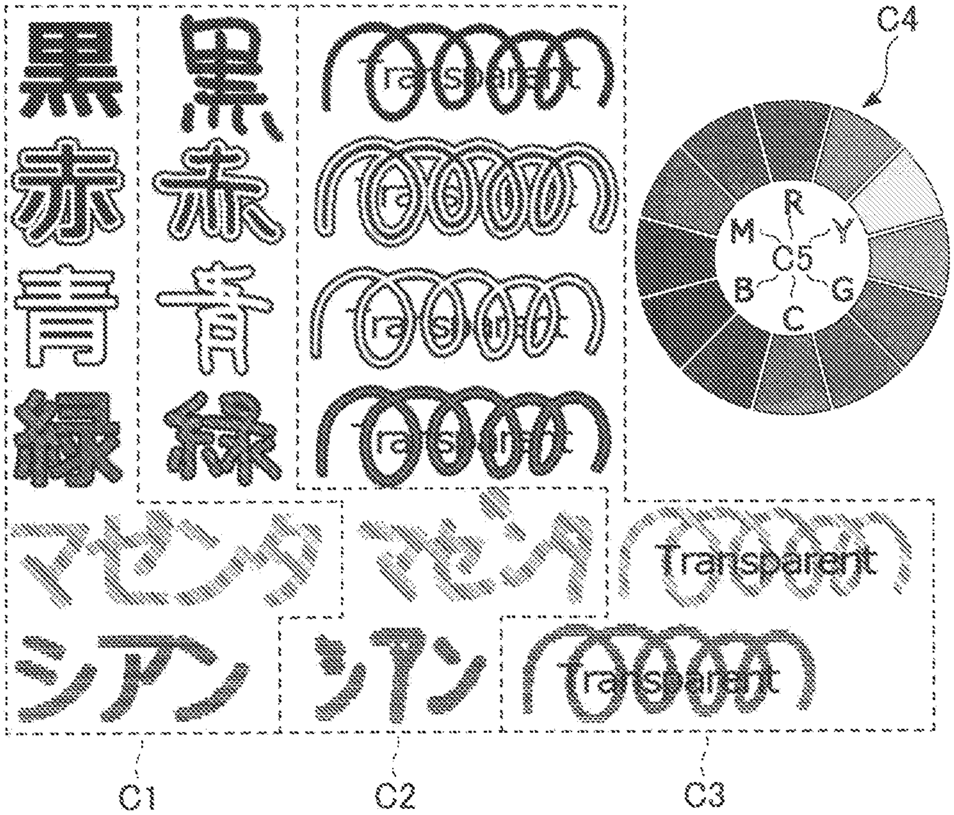
BLACK AND WHITE EMPHASIZED REPRESENTATION EXAMPLE

[Fig. 19B]
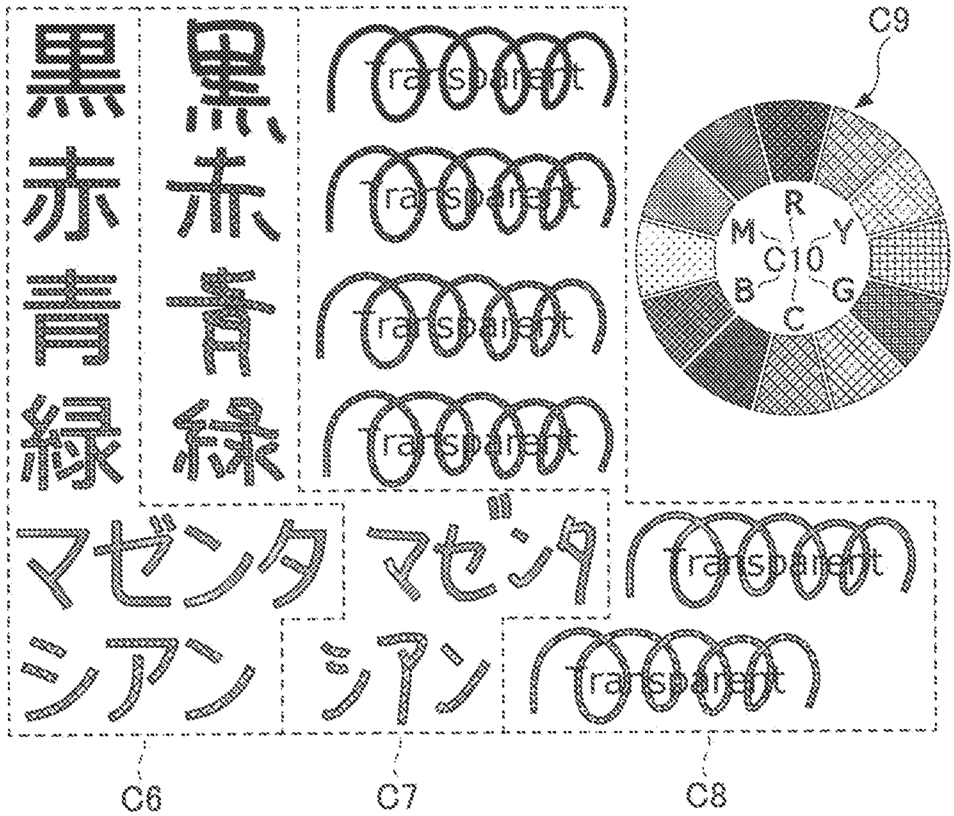
COLOR CONVERSION METHOD EXAMPLE

| | PEN SELECTION BUTTON DEFINITION DATA EXAMPLE |
|---|---|
| 1101 | PenButtonId="1" Icon="pen_black.png" ColorId="Black" FontName="明朝体" |
| 1102 | PenButtonId="2" Icon="pen_red.png" ColorId="Red" FontName="ポップ体" |
| 1103 | PenButtonId="3" Icon="pen_blue.png" ColorId="Blue" FontName="ゴシック体" |
| 1104 | PenButtonId="4" Icon="pen_green.png" ColorId="Green" FontName="隷書体" |
| 1105 | PenButtonId="5" Icon="pen_magenta.png" ColorId="Magenta" FontName="楷書体" |
| 1106 | PenButtonId="6" Icon="pen_cyan.png" ColorId="Cyan" FontName="行書体" |

[Fig. 20]

[Fig. 21A]
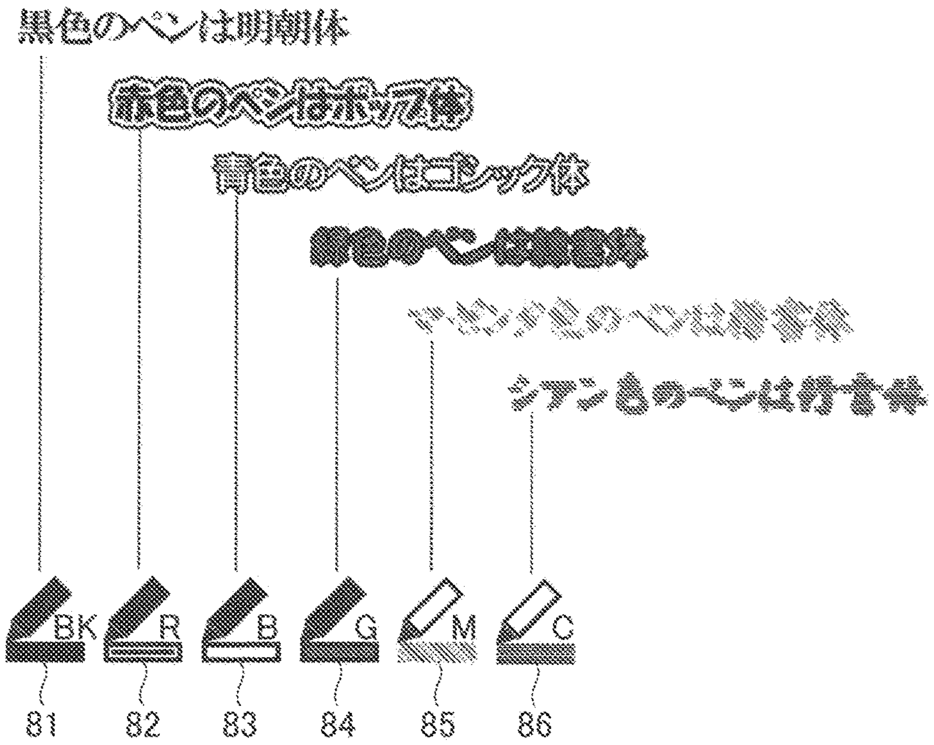
[Fig. 21B]
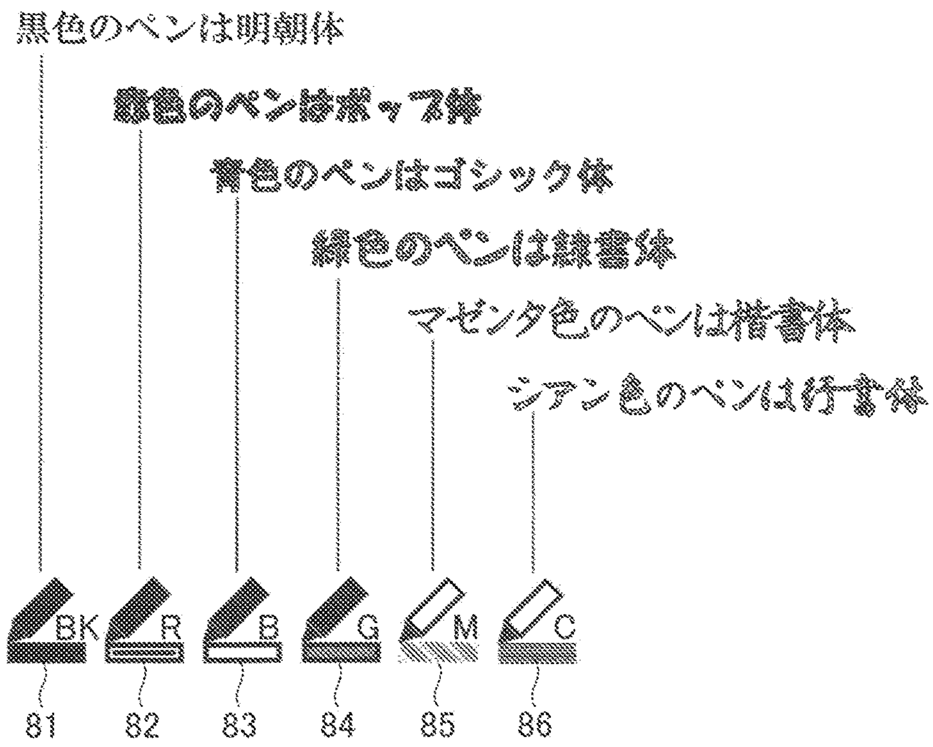

[Fig. 22]
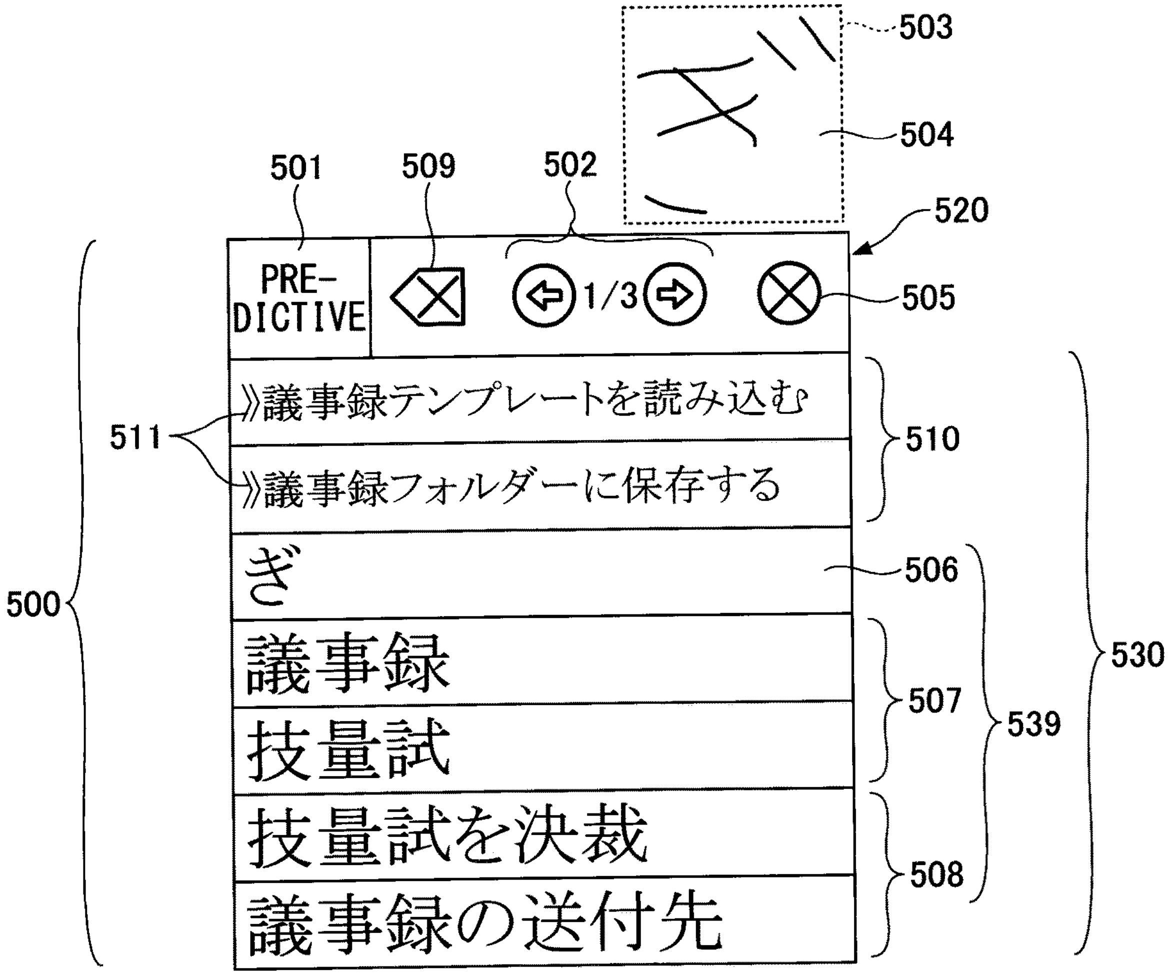

[Fig. 23A]
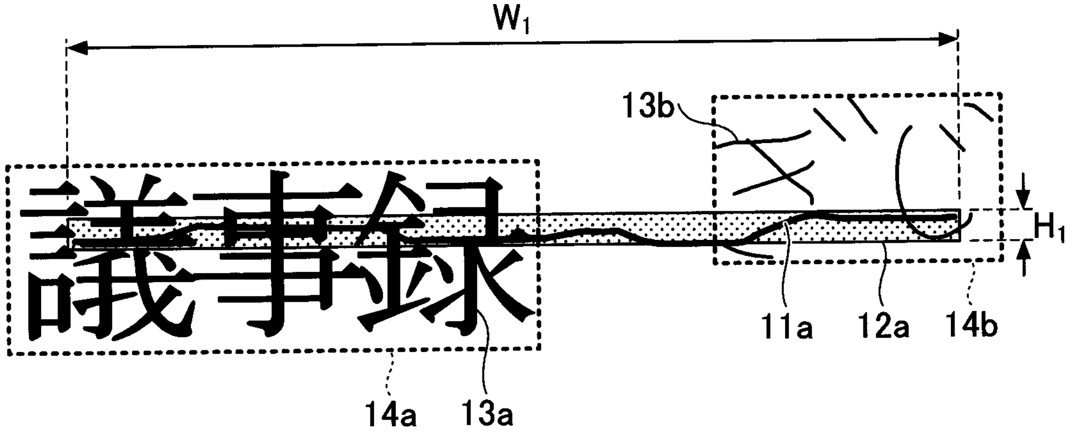
[Fig. 23B]
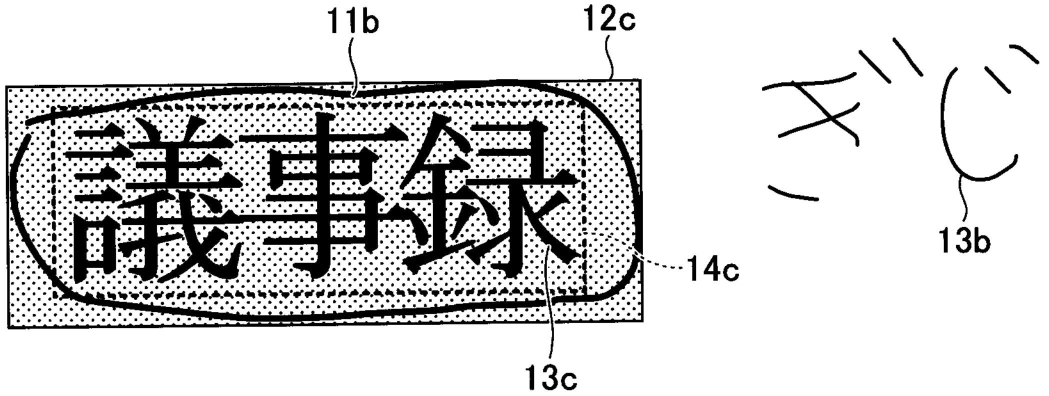

[Fig. 23C]
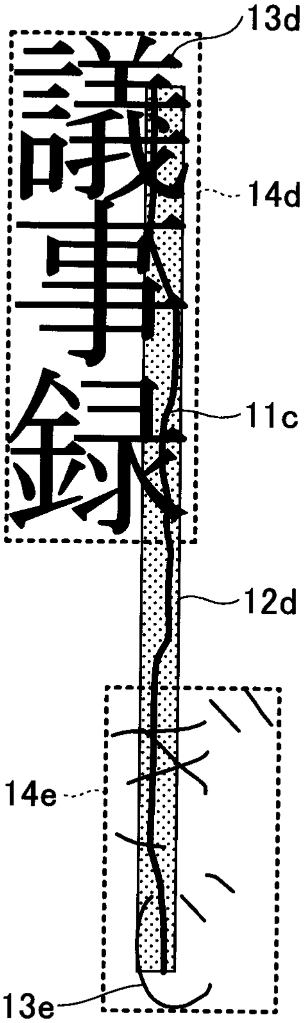

[Fig. 23D]
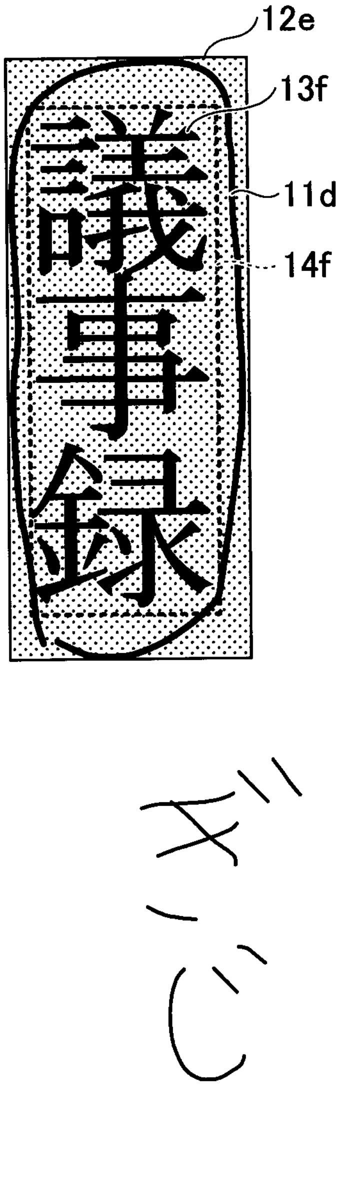

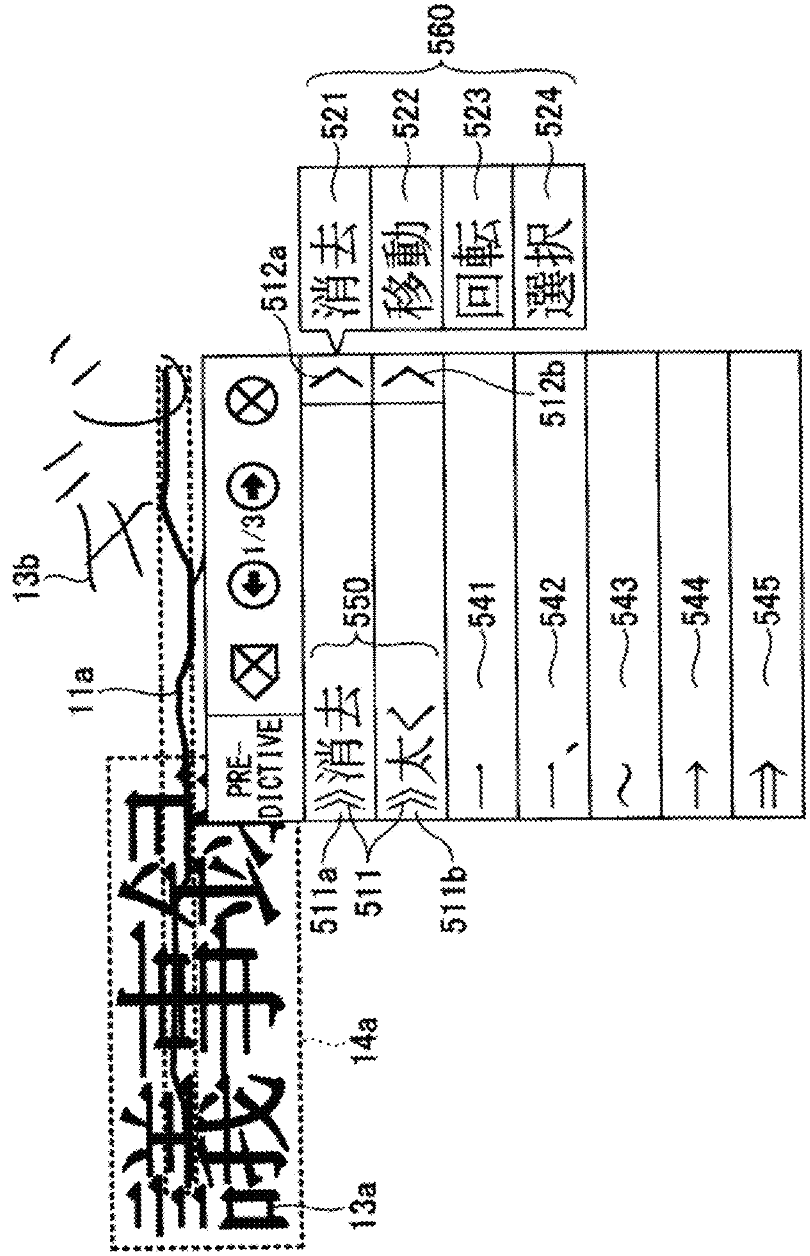
[Fig. 24A]

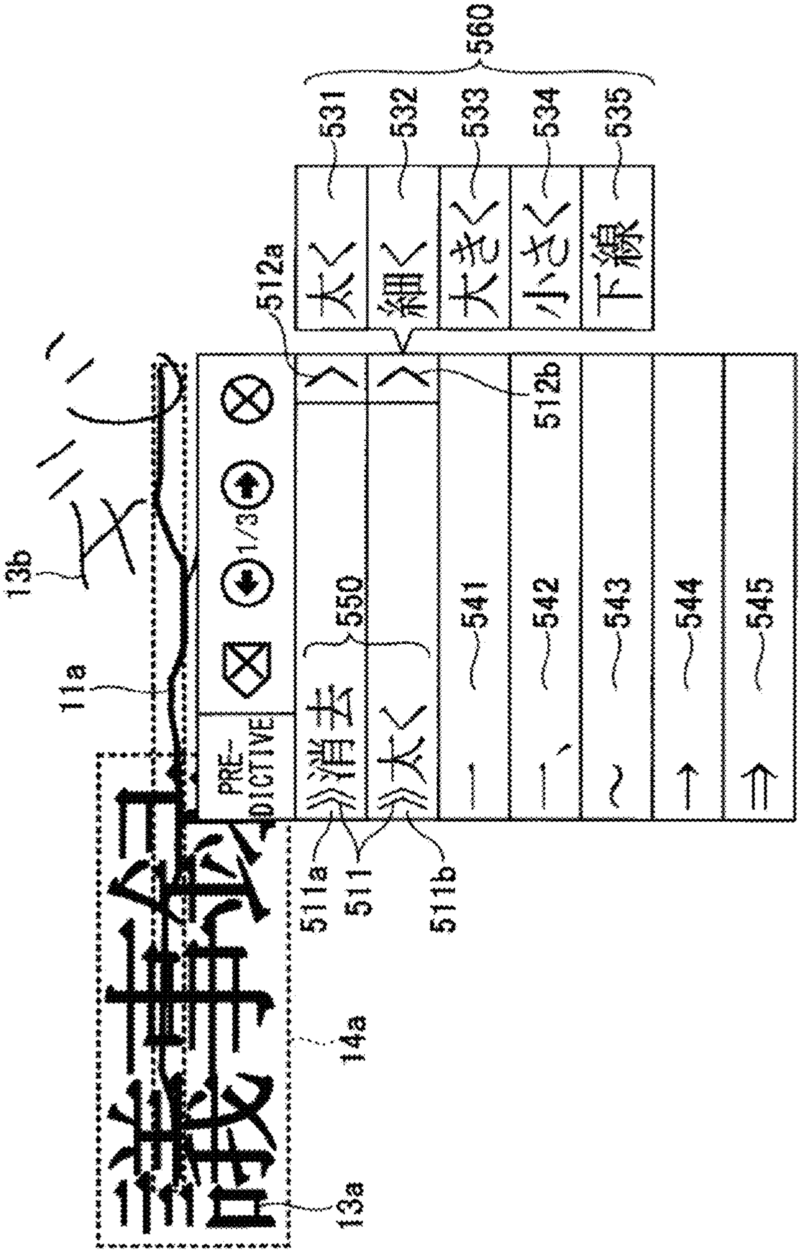
[Fig. 24B]

[Fig. 25A]
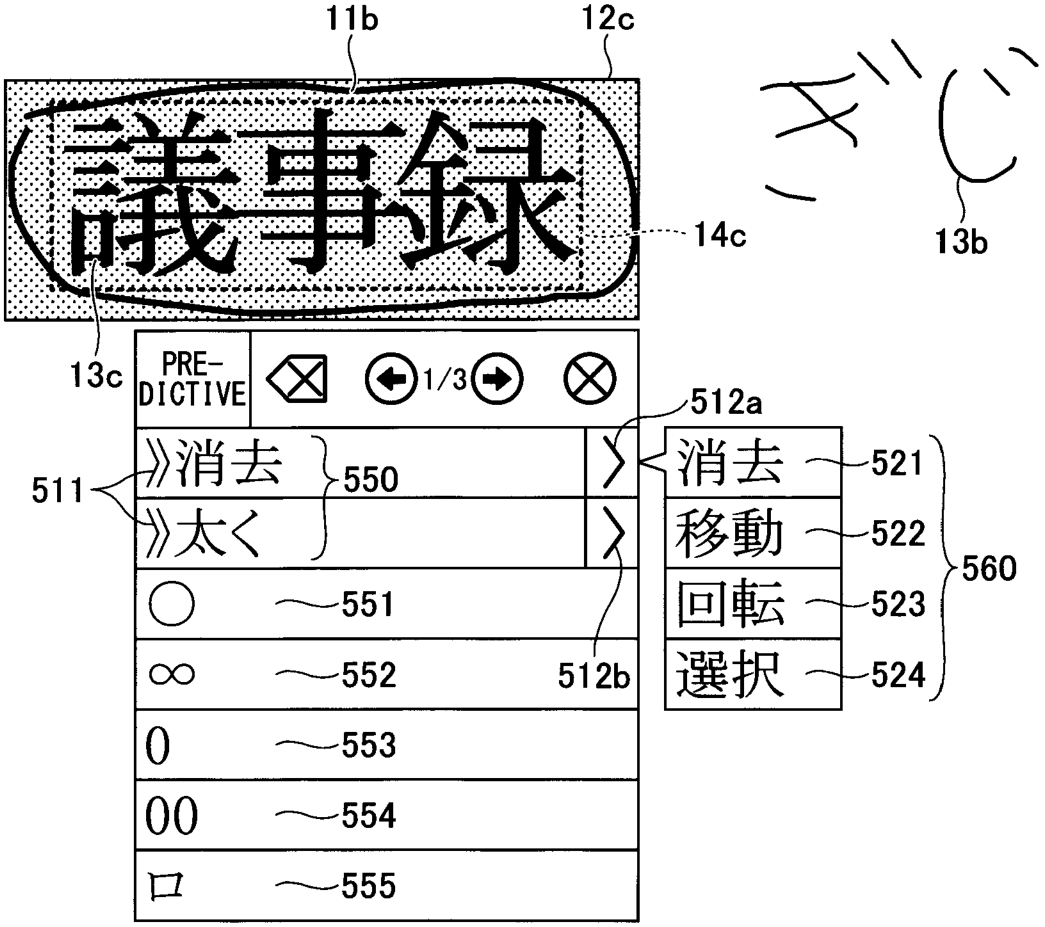

[Fig. 25B]
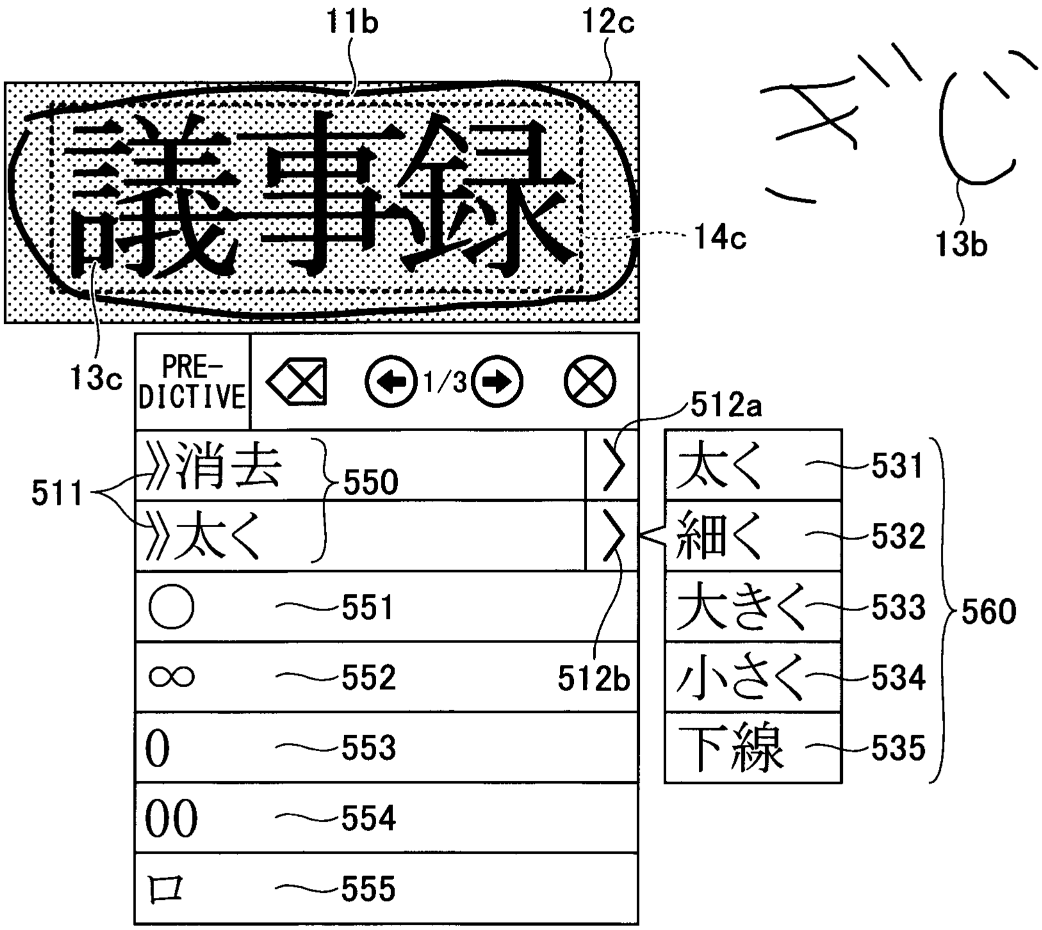

[Fig. 26A]
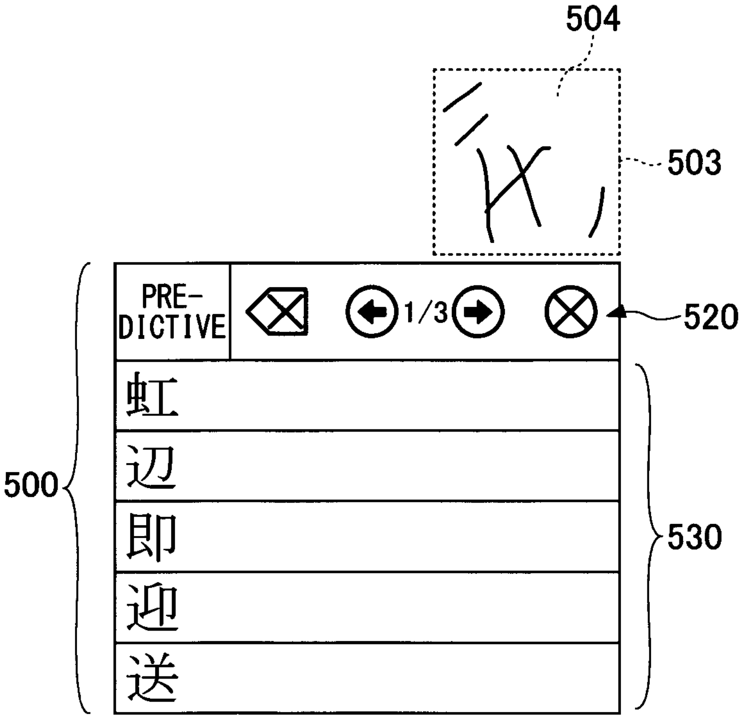

[Fig. 26B]
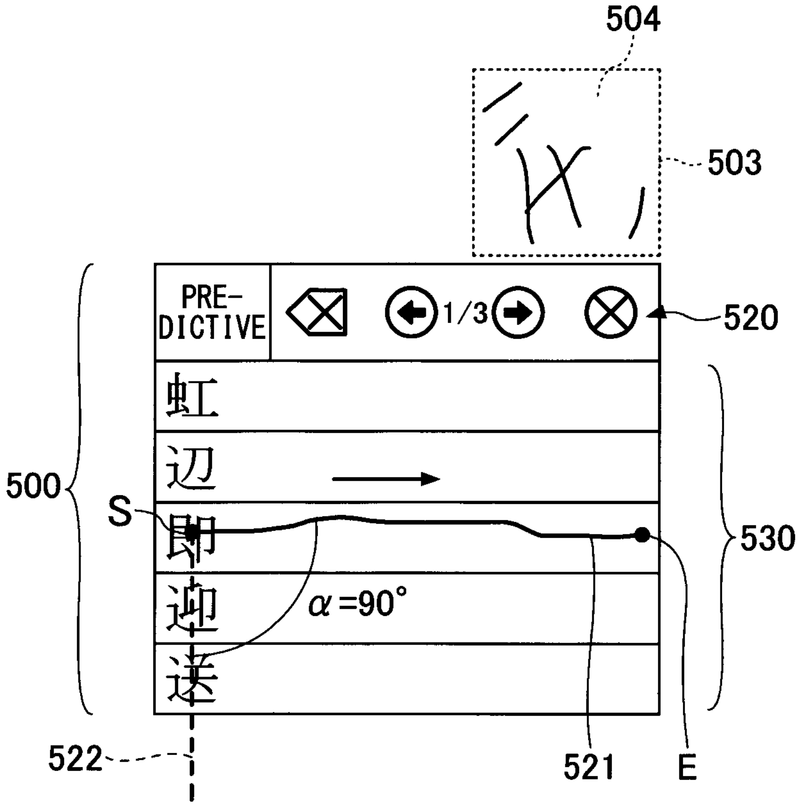

[Fig. 26C]
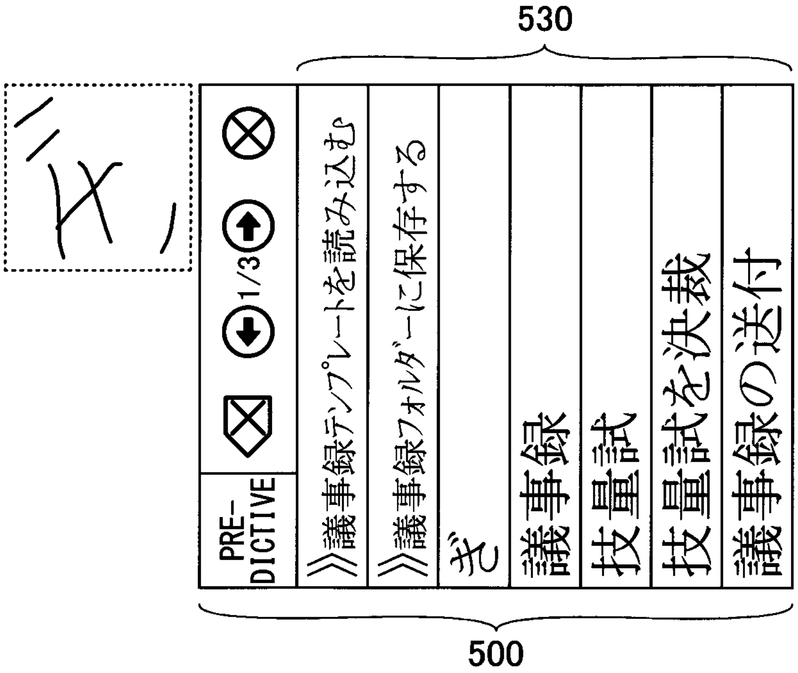
[Fig. 27A]
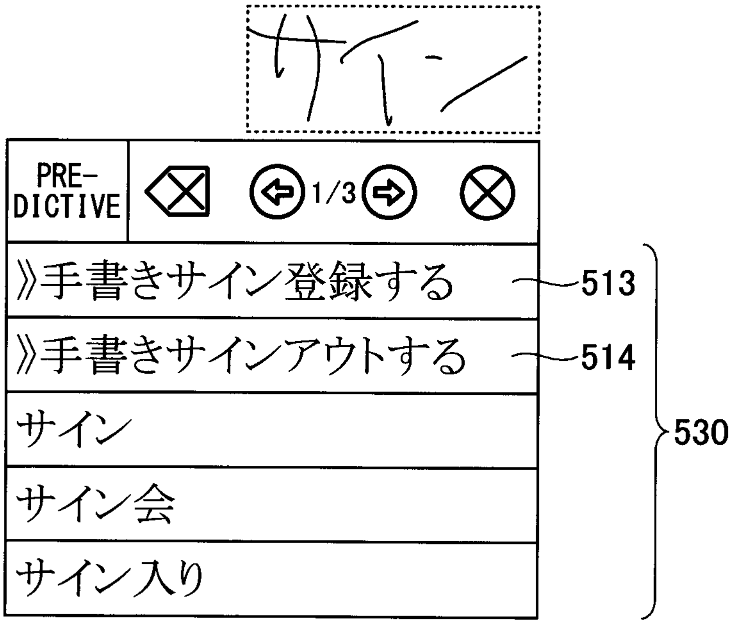

[Fig. 27B]
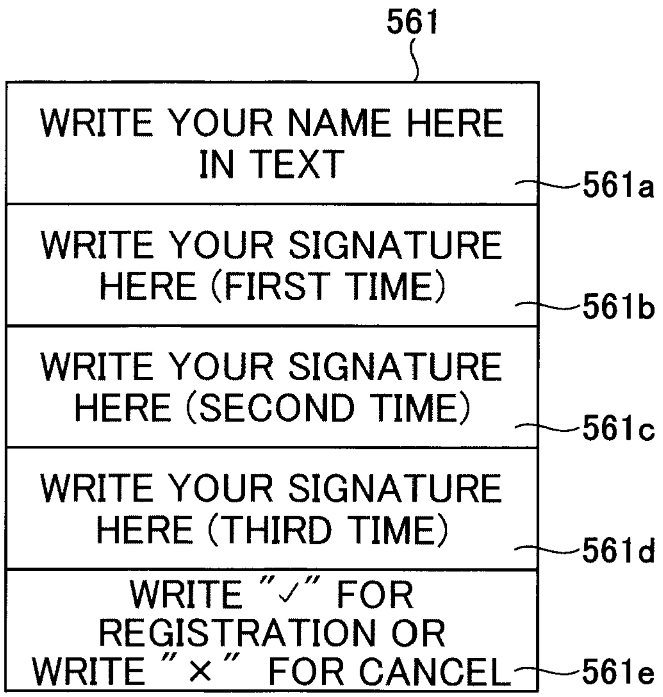
[Fig. 27C]
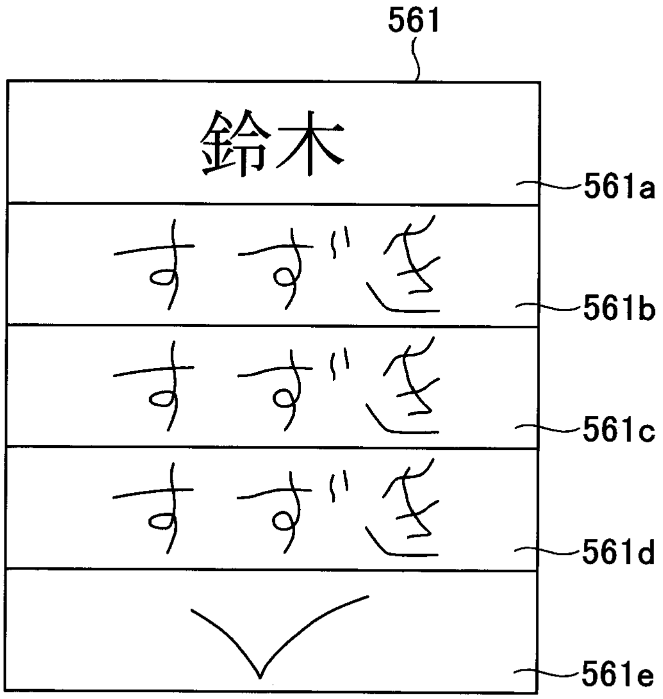

[Fig. 28]
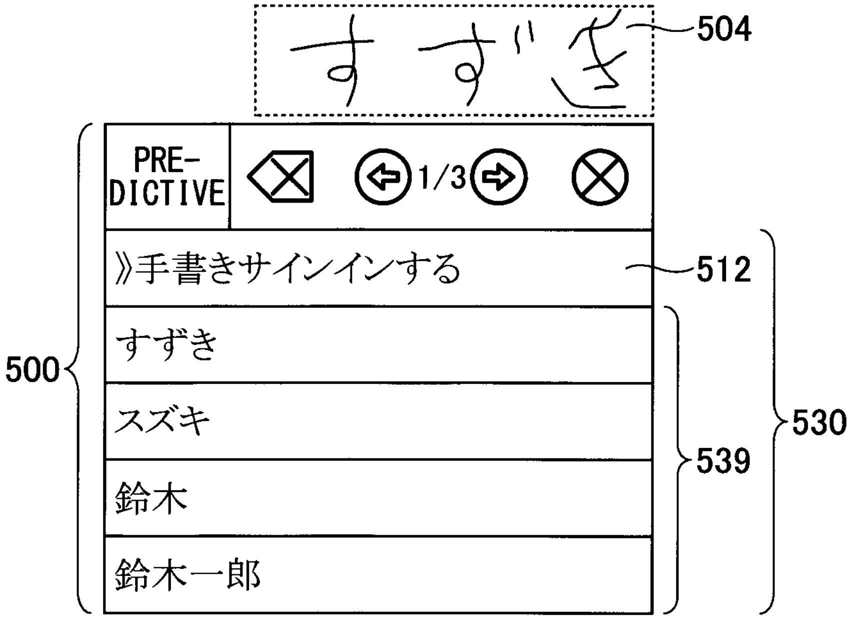
[Fig. 29A]
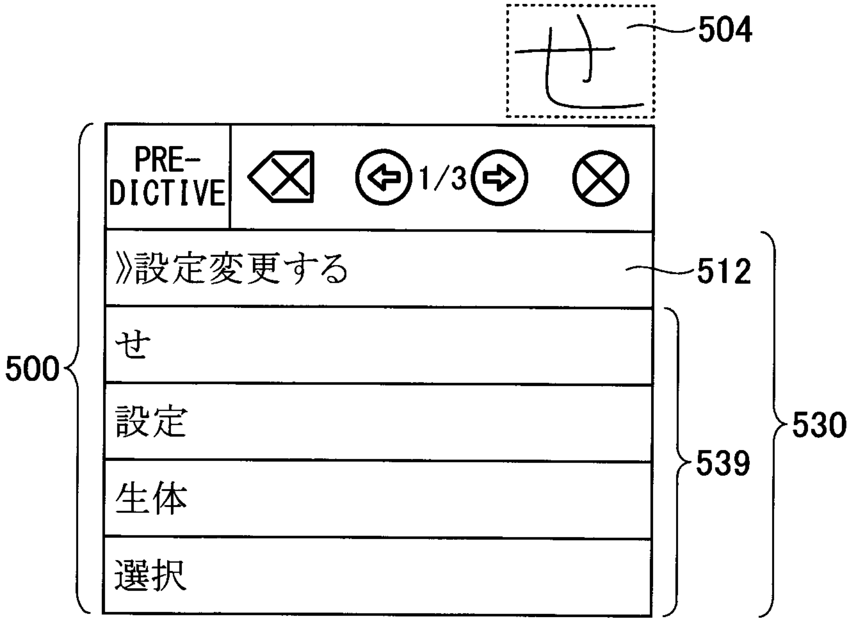

| | | |
|---|---|---|
| 名前 | 鈴木 | 562a |
| パスワード | | 562b |
| フォルダーユーザー名 | ichiro.suzuki | 562c |
| フォルダーパスワード | ******** | 562d |
| フォルダーファイル名 | whiteboard | 562e |
| REGISTRATION OR CANCEL | WRITE "✓" FOR REGISTRATION OR WRITE "×" FOR CANCEL | 562f |

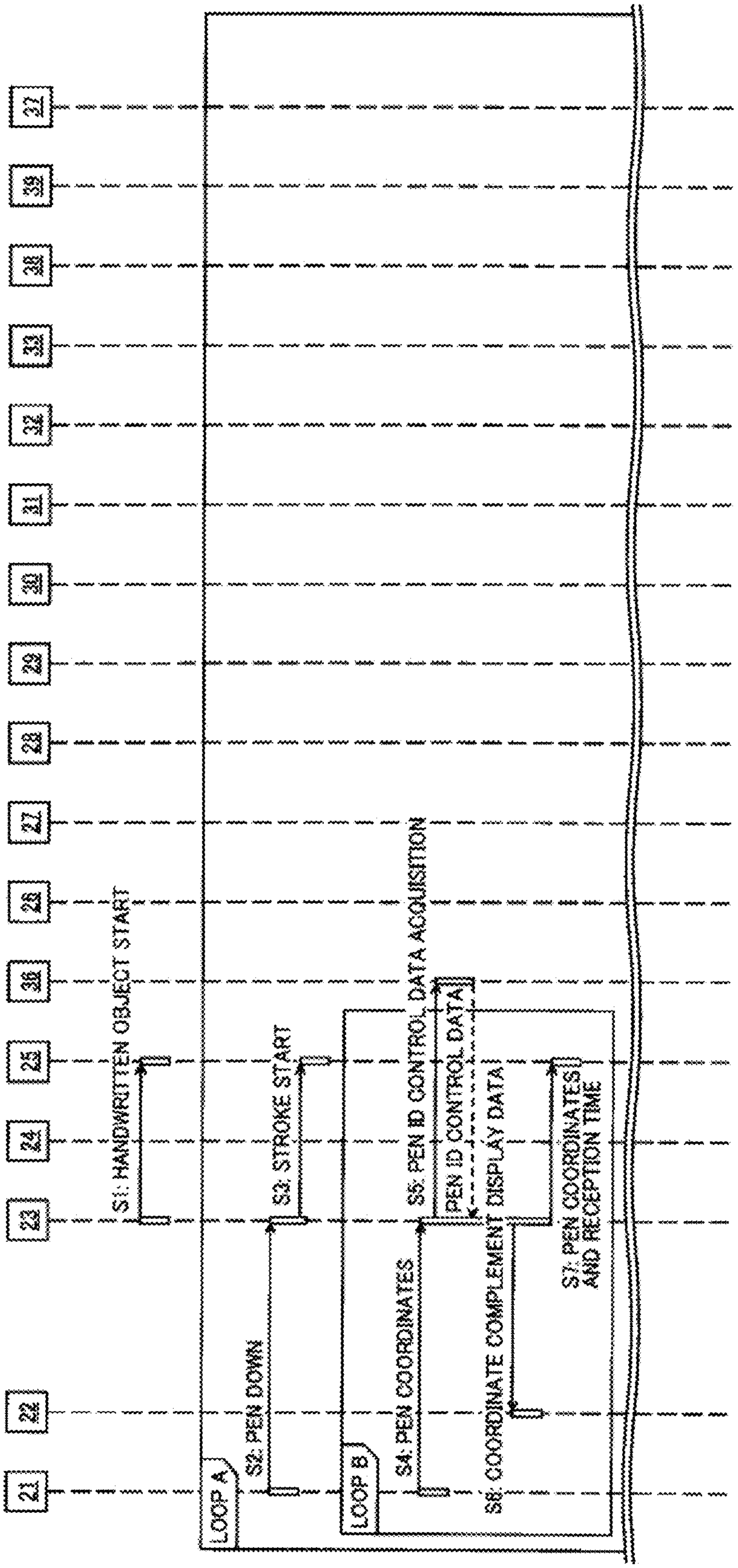
[Fig. 30]

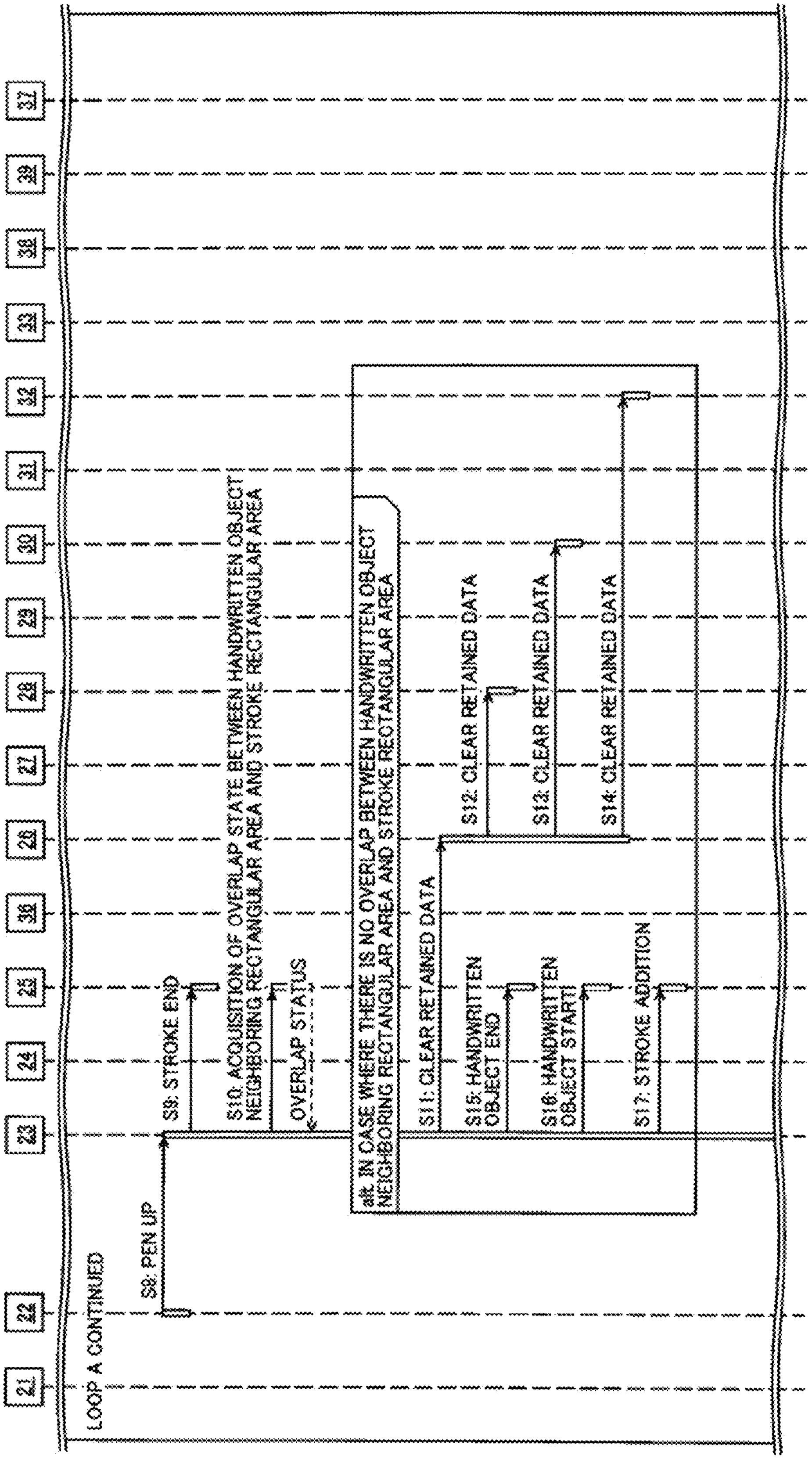
[Fig. 31]

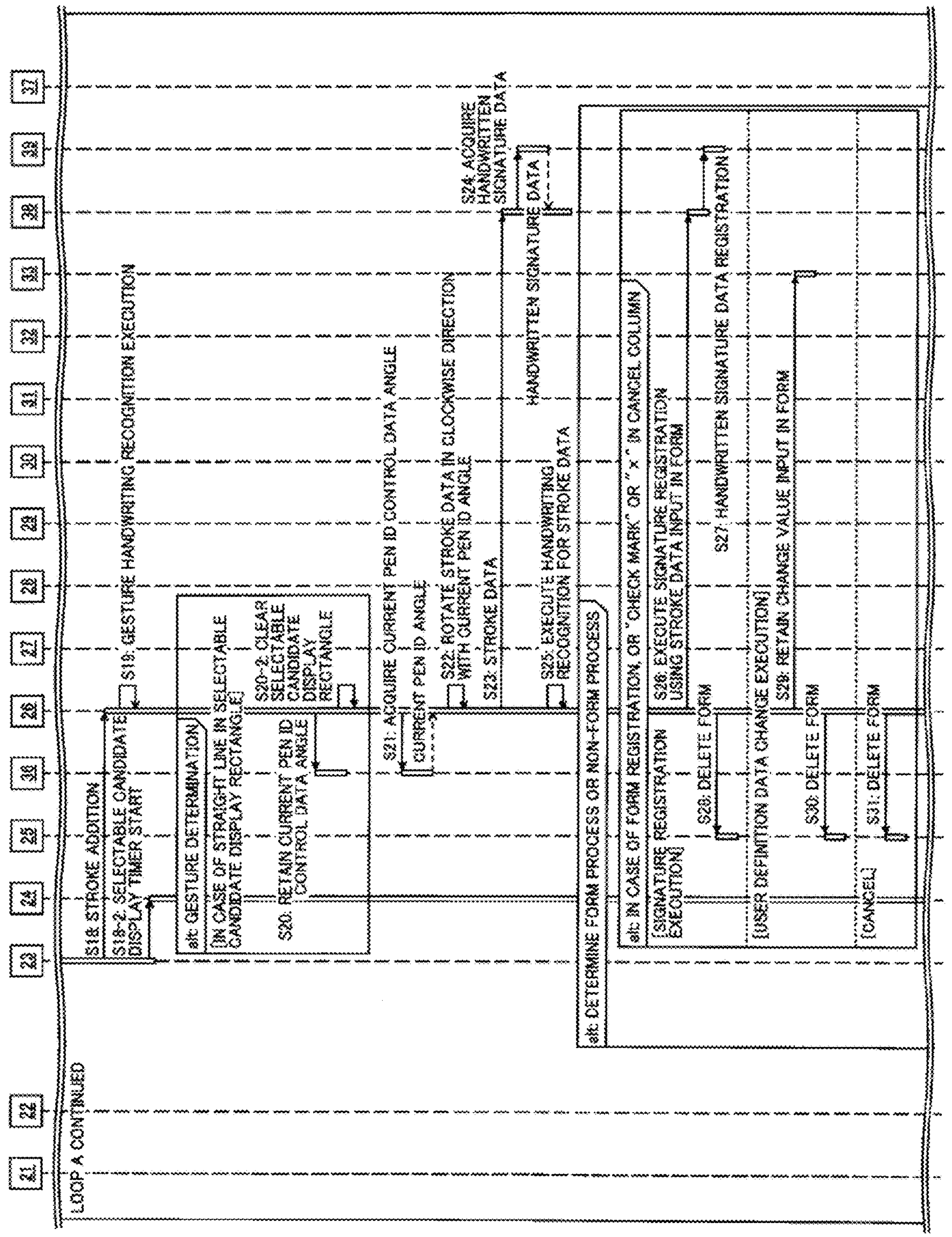
[Fig. 32]

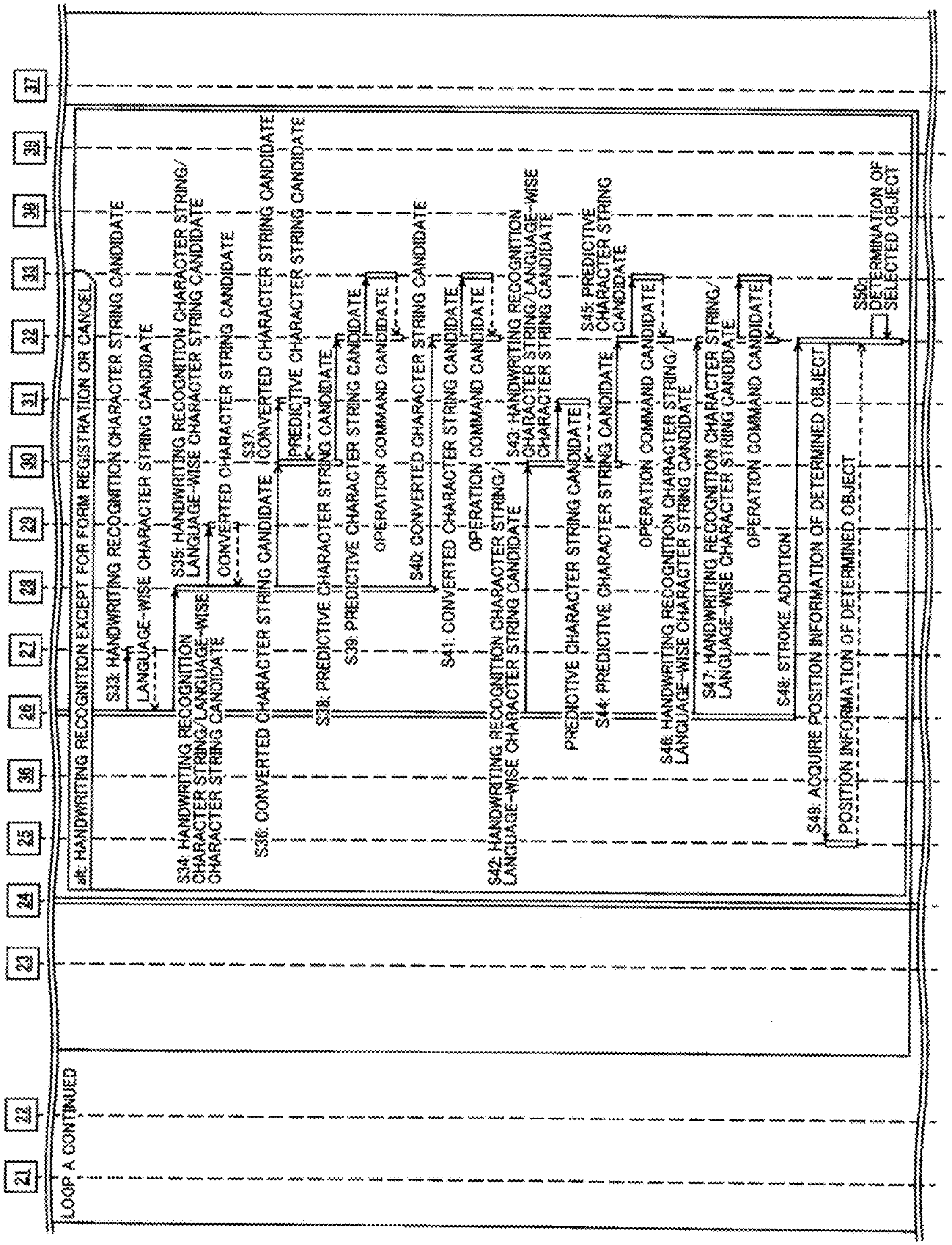
[Fig. 33]

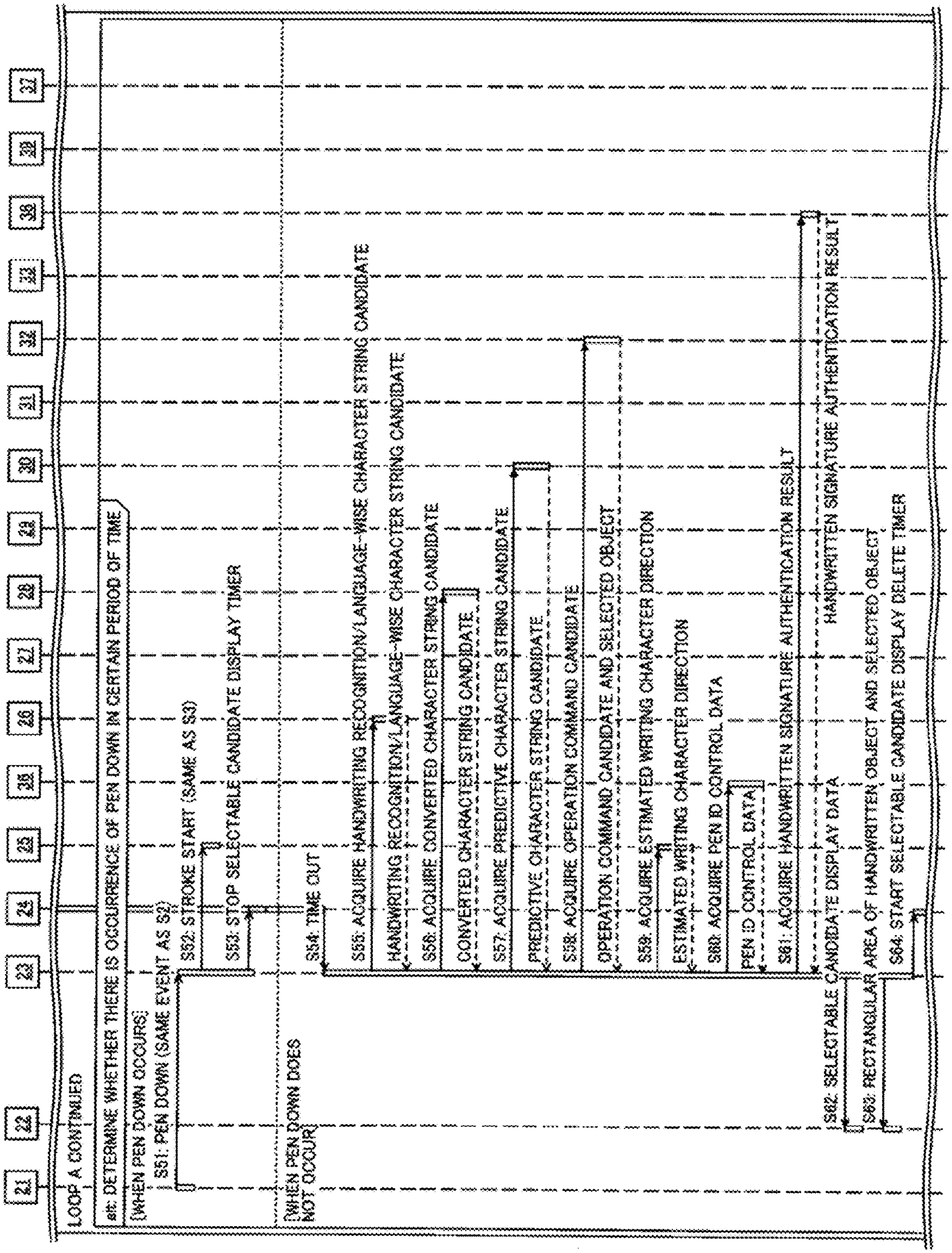
[Fig. 34]

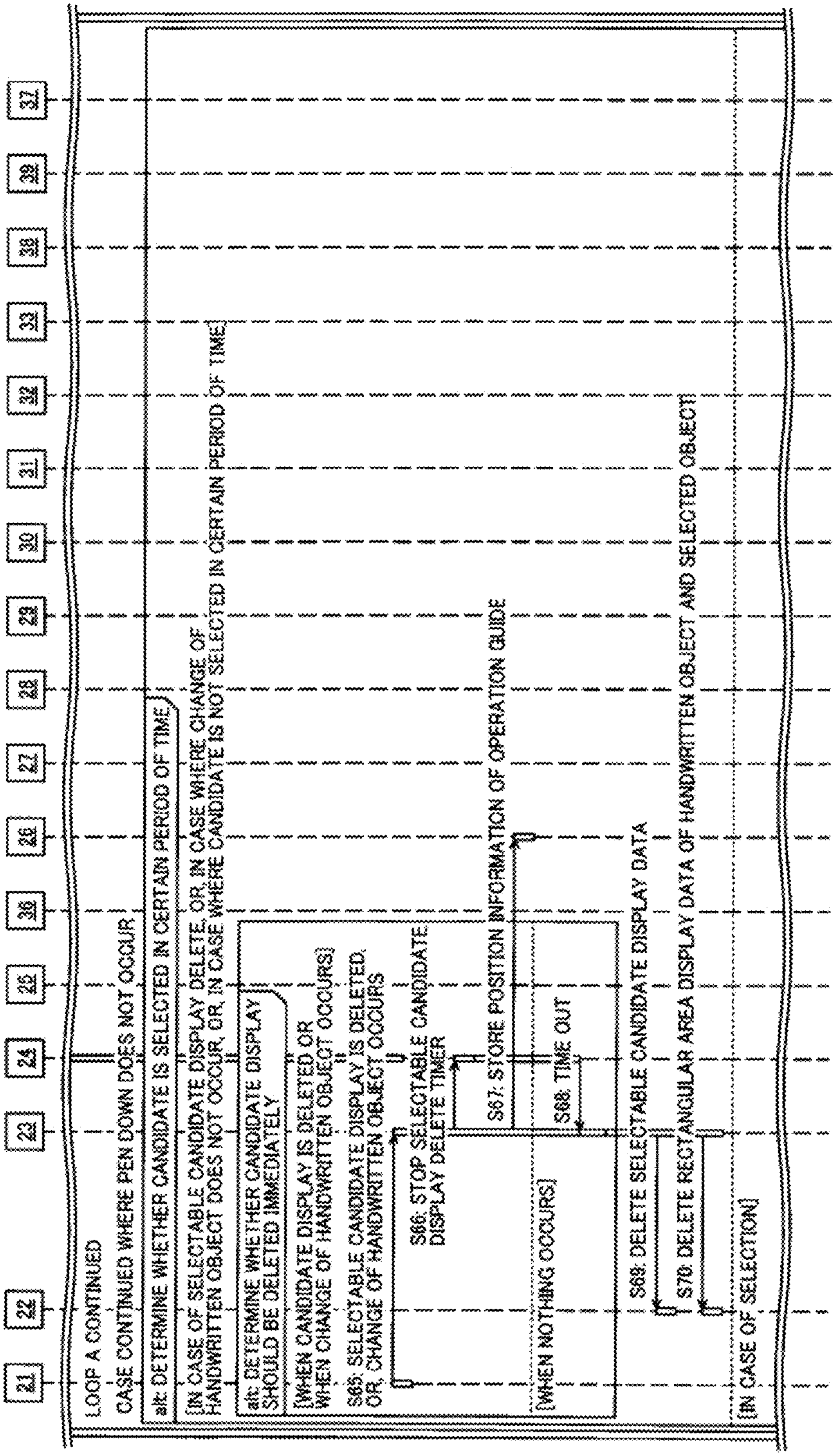
[Fig. 35]

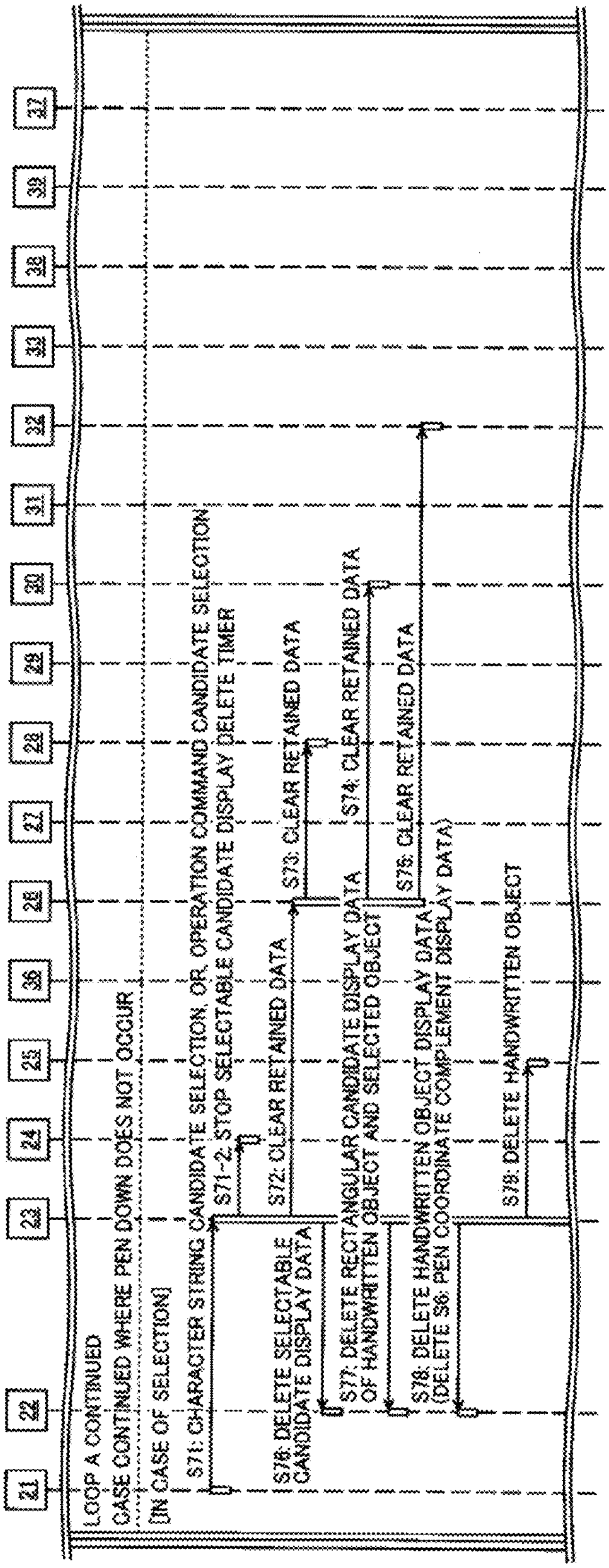
[Fig. 36]

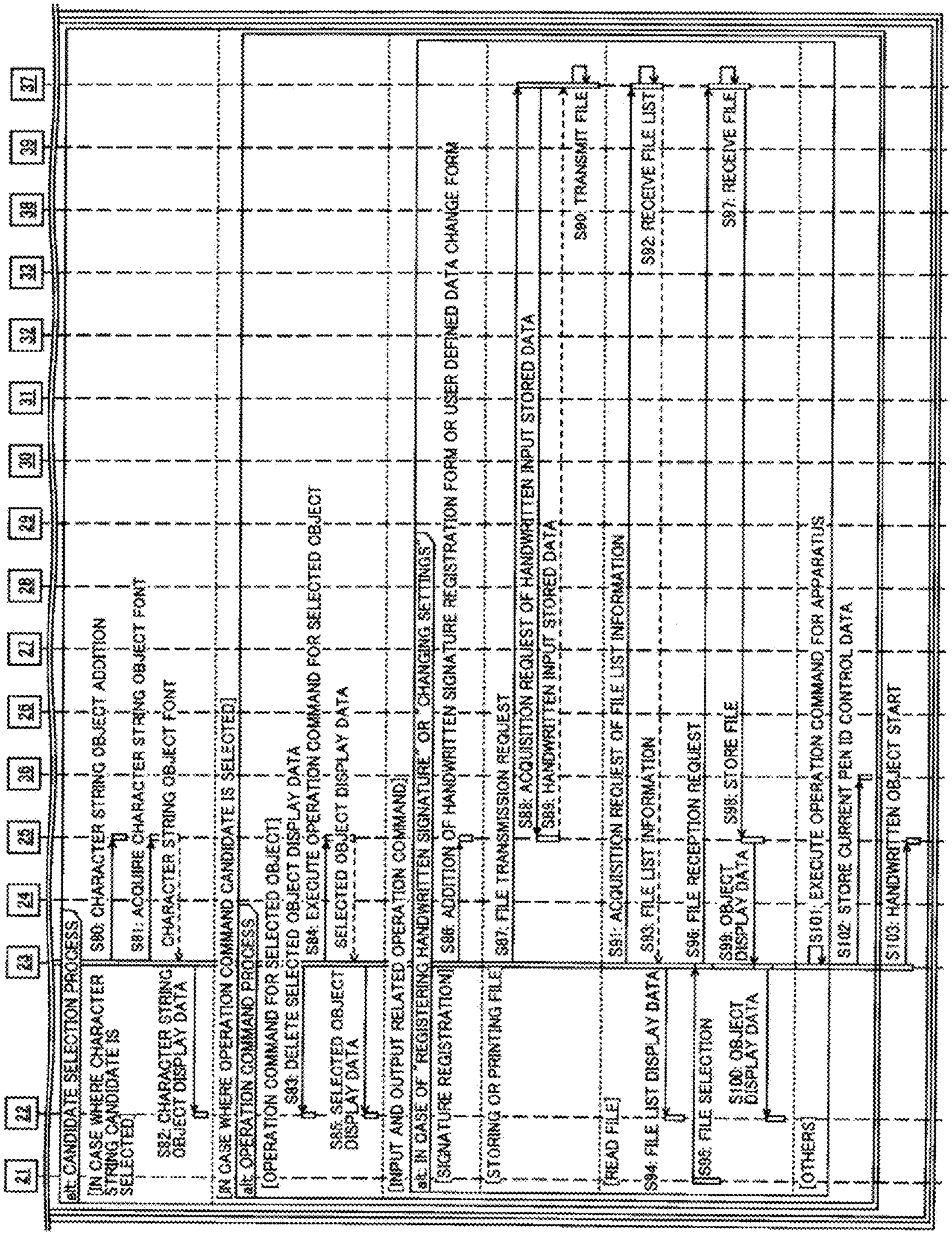
[Fig. 37]

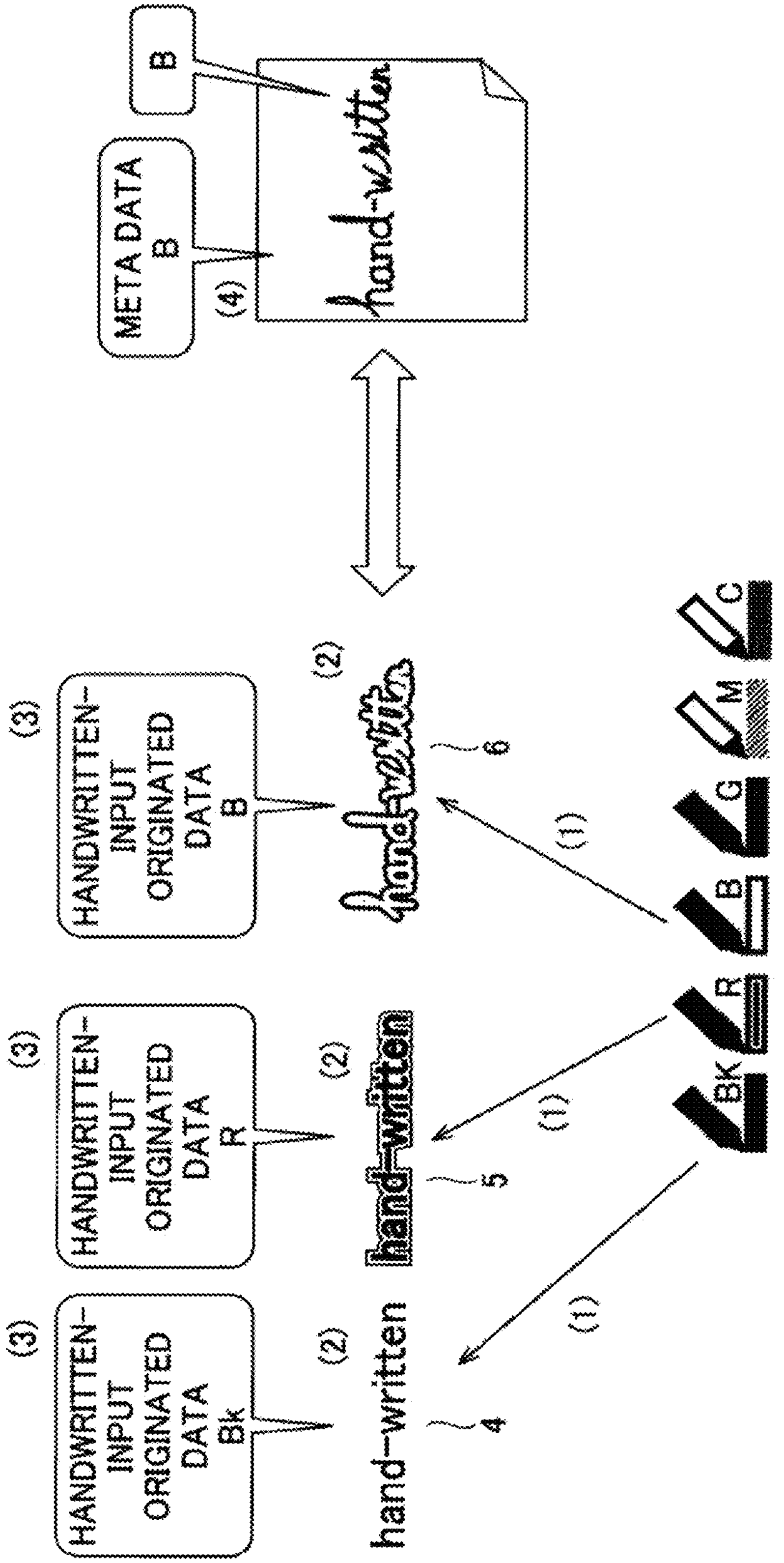
[Fig. 38]

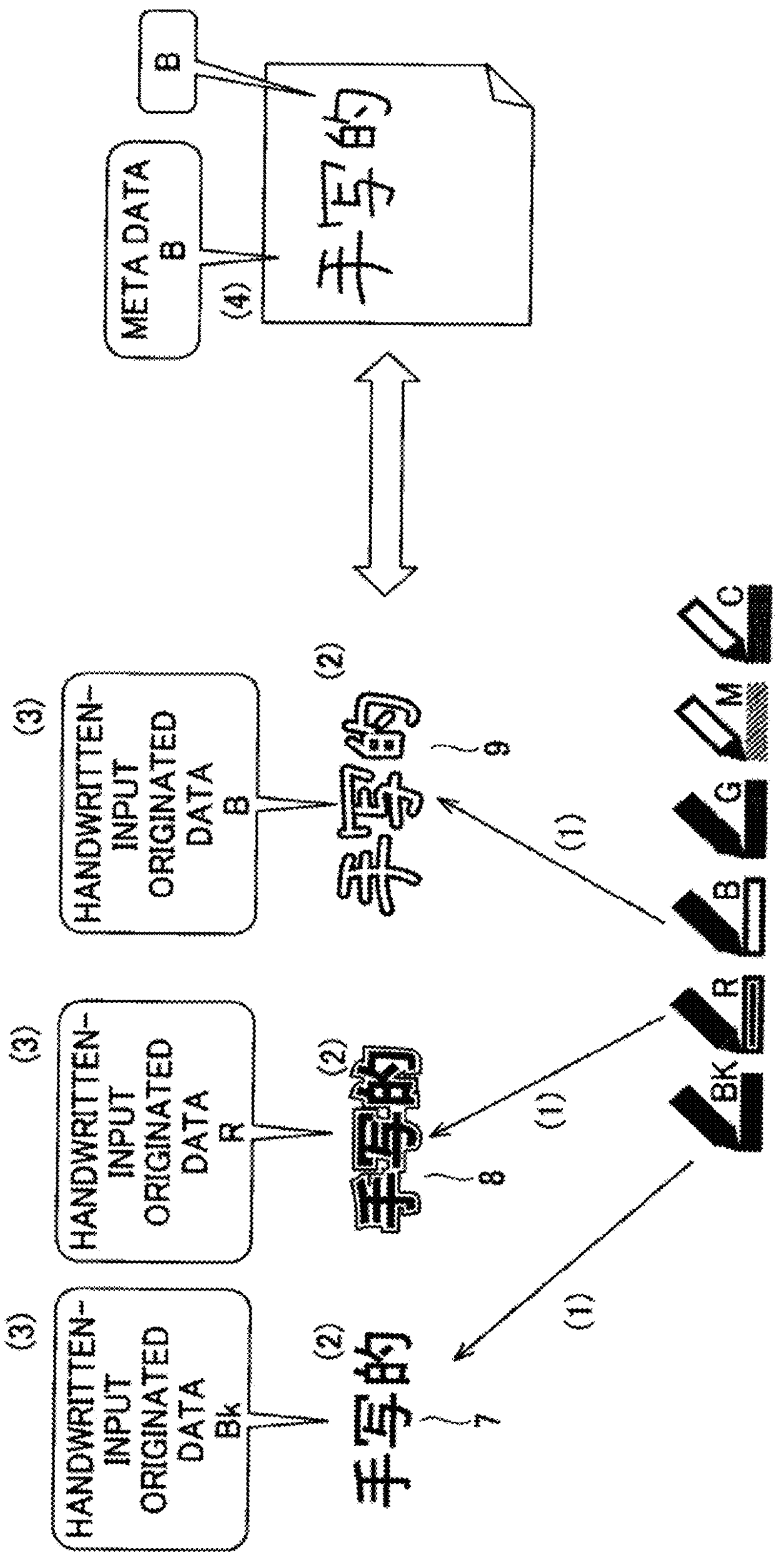
[Fig. 39]

| | OPERATION COMMAND DEFINITION DATA EXAMPLE (IN A CASE WHERE THERE IS NO SELECTED OBJECT) |
|---|---|
| 701 | Name="load agenda template" String="agenda" String="template"<br>Command="ReadFile https://%username%:%password%@server.com/template/minutes.pdf" |
| 702 | Name="save agenda folder" String="agenda" String="save"<br>Command="WriteFile https://%username%:%password%@server.com/minutes/%machinename%_%yyyy-mm-dd%.pdf" |
| 703 | Name="print" String="print"<br>Command="PrintFile https://%username%:%password%@server.com/print/%machinename%-"%yyyy-mm-dd%.pdf" |
| 709 | Name="Black pen" String="black" String="pen" Command="ChangePen Black" |
| 710 | Name="Red pen" String="red" String="pen" Command="ChangePen Red" |
| 711 | Name="Blue pen" String="blue" String="pen" Command="ChangePen Blue" |
| 720 | Name="Green pen" String="green" String="pen" Command="ChangePen Green" |
| 721 | Name="Magenta pen" String="magenta" String="pen" Command="ChangePen Magenta" |
| 722 | Name="Cyan pen" String="cyan" String="pen" Command="ChangePen Cyan" |
| 719 | Name="Load File" String="file" String="load"<br>Command="ReadFile https://%usename%:%password%@server.com/files/" |
| 712 | Name="Align text direction" String="text" String="direction"<br>Command="AlignTextDirection" |
| 713 | Name="Register handwritten signature" String="sign" String="regist" Command="RegistSignature" |
| 714 | Name="Hand sign in" String="sign" String="login" String=%signature% Command="Signin" |
| 715 | Name="Hand sign out" String="sign" String="logout" Command="Signout" |
| 716 | Name="Change settings" String="set" String="setting" Command="ConfigSettings" |

[Fig. 40A]

| | SYSTEM DEFINITION DATA EXAMPLE |
|---|---|
| 704 | username="Bob" |
| 705 | password="x2PDHTyS" |
| 706 | machinename="My-Machine" |

[Fig. 40B]

| | OPERATION COMMAND DEFINITION DATA EXAMPLE (IN A CASE WHERE THERE IS SELECTED OBJECT) |
|---|---|
| 707 | Name="Delete" Group="Edit" Command="Delete" |
| | Name="Move" Group="Edit" Command="Move" |
| | Name="Rotate" Group="Edit" Command="Rotate" |
| | Name="Select" Group="Edit" Command="Select" |
| 708 | Name="Thick" Group="Decorate" Command="Thick" |
| | Name="Thin" Group="Decorate" Command="Thin" |
| | Name="Large" Group="Decorate" Command="Large" |
| | Name="Small" Group="Decorate" Command="Small" |
| | Name="Underline" Group="Decorate" Command="Underline" |

[Fig. 41]

| | USER DEFINED DATA EXAMPLE |
|---|---|
| 717 | AccountId="1" AccountUsername="Bob" AccountPassword="" SignatureId="1" username="ichiro.suzuki" password="DG9wEvda" machinename="whiteboard" |
| 718 | Name="name" Data=%AccountName% |
| | Name="password" Data=%AccountPassword% |
| | Name="Folder Username" Data=%username% |
| | Name="Folder Password" Data=%password% |
| | Name="Folder FileName" Data=%machinename% |

| BEFORE CONVERSION | AFTER CONVERSION | PROBABILITY |
|---|---|---|
| a | a | 0.90 |
| a | o | 0.10 |

[Fig. 44]

| BEFORE CONVERSION | AFTER CONVERSION | PROBABILITY |
|---|---|---|
| a | a b | 0.55 |
| a | A I | 0.45 |
| a b | ability | 0.55 |
| a b | agenda | 0.30 |

[Fig. 45]
| BEFORE CONVERSION | AFTER CONVERSION | PROBABILITY |
|---|---|---|
| agenda | agenda list | 0.55 |
| agenda | agenda template | 0.30 |
| I | I am | 0.55 |
| This | This is | 0.45 |
| You | You are | 0.55 |
| There | There are | 0.30 |
[Fig. 46A]
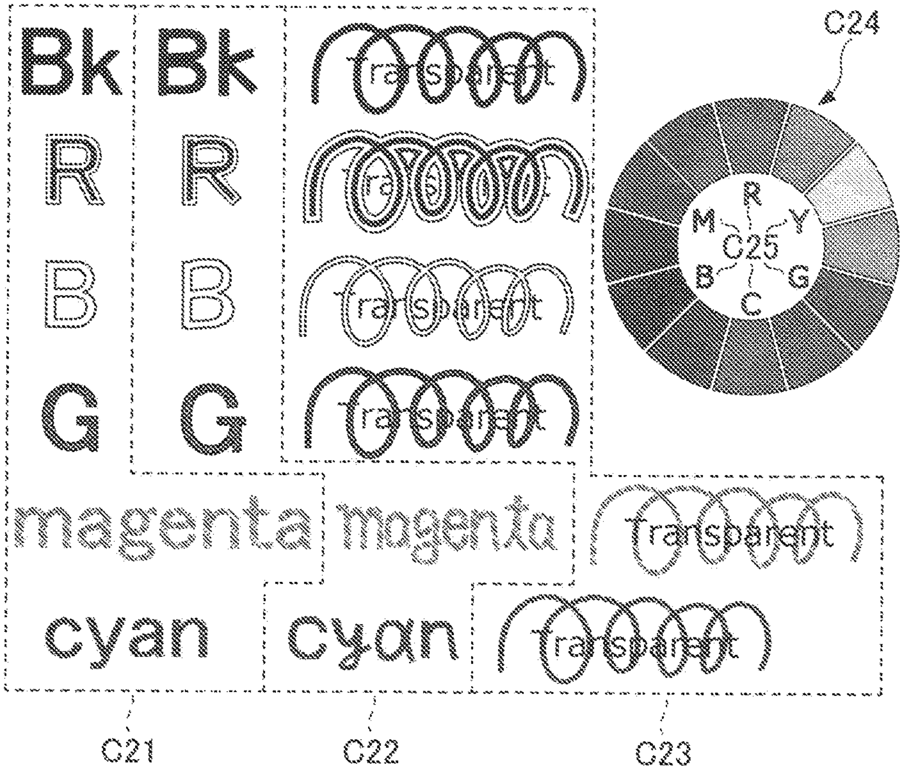
BLACK AND WHITE EMPHASIZED REPRESENTATION EXAMPLE

[Fig. 46B]
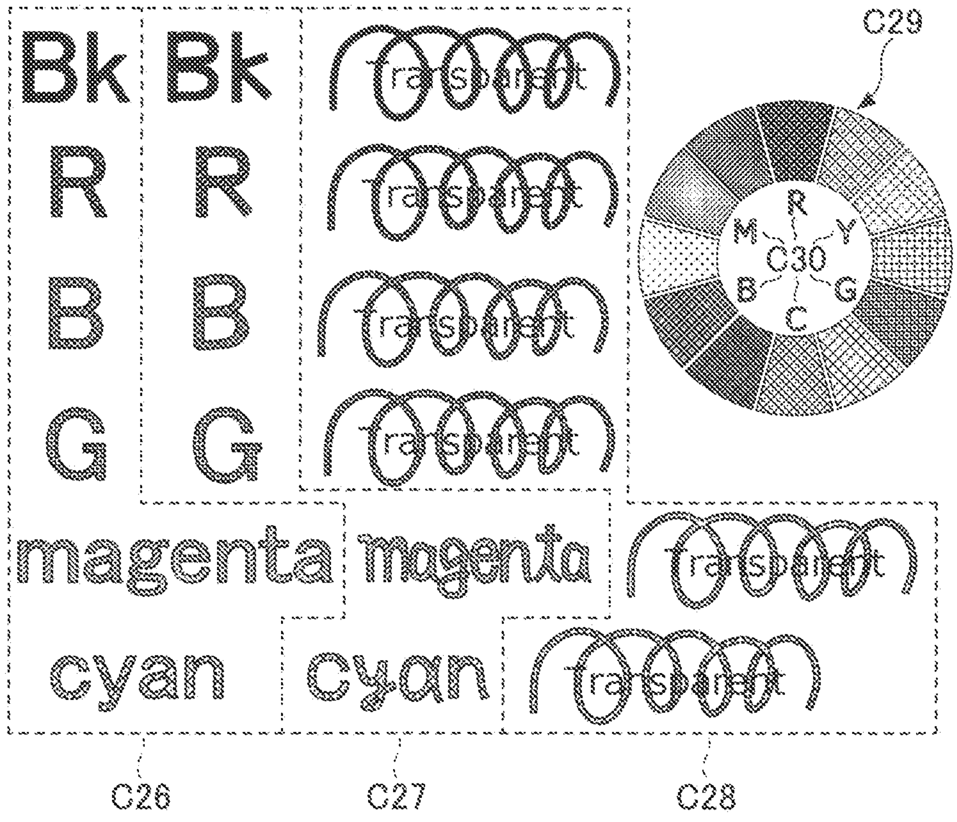
COLOR CONVERSION METHOD EXAMPLE

[Fig. 47]
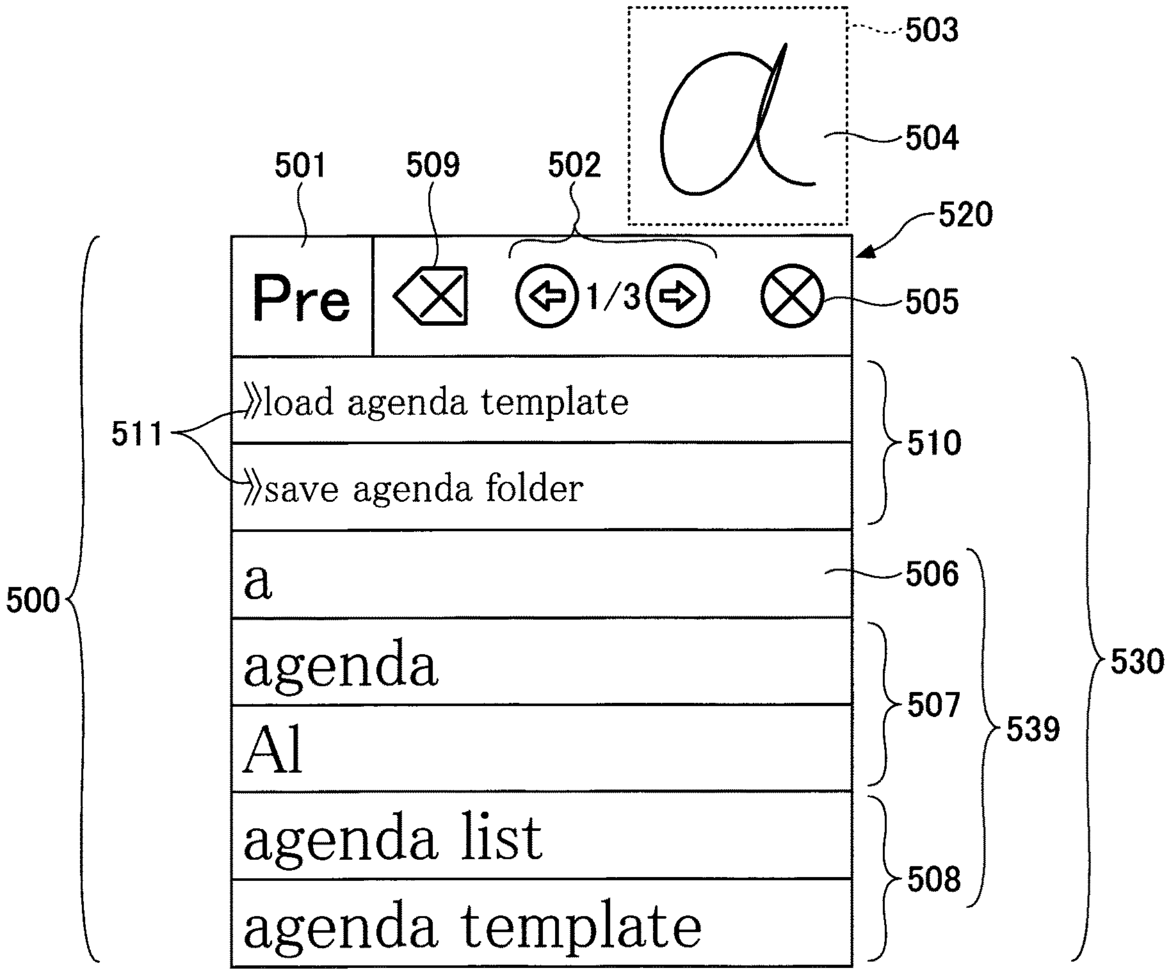

[Fig. 48A]
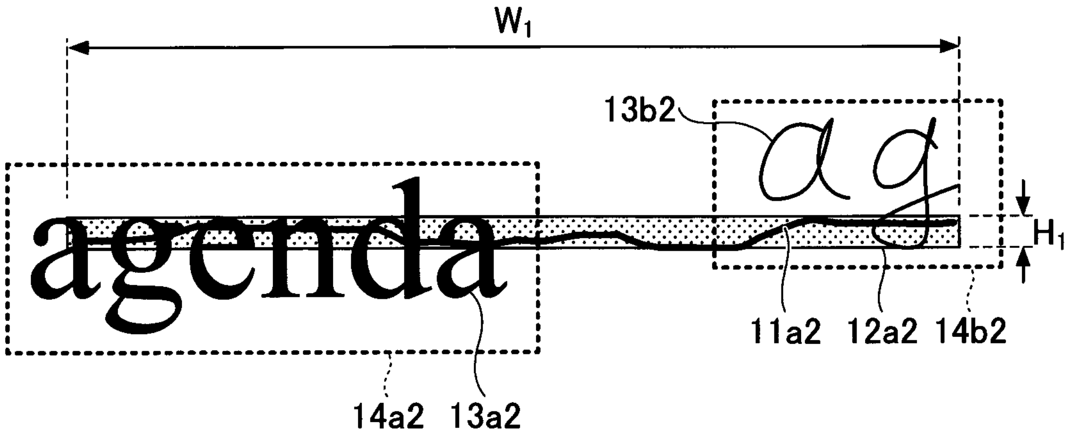
[Fig. 48B]
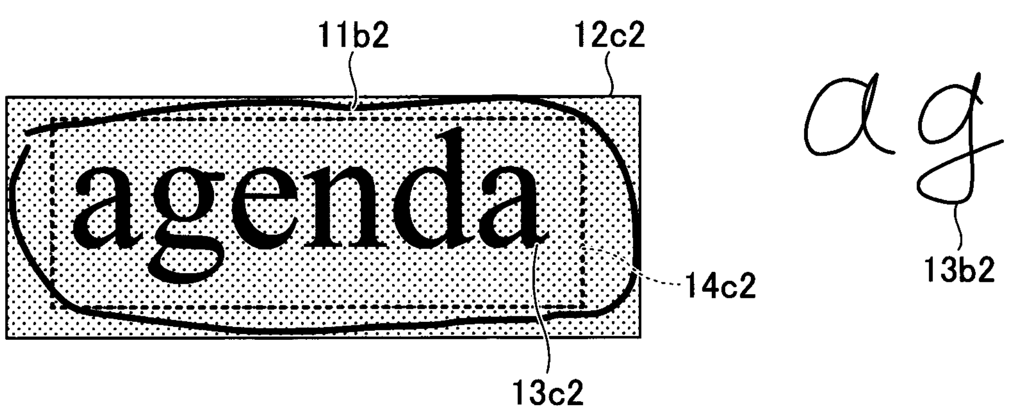

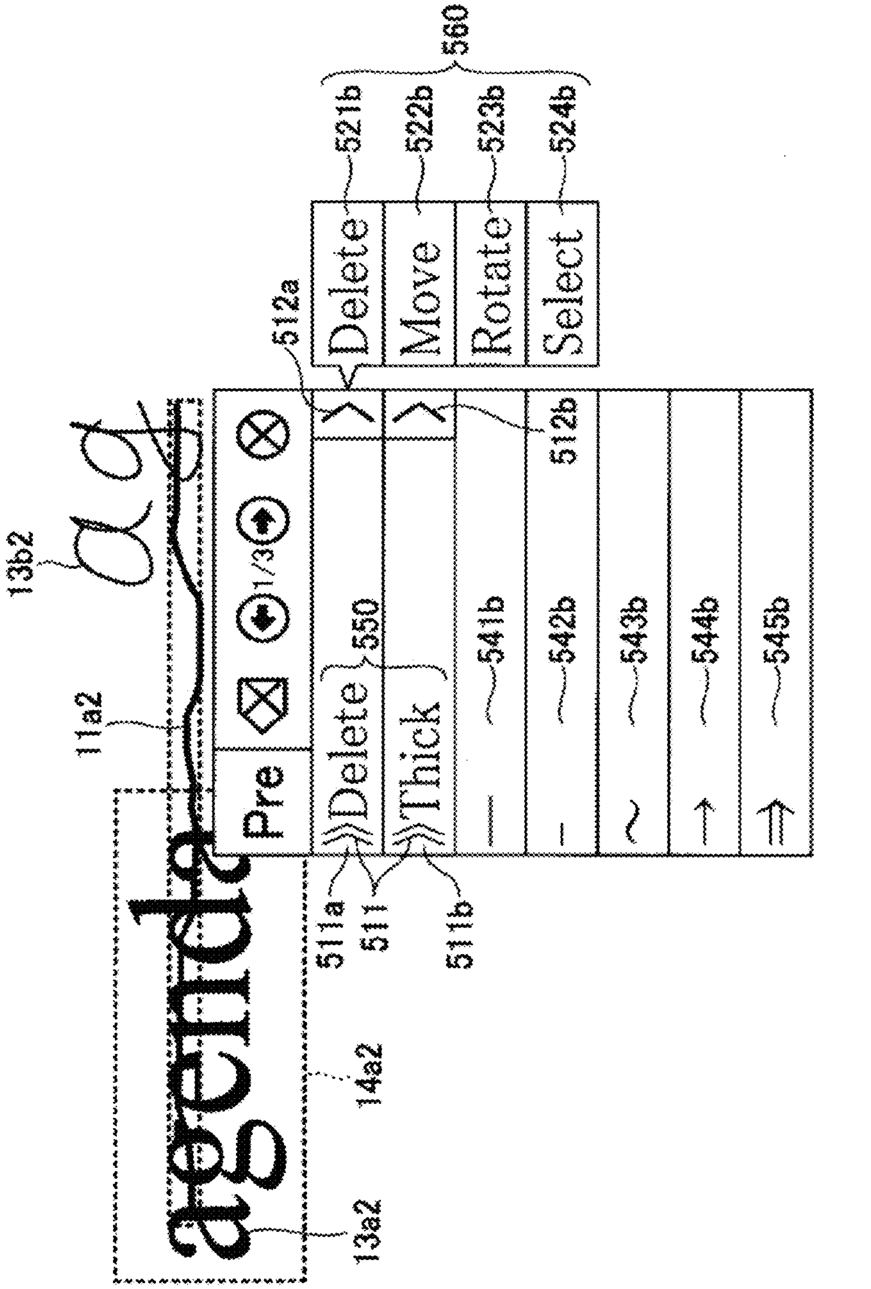
[Fig. 49A]

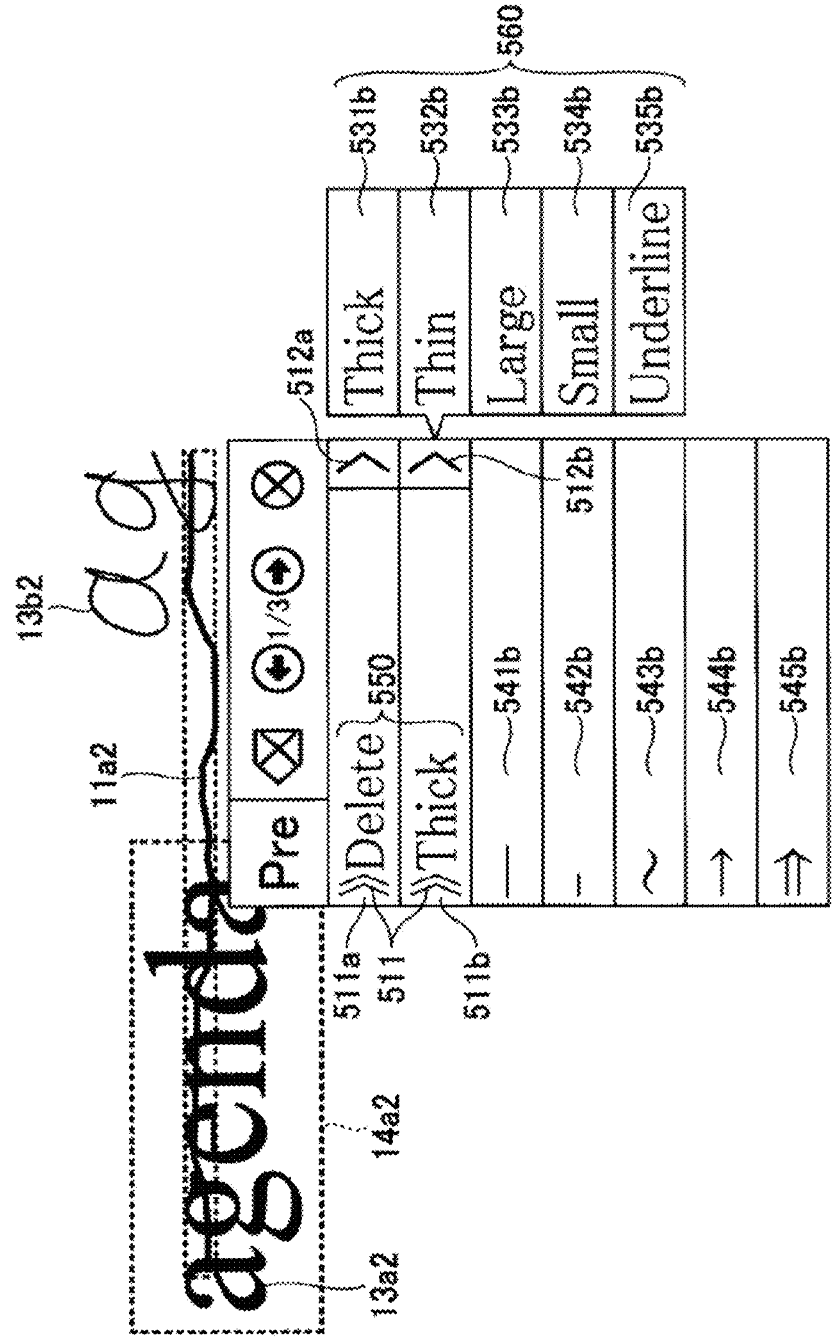
[Fig. 49B]

[Fig. 50A]
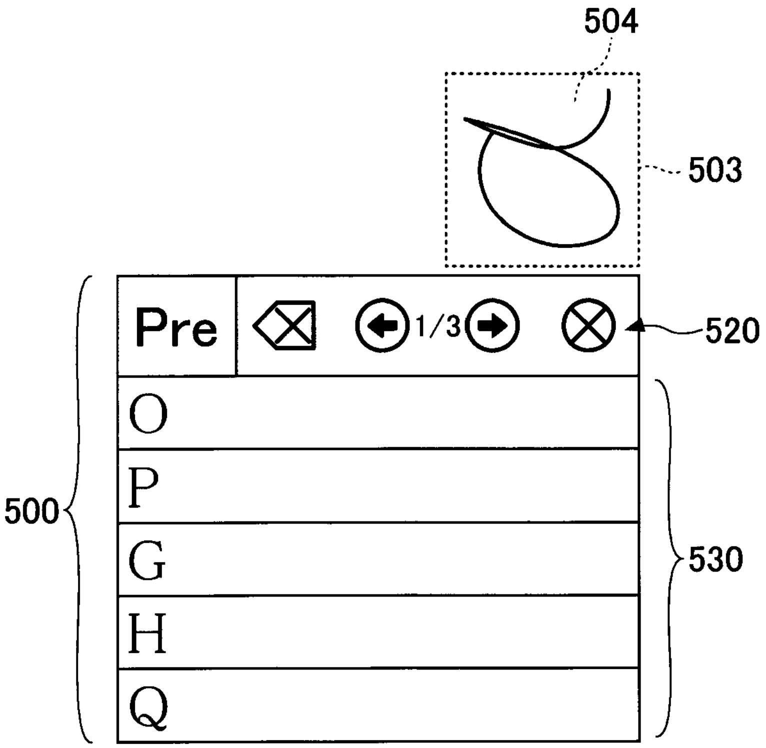

[Fig. 50B]
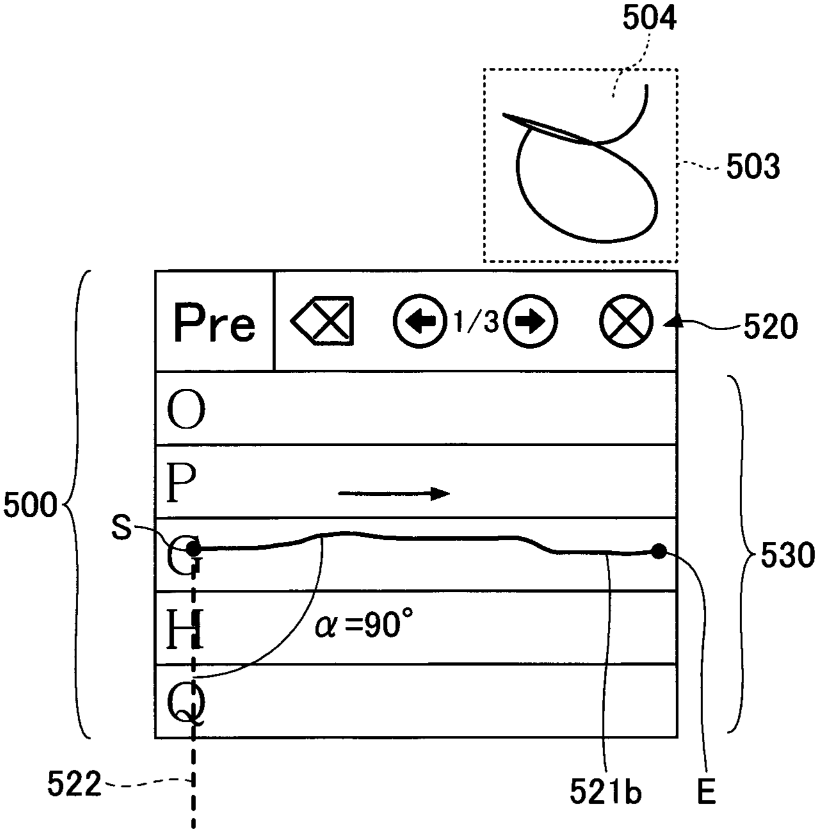

[Fig. 50C]
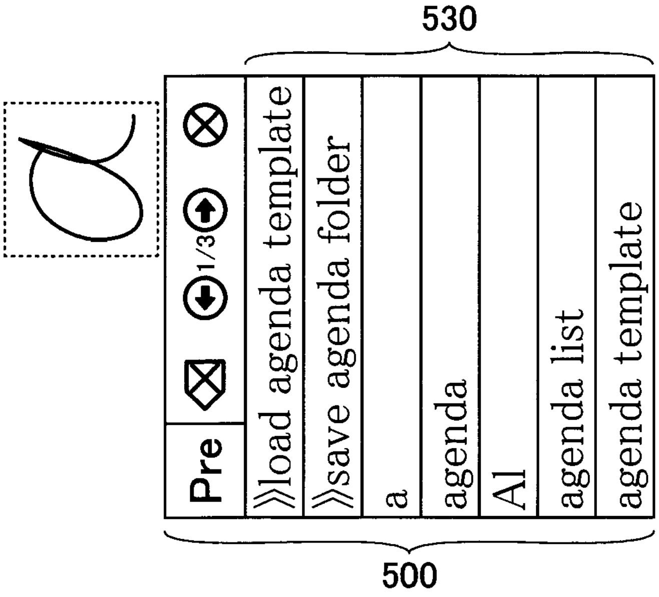
[Fig. 51A]
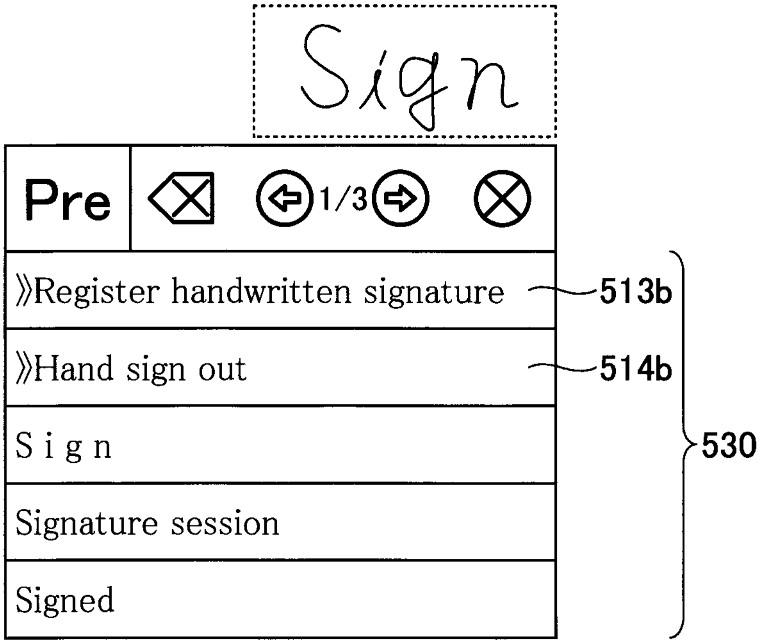

[Fig. 51B]
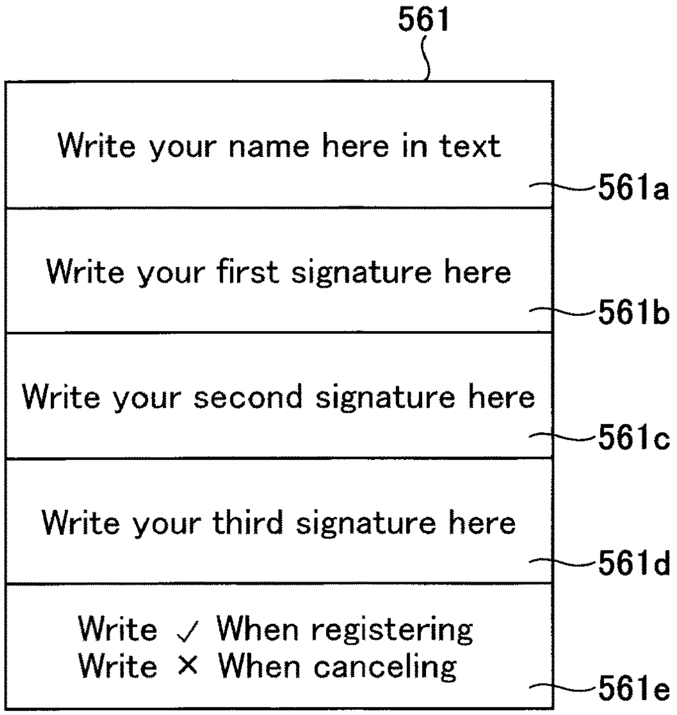
[Fig. 51C]
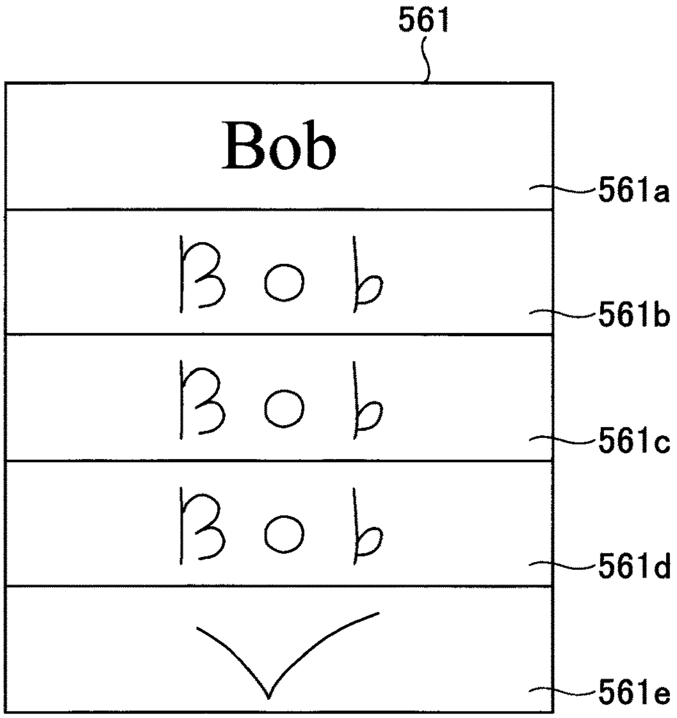

[Fig. 52]
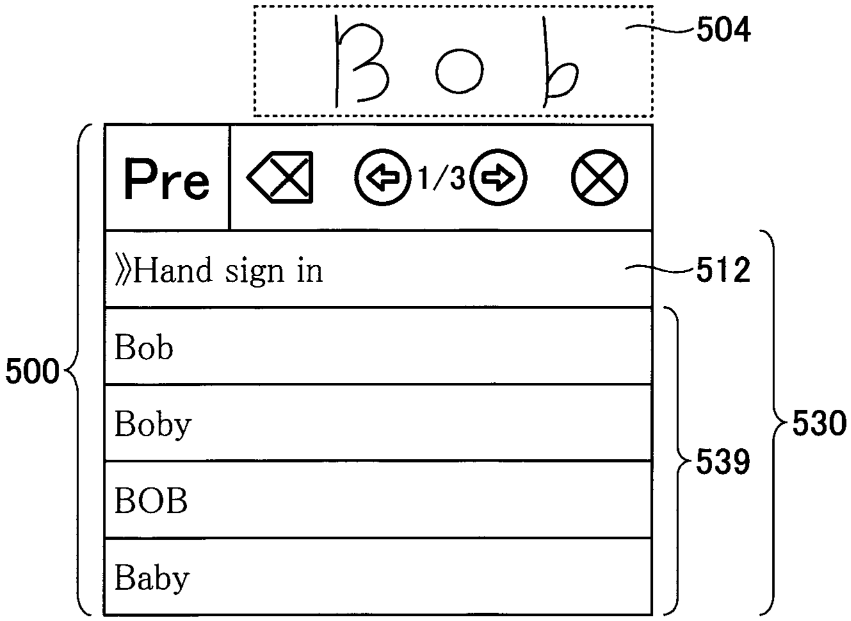
[Fig. 53A]
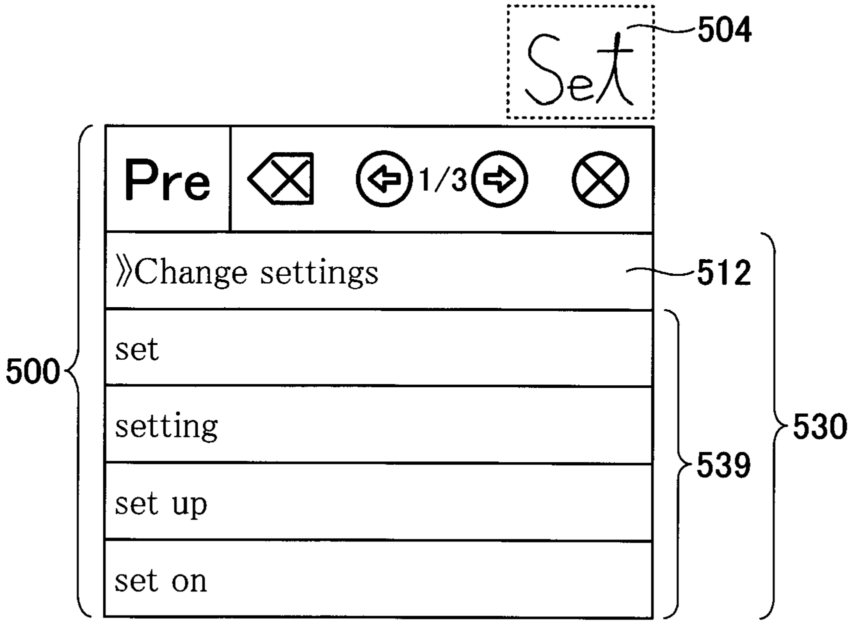

| | | |
|---|---|---|
| name | Bob | 562a |
| password | | 562b |
| folder username | Bob | 562c |
| folder password | ******** | 562d |
| folder file name | whiteboard | 562e |
| register or cancel | Write ✓ When registering<br>Write × When canceling | 562f |

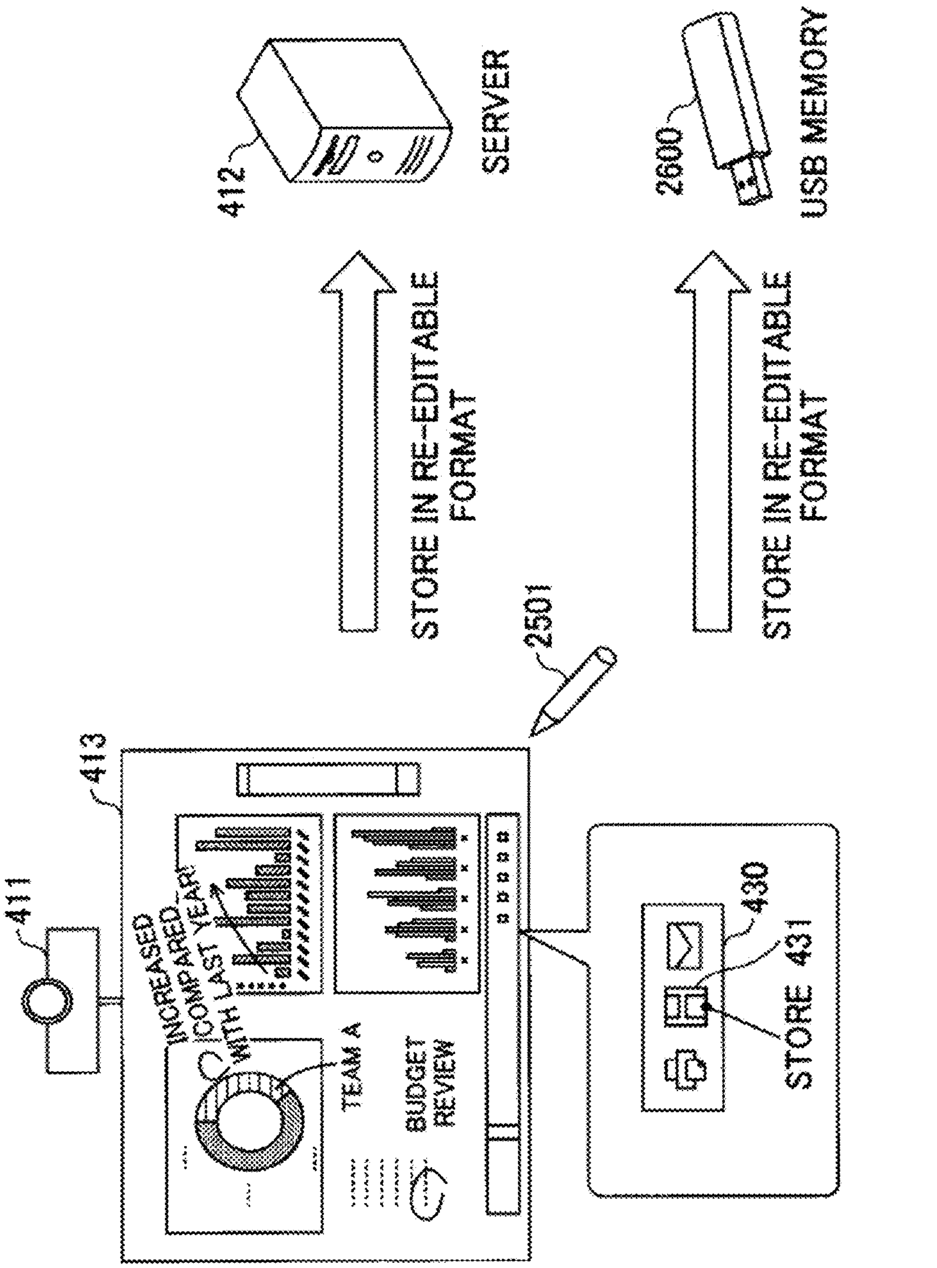
[Fig. 54]

[Fig. 55]
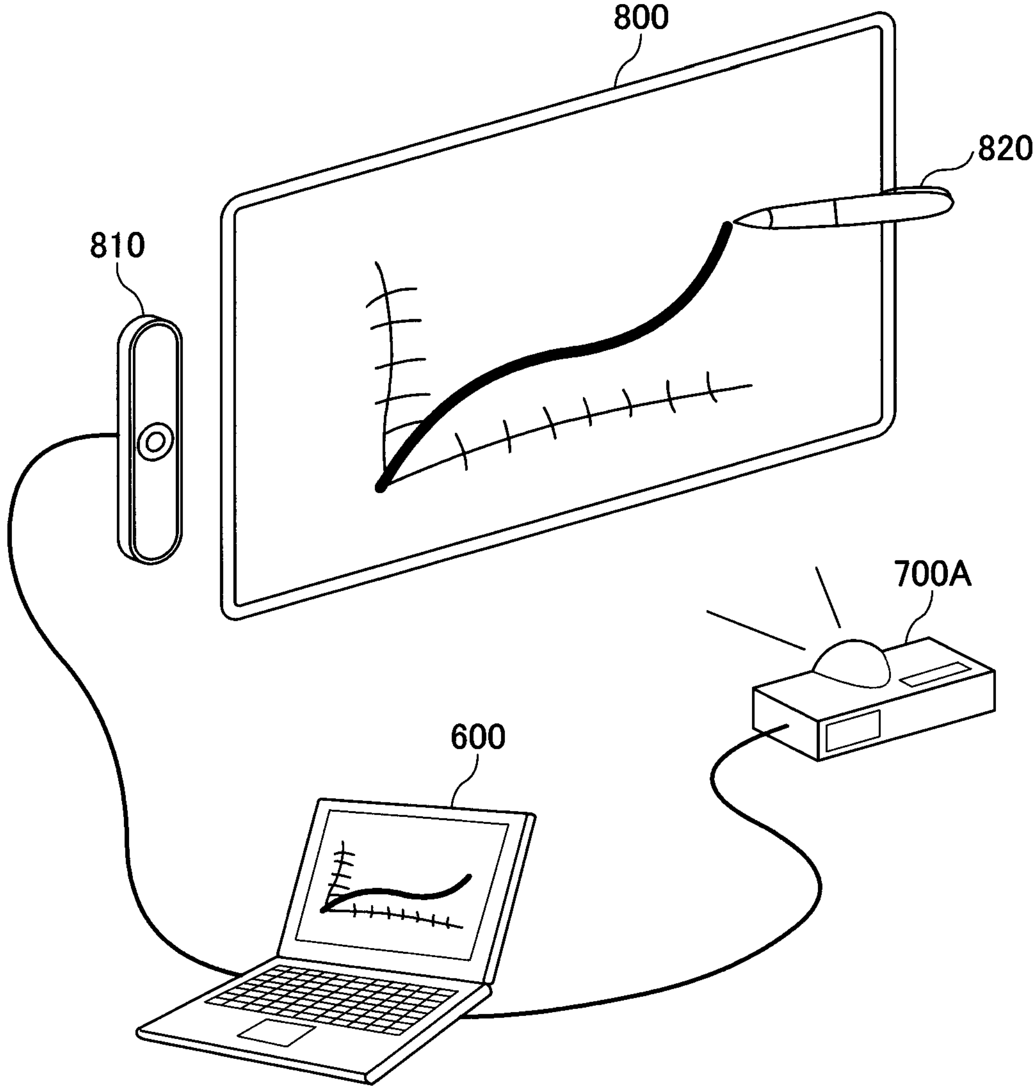

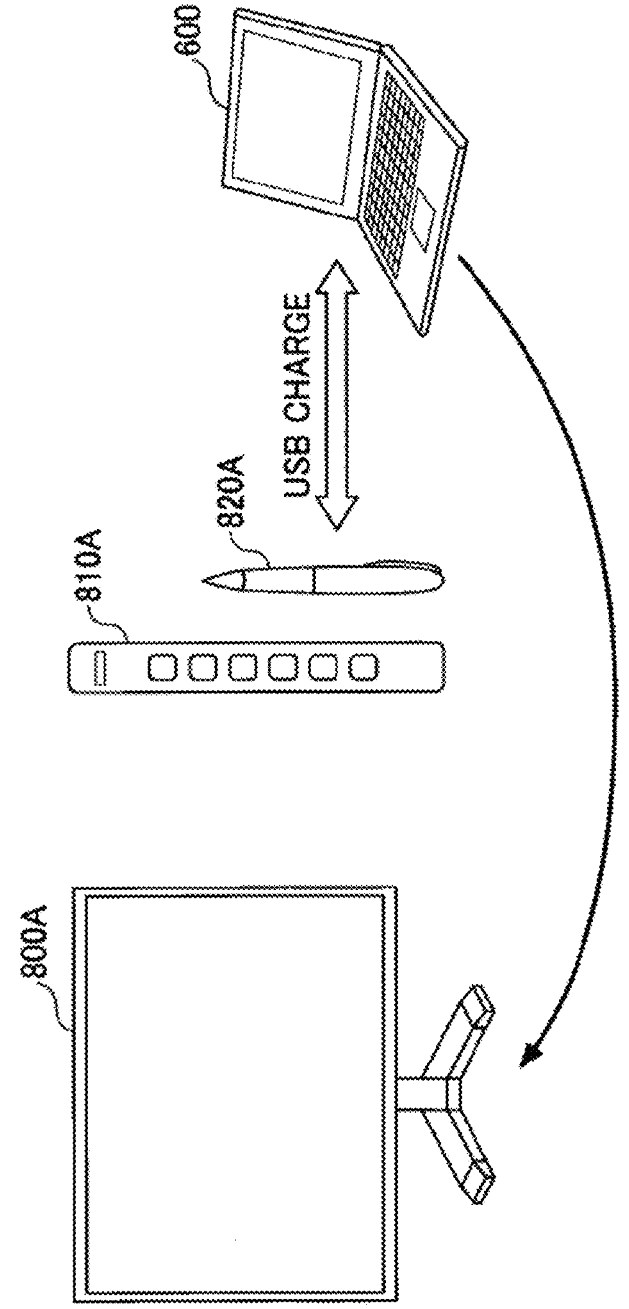
[Fig. 56]

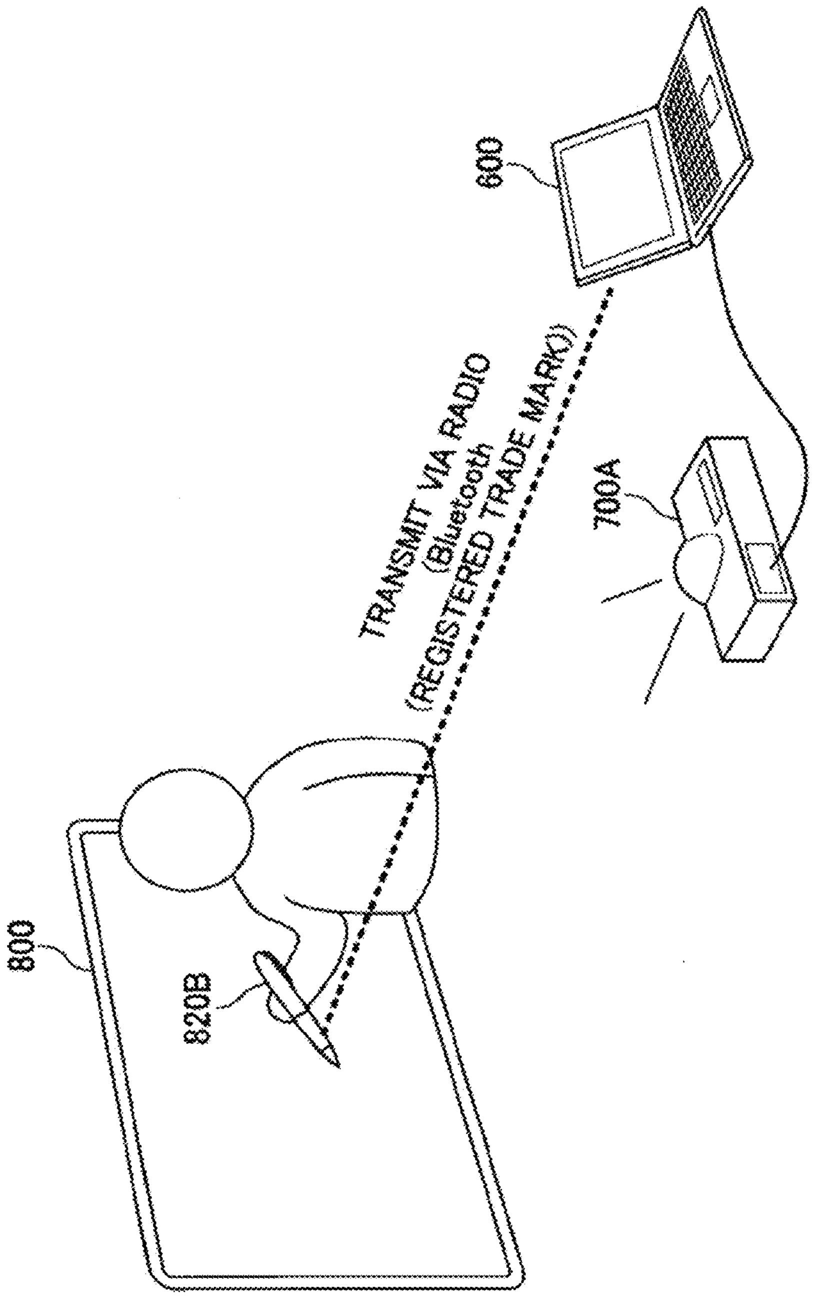
[Fig. 57]

APPARATUS, EXTERNAL APPARATUS, DISPLAY METHOD, AND RECORDING MEDIUM

CROSS-REFERENCE TO RELATED APPLICATIONS

The present application is based on PCT filing PCT/JP2020/038524, filed Oct. 12, 2020, which is based on and claims the benefit of priority of Japanese Priority Application No. 2019-188188 filed Oct. 11, 2019, and Japanese Priority Application No. 2020-168992 filed Oct. 6, 2020, the entire contents of each are hereby incorporated by reference.

TECHNICAL FIELD

The present invention relates to a display apparatus, a color supporting apparatus, a display method, and a program.

BACKGROUND ART

A display apparatus for displaying handwritten data on a touch panel with a pen or a finger is known. A display apparatus with a relatively large touch panel is located in a conference room, etc., and is used by multiple users as an electronic black board, or the like.

In a typical display apparatus, a user can switch colors or thickness of characters using a predetermined button, and the display apparatus can display handwritten data with a user selected color and thickness.

On the other hand, although some attempts have been made to adopt electronic paper for a display apparatus, in general, an electronic paper is not capable of displaying colors. Therefore, when a black-and-white supporting apparatus such as an electronic paper reads a color file from an external source, the black-and-white supporting apparatus converts the color information into a black-and-white density and displays the color information (for example, see Patent Document 1). Patent Document 1 discloses a conversion method for performing image data conversion by performing appropriate correction according to the characteristics of the color image.

CITATION LIST

Patent Literature

[Patent Document 1] Japanese Unexamined Patent Application Publication No. 2017-139678

SUMMARY OF INVENTION

Technical Problem

However, there has been a problem with conventional techniques in which handwritten data drawn with a particular display apparatus cannot be identified.

In view of the above problem, it is an object of the present invention to provide a display apparatus capable of identifying handwritten data drawn with a particular display apparatus.

Solution to Problem

In view of the above-described problem, the present invention provides a display apparatus for displaying data, wherein information, which indicates that the data is handwritten data drawn by the display apparatus, is recorded in association with the handwritten data.

Advantageous Effects of Invention

It is possible to provide a display apparatus capable of identifying handwritten data drawn by a particular display apparatus.

BRIEF DESCRIPTION OF DRAWINGS

FIG. 1A is a drawing illustrating an example of conversion from color to black-and-white displayed by a black-and-white supporting apparatus.

FIG. 1B is a drawing illustrating an example of conversion from color to black-and-white displayed by a black-and-white supporting apparatus.

FIG. 1C is a drawing illustrating an example of conversion from color to black-and-white displayed by a black-and-white supporting apparatus.

FIG. 2 is a drawing illustrating an overview of a display method of handwritten input originated data by a display apparatus according to an embodiment of the present invention.

FIG. 3 is a drawing illustrating an example of a perspective view of a pen.

FIG. 4 is a drawing illustrating an example of an overall configuration diagram of a display apparatus.

FIG. 5 is a drawing illustrating an example of a hardware structure of a display apparatus.

FIG. 6A is a drawing illustrating functions of a display apparatus and a pen.

FIG. 6B is a drawing illustrating functions of a display apparatus and a pen.

FIG. 7 is a drawing illustrating examples of defined control data.

FIG. 8 is a drawing illustrating an example of dictionary data of a handwriting recognition dictionary unit.

FIG. 9 is a drawing illustrating an example of dictionary data of a character string conversion dictionary unit.

FIG. 10 is a drawing illustrating an example of dictionary data of a predictive conversion dictionary unit.

FIG. 11A is a drawing illustrating examples of operation command definition data and system definition data retained by an operation command definition unit.

FIG. 11B is a drawing illustrating examples of operation command definition data and system definition data retained by an operation command definition unit.

FIG. 12 is a drawing illustrating an example of file list display data displayed in a display unit.

FIG. 13 is a drawing illustrating an example of operation command definition data when there is a selected object selected by a handwritten object.

FIG. 14 is a drawing illustrating an example of user defined data retained by an operation command definition unit.

FIG. 15 is a drawing illustrating an example of handwritten signature data retained by a handwritten signature data storage unit.

FIG. 16 is a drawing illustrating an example of handwritten input storage data stored in a handwritten input storage unit.

FIG. 17A is a drawing illustrating pen ID control data stored in a pen ID control data storage unit.

FIG. 17B is a drawing illustrating pen ID control data stored in a pen ID control data storage unit.

FIG. 18 is a drawing illustrating an example of color definition data.

FIG. 19A is a drawing illustrating examples of data, in which black and white emphasis is displayed, and data, in which a color display method is used for displaying the data using the color definition data in FIG. 18.

FIG. 19B is a drawing illustrating examples of data, in which black and white emphasis is displayed, and data, in which a color display method is used for displaying the data using the color definition data in FIG. 18.

FIG. 20 is a drawing illustrating an example of pen color selection button definition data.

FIG. 21A is drawing illustrating an example of a pen button displayed on a display.

FIG. 21B is drawing illustrating an example of a pen button displayed on a display.

FIG. 22 is a drawing illustrating examples of an operation guide and selectable candidates displayed by the operation guide.

FIG. 23A is an example of a drawing illustrating an example of specifying a selected object.

FIG. 23B is an example of a drawing illustrating an example of specifying a selected object.

FIG. 23C is an example of a drawing illustrating an example of specifying a selected object.

FIG. 23D is an example of a drawing illustrating an example of specifying a selected object.

FIG. 24A is a drawing illustrating an example of displaying operation command candidates based on the operation command definition data when there is a handwritten object.

FIG. 24B is a drawing illustrating an example of displaying operation command candidates based on the operation command definition data when there is a handwritten object.

FIG. 25A is a drawing illustrating an example of displaying operation command candidates based on the operation command definition data when there is a handwritten object.

FIG. 25B is a drawing illustrating an example of displaying operation command candidates based on the operation command definition data when there is a handwritten object.

FIG. 26A is a drawing illustrating a method for inputting 90 degree angle information.

FIG. 26B is a drawing illustrating a method for inputting 90 degree angle information.

FIG. 26C is a drawing illustrating a method for inputting 90 degree angle information.

FIG. 27A is a drawing illustrating a method of registering handwritten signature data.

FIG. 27B is a drawing illustrating a method of registering handwritten signature data.

FIG. 27C is a drawing illustrating a method of registering handwritten signature data.

FIG. 28 is a drawing illustrating an example of an operation guide displayed when a user handwrites "suzuki" in Japanese which is handwritten signature data registered by the user.

FIG. 29A is a drawing illustrating a method of changing user defined data.

FIG. 29B is a drawing illustrating a method of changing user defined data.

FIG. 30 is an example of a process of displaying a character string candidate and an operation command candidate by the display apparatus (Part 1).

FIG. 31 is an example of a process of displaying a character string candidate and an operation command candidate by the display apparatus (Part 2).

FIG. 32 is an example of a process of displaying a character string candidate and an operation command candidate by the display apparatus (Part 3).

FIG. 33 is an example of a process of displaying a character string candidate and an operation command candidate by the display apparatus (Part 4).

FIG. 34 is an example of a process of displaying a character string candidate and an operation command candidate by the display apparatus (Part 5).

FIG. 35 is an example of a process of displaying a character string candidate and an operation command candidate by the display apparatus (Part 6).

FIG. 36 is an example of a process of displaying a character string candidate and an operation command candidate by the display apparatus (Part 7).

FIG. 37 is an example of a process of displaying a character string candidate and an operation command candidate by the display apparatus (Part 8).

FIG. 38 is a drawing illustrating an overview of a display method of handwritten input originated data by a display apparatus in case of English conversion.

FIG. 39 is a drawing illustrating an overview of a display method of handwritten input originated data by a display apparatus 2 according to an embodiment of the present invention in case of Chines conversion.

FIG. 40A is a drawing illustrating an example of operation command definition data when there is no selected object in case of English conversion.

FIG. 40B is a drawing illustrating an example of operation command definition data when there is no selected object in case of English conversion.

FIG. 41 is a drawing illustrating an example of operation command definition data when there is a selected object in case of English conversion.

FIG. 42 is a drawing illustrating an example of user defined data in case of English conversion.

FIG. 43 is a drawing illustrating an example of dictionary data of a handwriting recognition dictionary unit in case of English conversion.

FIG. 44 is a drawing illustrating an example of dictionary data of a character string conversion dictionary unit in case of English conversion.

FIG. 45 is a drawing illustrating an example of dictionary data of a predictive conversion dictionary unit in case of English conversion.

FIG. 46A is a drawing illustrating data, in which black and white emphasis is displayed, and data, in which a color display method is used for displaying the data, using the color definition data in FIG. 18 in case of English conversion.

FIG. 46B is a drawing illustrating data, in which black and white emphasis is displayed, and data, in which a color display method is used for displaying the data, using the color definition data in FIG. 18 in case of English conversion.

FIG. 47 is a drawing illustrating examples of an operation guide and selectable candidates displayed by the operation guide, in case of English conversion.

FIG. 48A is an example of a drawing illustrating a specification example of a selected object in case of English conversion.

FIG. 48B is an example of a drawing illustrating a specification example of a selected object in case of English conversion.

FIG. 49A is a drawing illustrating a display example of an operation command candidate based on the operation command definition data in a case where there is a handwritten object illustrated in FIGS. 48A-48B.

FIG. 49B is a drawing illustrating a display example of an operation command candidate based on the operation command definition data in a case where there is a handwritten object illustrated in FIGS. 48A-48B.

FIG. 50A is an example of a drawing illustrating an input method of the angle information of 90 degrees in case of English conversion.

FIG. 50B is an example of a drawing illustrating an input method of the angle information of 90 degrees in case of English conversion.

FIG. 50C is an example of a drawing illustrating an input method of the angle information of 90 degrees in case of English conversion.

FIG. 51A is a drawing illustrating a method of registering handwritten signature data in case of English conversion.

FIG. 51B is a drawing illustrating a method of registering handwritten signature data in case of English conversion.

FIG. 51C is a drawing illustrating a method of registering handwritten signature data in case of English conversion.

FIG. 52 is a drawing illustrating an example of an operation guide displayed when a user handwrites "Bob", which is handwritten signature data registered by the user in case of English conversion.

FIG. 53A is a drawing illustrating a method of changing user defined data in case of English conversion.

FIG. 53B is a drawing illustrating a method of changing user defined data in case of English conversion.

FIG. 54 is a drawing illustrating another configuration example of a display apparatus.

FIG. 55 is a drawing illustrating another configuration example of a display apparatus.

FIG. 56 is a drawing illustrating another configuration example of a display apparatus.

FIG. 57 is a drawing illustrating another configuration example of a display apparatus.

DESCRIPTION OF EMBODIMENTS

Hereinafter, as an example of an embodiment of the present invention, a display apparatus and a display method performed by the display apparatus will be described with reference to the drawings.

Embodiment 1

Terminology

An input unit may be a unit that allows handwriting by specifying the coordinates on a touch panel. For example, a pen, a human finger, a hand, a rod-like member, or the like, is included. Further, a sight input device may be included. Handwritten data is data that shows, as a trajectory, a sequence of coordinate points on a touch panel in which the user has continuously moved the input unit. Further, a stroke is a series of operations in which the user presses the input unit on the touch panel, moves it continuously, and then releases it from the touch panel. Data handwritten by the stroke is referred to as stroke data. Handwritten data includes one or more stroke data items. Handwritten input indicates that handwritten data is entered by the user.

<Compared Example of Display Apparatus>

In describing a display apparatus according to an embodiment of the present invention, first, a color display example of a black-and-white supporting apparatus will be briefly described.

FIGS. 1A-1C are drawings illustrating an example of conversion from color to black-and-white displayed by a black-and-white supporting apparatus. First, FIG. 1A shows an example of handwritten data displayed by the black-and-white supporting apparatus. The black-and-white supporting apparatus is a display apparatus that cannot display data in color. It is possible for a user to enter handwritten input for black-and-white supporting apparatus. However, the black-and-white supporting apparatus converts color information into gray scale information and displays it.

FIGS. 1(*b*) and (*c*) are drawings illustrating a correspondence between the color information and the gray scale information. Due to the limitations of the drawings, both drawings are black and white, but FIG. 1(*b*) is a color chart and FIG. 1(*c*) is a gray-scaled color chart. By comparing the same circumferential positions of the color charts of FIG. 1B and FIG. 1C, it is understood that red (R) is converted to light gray and blue (B) is converted to dark gray.

Therefore, as shown in FIG. 1A, when the black-and-white supporting apparatus converts handwritten data 303, which is handwritten by the user in red, into gray scale information, it is displayed in light gray. When the black-and-white supporting apparatus converts handwritten data 302, which is handwritten by the user in blue, into gray scale information, it is displayed in dark gray. The handwritten data 301, which is handwritten by the user in black, is displayed in black. However, it is understood that it is difficult for red and blue to perform their original function of highlighting (emphasizing) information. In particular, blue is hard to distinguish from black.

<Outline of Color Display of Display Apparatus According to an Embodiment of the Present Invention>

Accordingly, in a display apparatus according to an embodiment of the present invention, handwritten input originated data is associated with information indicating that the data is handwritten input originated data so that the handwritten input originated data can be detected. Further, in the case where displaying the handwritten input originated data, the display apparatus displays the handwritten input originated data in a manner corresponding to color information based on the color information associated with the handwritten input originated data. Display of handwritten input originated data in a manner corresponding to color information is referred to as "black-and-white highlighting display". The handwritten input originated data is handwritten stroke data or text data that is converted, from the stroke data, by handwriting recognition.

FIG. 2 is a drawing illustrating an overview of a display method of handwritten input originated data by a display apparatus according to an embodiment of the present invention. It should be noted that the display apparatus will be described as an apparatus that does not support color display, such as an electronic paper. However, a display apparatus, which is capable of color display, may perform black-and-white display.

(1) First, it is possible for a user to select, by using a button, which color is used for inputting handwritten data. In FIG. 2, it is possible for a user to select each of black (Bk), red (R), blue (B), green (G), magenta (M), and cyan (C).

(2) The display apparatus displays handwritten data in a manner corresponding to the color when handwritten by the user. The manner corresponding to the color refers to displaying using different line types depending on the color. By displaying the line type corresponding to the color in this way, black-and-white highlighting is possible. As described below, the display apparatus is capable of handwriting recognition, and can convert handwritten data to a text (character code). Handwritten data 1 and handwritten data 2 in FIG. 2 are converted to texts, and handwritten data 3 is unconverted handwritten data.

(3) The display apparatus according to an embodiment of the present invention has, for each handwritten data, information indicating whether it is handwritten input originated data, and color information. The handwritten data 1 is handwritten input originated data and the color information is black. The handwritten data 2 is handwritten input originated data and the color information is red. The handwritten data 3 is handwritten input originated data and the color information is blue. Text (character code) converted from handwritten data, such as handwritten data 1 or handwritten data 2, also retains information indicating whether it is handwritten input originated data. Therefore, it is possible for the display apparatus to display using a line type corresponding to the indicated color when displaying the handwritten input originated data.

(4) When the display apparatus converts handwritten data into a PDF file, etc., the display apparatus sets the color information of handwritten data or text data according to the PDF format, and attaches information indicating handwritten input originated data and the color information as meta data. When the display apparatus reads this PDF file from a storage medium (USB memory, etc.), it is possible to display the handwritten input originated data with the line type corresponding to the color information based on the meta data. Any other apparatus ignores the meta data, and can display in color because the apparatus displays this PDF file as a normal PDF file. It should be noted that the meta data is data describing the meaning of the data. In other words, the meta data is data with information related to certain data. The meta data is not the data itself, but is data related to the data, and thus, it is called meta (higher level) data.

In the case where the display apparatus transmits handwritten input originated data to an external apparatus, the display apparatus converts the handwritten input originated data according to the type of the apparatus, and transmits the converted data. Examples of external apparatuses include the following.

- Black-and-white supporting apparatus (e.g., monochrome printer)
- Color supporting apparatus (e.g., color printer)
- Black-and-white highlighting supporting apparatus (e.g., display apparatus according to an embodiment of the present invention)

According to the above-described conversion, it is possible for the black-and-white supporting apparatus and the color supporting apparatus to display in black and white, or display in color without determining whether the data is the handwritten input originated data.

As described above, the display apparatus according to an embodiment of the present invention associates the handwritten input originated data with information indicating handwritten input originated data, and thus, it is possible to detect that the data is handwriting input originated data. According to the above, even in the case where the display apparatus 2 acquires a file from an external apparatus, when displaying the handwritten input originated data, it is possible to perform black-and-white highlighting based on the color information associated with the handwritten data. Further, in the case where handwritten input originated data is transmitted to an external apparatus, it is possible to display the data without determining whether the data is handwritten input originated data.

Terminology

Black-and-white supporting apparatus: an apparatus that can only output white or black or gray scale data. For example, an electronic paper, a monochrome printer, etc., are included. The black-and-white supporting apparatus may be an apparatus that does not support color. An electronic paper is also called an E-paper. The electronic paper is a generic term for a display that can display and erase data by electrical means, with a thickness of about 1/10 mm. A typical technique for realizing an electronic paper is microcapsule electrophoresis, referred to as E ink (registered trademark). Each microcapsule contains white particles and black particles, the white particles being positively charged and the black particles being negatively charged.

Color supporting apparatus: a color supporting apparatus is an apparatus that can output color data as well as black and white data. An apparatus with liquid crystal or an organic EL display, a color printer, etc., are included. A color supporting apparatus is also a black-and-white supporting apparatus.

Black-and-white highlighting supporting apparatus: a black-and-white highlighting supporting apparatus is an apparatus that can output only white or black or gray scale data, but is an apparatus that performs black-and-white highlighting, with respect to the handwritten input originated data, based on color information associated with the handwritten data. A display apparatus according to an embodiment of the present invention can be listed as a black-and-white highlighting supporting apparatus (an example of a specific display apparatus). It should be noted that the display apparatus is capable of receiving a handwritten input, and may be referred to as an input apparatus, or a handwritten input apparatus.

Stroke data is a freely handwritten line. The stroke data has a set of successive points and may be interpolated as necessary.

Handwritten input originated data refers to data entered through handwriting on a touch panel. The handwritten input originated data includes the data that remains as handwritten data after it is entered, and includes the data that is converted to text data. In addition, when data is obtained from an external apparatus, information indicating that the data is handwritten input originated data is not lost. The handwritten input originated data may include text data converted by character recognition, as well as data converted based on user operations such as stamps displayed as fixed characters or marks such as "completed" or "confidential", shapes such as circles and stars, straight lines, etc. In other words, the handwritten input-originated data is stroke data that is handwritten in a display apparatus or text data that is converted from the stroke data by handwriting recognition.

Data, which is not handwritten input originated data, refers to data other than those entered through handwriting on the touch panel. For example, it refers to image data, handwritten data or text data that is entered through an apparatus other than a black-and-white highlighting supporting apparatus. In other words, data, which is not handwritten input-originated data, is stroke data that is input by a PC, or the like, other than the display apparatus, or text data whose strokes are converted by handwriting recognition.

A ColorId is used to determine whether the data is handwritten input originated data. The ColorId is an identifier used for distinguishing between the data, which is handwritten input originated data, and the data, which is not handwritten input originated data. As an identifier, a terminal identifier, a model number (number for identifying the type of product), etc., may be used for the distinguishing.

Black-and-white highlighting of color information does not refer to merely converting colors into brightness or density, but refers to displaying the data in a manner in which different colors can be distinguished. It is preferable that the highlighting (emphasis) should reflect the nature of the color, such as alerting.

<Example of an Appearance of a Pen>

FIG. 3 is a drawing illustrating an example of a perspective view of a pen 2500. FIG. 3 illustrates an example of a multi-functional pen 2500. The pen 2500, which has a built-in power supply and can send instructions to a display apparatus 2, is called an active pen (a pen without a built-in power supply is called a passive pen). The pen 2500 of FIG. 3 has one physical switch on the tip of the pen, one physical switch on the bottom of the pen, and two physical switches on the side of the pen. The switch on the tip of the pen is for writing, the switch on the bottom of the pen is for erasing, and the switches on the side of the pen are for assigning user functions. In an embodiment of the present invention, the pen 2500 further includes a non-volatile memory that stores a pen ID that is unique to the other pens.

The operation procedure of the display apparatus 2 by the user can be reduced by using a pen with a switch. The pen with a switch mainly refers to an active pen. However, a passive pen with electromagnetic induction, which does not have a built-in power supply but generates power using an LC circuit, may also be included as the pen with a switch. An optical pen with a switch, an infrared pen with a switch, and a capacitance pen with a switch, are active pens.

It should be noted that it is assumed that the hardware configuration of the pen 2500 is the same as that of a general control method including a communication function and a microcomputer. The pen 2500 may be an electromagnetic induction type, an active electrostatic coupling type, or the like. In addition, the pen 2500 may have functions such as pen pressure detection, tilt detection, and hover function (indicating the cursor before the pen touches a touch panel).

<Overall Configuration of Apparatus>

An overall configuration of the display apparatus 2 according to an embodiment of the present invention will be described with reference to FIG. 4. FIG. 4 is a drawing illustrating an overall configuration diagram of a display apparatus 2. FIG. 4(*a*) illustrates a display apparatus 2 used as a horizontal electronic blackboard suspended on a wall as an example of a display apparatus 2.

As illustrated in FIG. 4(*a*), a display 220 as an example of a display apparatus is provided on top of the display apparatus 2. A user U can handwrite (also referred to as input or draw) a character, or the like, on the display 220 using the pen 2500.

FIG. 4(*a*) illustrates a display apparatus 2 used as a horizontal electronic blackboard suspended on a wall.

FIG. 4(*c*) shows a display apparatus 2 positioned (placed) flat on a table 230. Because the thickness of the display apparatus 2 is about 1 cm, it is not necessary to adjust the height of the desk even if it is placed flat on an ordinary desk. Also, the user can easily move the display apparatus 2.

It should be noted that the display apparatus 2 can automatically detect which position is used by using a tilt sensor.

<Hardware Configuration of Apparatus>

Next, the hardware configuration of the display apparatus 2 will be described with reference to FIG. 5. The display apparatus 2 has a configuration of an information processing apparatus or a computer as illustrated in the figure. FIG. 5 is a drawing illustrating an example of a hardware configuration of a display apparatus 2. As illustrated in FIG. 5, the display apparatus 2 includes a CPU (Central Processing Unit) 201, a ROM (Read Only Memory) 202, a RAM (Random Access Memory) 203, and an SSD (Solid State Drive) 204.

The CPU 201 controls overall operations of the display apparatus 2. The ROM 202 stores programs used to drive the CPU 201, such as the CPU 201 and the IPL (Initial Program Loader). The RAM 203 is used as a work area of the CPU 201. The SSD 204 stores various data items such as a program for the display apparatus 2.

Further, the display apparatus 2 includes a display controller 213, a touch sensor controller 215, a touch sensor 216, a display 220, a power switch 227, a tilt sensor 217, a serial interface 218, a speaker 219, a microphone 221, a wireless communication apparatus 222, an infrared I/F 223, a power control circuit 224, an AC adapter 225, and a battery 226.

The display controller 213 controls and manages the screen display to output an output image to the display 220, etc. The touch sensor 216 detects that a pen 2500, a hand of a user, or the like (the pen or the hand of a user serves as an input unit) is in contact with the display 220. Further, the touch sensor 216 receives a pen ID.

The touch sensor controller 215 controls the processing of the touch sensor 216. The touch sensor 216 inputs and detects coordinates. The method of inputting and detecting coordinates, for example, optically, is such that two light emitting and receiving apparatuses, which are located at both ends on an upper side of the display 220, emit a plurality of infrared rays in parallel to the display 220. The infrared rays are reflected by a reflection member provided around the display 220 so that the light emitting apparatuses receive the light that is returned on the same optical path as the light emitted by the light receiving element. The touch sensor 216 outputs position information of the infrared rays emitted by the two light emitting and receiving apparatuses blocked by an object to the touch sensor controller 215, and the touch sensor controller 215 identifies a coordinate position that is a contact position of the object. Further, the touch sensor controller 215 includes a communication unit 215*a*, and is capable of communicating with the pen 2500 via radio (wirelessly). For example, a commercial pen may be used when communicating in a standard such as Bluetooth (registered trademark). When one or more pens 2500 are registered in the communication unit 215*a* in advance, the user can communicate without performing the connection setting that causes the pen 2500 to communicate with the display apparatus 2.

The power switch 227 is a switch for switching ON/OFF of the power of the display apparatus 2. The tilt sensor 217 is a sensor that detects a tilt angle of the display apparatus 2. The tilt sensor 217 is mainly used to detect which of the installation states of FIG. 4(*a*), FIG. 4(*b*), and FIG. 4(*c*) is the installation state in which the display apparatus 2 is used, and thus, the thickness of characters, etc., can be automatically changed depending on the installation state.

The serial interface 218 is a communication interface with external apparatuses, such as a USB interface, a LAN interface, or the like. The serial interface 218 is used, for example, to input information from an external source. The speaker 219 is used for audio output, and the microphone 221 is used for audio input. The wireless communication apparatus 222 communicates with a terminal carried by a user and relays, for example, a connection to the Internet. The wireless communication apparatus 222 communicates via Wi-Fi, Bluetooth (registered trademark), or the like, but the communication standard may be any standard. The wireless communication apparatus 222 forms an access point. The terminal carried by the user can be connected to the access point when the user sets the SSID (Service Set Identifier) and password, which are obtained by the user, to the terminal.

It should be noted that it is preferable that the wireless communication apparatus 222 is provided with two access points.

(a) access point->Internet (b) access point->internal network->Internet

The access point (a) is for external users, and the external users cannot access the internal network via the access point (a) but can use the Internet. The access point (b) is for internal users, and the internal users can use the internal network, and can use the Internet via the access point (b).

The infrared I/F 223 detects an adjacent display apparatus 2. The infrared I/F 223 is capable of detecting only the adjacent display apparatus 2 by taking advantage of the straightness of the infrared rays. Preferably, the infrared I/F 223 is provided on each side of the display apparatus 2, and it is possible to detect in which direction of the display apparatus 2 the other display apparatus 2 is located. The adjacent display apparatus 2 can display handwritten information that has been handwritten in the past (handwritten information on another page, assuming that the size of the display 220 corresponds to one page).

The power control circuit 224 controls the AC adapter 225 and the battery 226 that are power sources for the display apparatus 2. The AC adapter 225 converts the alternating current shared by the commercial power supply to DC.

In the case where the display 220 is a so-called electronic paper, the display 220 consumes little or no power to maintain the image after it has been rendered, and thus, the display 220 can be driven by the battery 226. As a result, it is possible to use the display apparatus 2 for an application such as a digital signage even in a place where it is difficult to connect a power source, such as in an outdoor place.

Further, the display apparatus 2 includes a bus line 210. The bus line 210 is an address bus, a data bus, or the like for electrically connecting components such as the CPU 201 illustrated in FIG. 5.

It should be noted that the touch sensor 216 may be not limited to an optical type, but may be a touch panel having an electrostatic capacitance method in which a contact position is identified by detecting a change in capacitance. The touch sensor 216 may be a resistive film type touch panel that identifies a contact position by a voltage change of two resistive films facing each other. The touch sensor 216 may be an electromagnetic induction type touch panel that detects an electromagnetic induction caused by the contact of a contact object to the display unit, and that identifies a contact position. A variety of detection means may be used for the touch sensor 216. The touch sensor 216 may be of a method that does not require an electronic pen to detect the presence or absence of a touch by the tip of the pen. In this case, a fingertip or a pen-shaped bar can be used for touch operations. It should be noted that it is not required that the pen 2500 is a thin and long pen.

<Function of Apparatus>

Next, functions of the display apparatus 2 and the pen 2500 will be described with reference to FIGS. 6A and 6B. FIG. 6A is an example of a functional block diagram illustrating functions of the display apparatus 2 in a block shape. The display apparatus 2 includes a handwritten input unit 21, a display unit 22, a handwritten input display control unit 23, a candidate display timer control unit 24, a handwritten input storage unit 25, a handwriting recognition control unit 26, a handwriting recognition dictionary unit 27, a character string conversion control unit 28, a character string conversion dictionary unit 29, a predictive conversion control unit 30, a predictive conversion dictionary unit 31, an operation command recognition control unit 32, an operation command definition unit 33, a pen ID control data storage unit 36, a file transmission and reception control unit 37, a handwritten signature authentication control unit 38, and a handwritten signature data storage unit 39. Each function of the display apparatus 2 is a function or means implemented in which one of the components illustrated in FIG. 5 is operated by instructions from the CPU 201 according to a program read from the SSD 204 to the RAM 203.

The handwritten input unit 21 is implemented by a touch sensor 216 or the like and receives handwriting input from a user and receives a pen ID. The handwritten input unit 21 converts a pen input d1 of the user into pen operation data d2 (pen-up, pen-down, or pen-coordinate data) with the pen ID, and transmits the converted data to the handwritten input display control unit 23. The pen coordinate data is transmitted periodically as discrete values, and coordinates between discrete values are calculated by complementary calculation.

The display unit 22 is implemented by a display 220 or the like to display a handwritten object or an operation menu. The display unit 22 converts drawing data d3, which is written in the video memory by the handwritten input display control unit 23, into data corresponding to the characteristics of the display 220 and transmits the converted data to the display 220.

The handwritten input display control unit 23 performs overall control of handwritten input and display. The handwritten input display control unit 23 processes pen operation data d2 from the handwritten input unit 21 and displays the processed data by transmitting it to the display unit 22. The processing of the pen operation data d2 and the display of strokes will be described in detail with reference to FIG. 30 to FIG. 37 below.

The candidate display timer control unit 24 is a display control timer of selectable candidates. The candidate display timer control unit 24 generates a timing for starting or stopping the timer to start the display of the selectable candidates and to erase the display. The selectable candidates are handwriting recognition character string/language-wise character string candidates, converted character string candidates, character string/predictive conversion candidates, and operation command candidates, which are selectably displayed in an operation guide that will be described later. The candidate display timer control unit 24 receives a timer start request d4 (or a timer stop request) from the handwritten input display control unit 23 and transmits a timeout event d5 to the handwritten input display control unit 23.

The handwritten input storage unit 25 has a storage function for storing user data (handwritten object/character string object). The handwritten input storage unit 25 receives user data d6-1 from the handwritten input display control unit 23 and stores the data in the handwritten input storage unit 25. The handwritten input storage unit 25 receives an acquisition request d6-2 from the handwriting input display control unit 23 and transmits the user data d7 stored in the handwritten input storage unit 25. The handwritten input storage unit 25 transmits position information d36 of a determined object to the operation command recognition control unit 32.

The handwriting recognition control unit 26 is a recognition engine for performing on-line handwriting recognition. Unlike a typical OCR (Optical Character Reader), in parallel with pen operations by the user, characters (not only in Japanese but also in English and in other languages), numbers, symbols (%, $, &, etc.), and graphics (lines, circles, triangles, etc.) are recognized. Various algorithms have been devised for recognizing methods, but in an embodiment of the present invention, details are omitted as well known techniques are available.

The handwriting recognition control unit 26 receives pen operation data d8-1 from the handwritten input display control unit 23 and performs handwriting recognition to retain handwriting recognition character string candidates. Further, the handwriting recognition control unit 26 retains language-wise character string candidates converted from handwriting recognition character string candidates d12 using the handwriting recognition dictionary unit 27. Separately, when an acquisition request d8-2 is received from the handwritten input display control unit 23, the handwriting recognition control unit 26 transmits the retained handwriting recognition character string candidates and the language-wise character string candidates d9 to the handwritten input display control unit 23.

The handwriting recognition dictionary unit 27 is dictionary data for the language conversion of the handwriting recognition. The handwriting recognition dictionary unit 27 receives handwriting recognition character string candidates d12 from the handwriting recognition control unit 26, converts the handwriting recognition character string candidates into language character string candidates d13 that are linguistically appropriate, and transmits the converted candidates to the handwriting recognition control unit 26. For example, in the case of Japanese, a "hiragana" character is converted into a "kanji" character or a "katakana" character.

The character string conversion control unit 28 controls the conversion of the converted character string candidates into character strings. Conversion character strings are character strings that are likely to be generated including handwriting recognition character strings or language-wise character strings. The character string conversion control unit 28 receives the handwriting recognition character strings and the language-wise character string candidates d11 from the handwriting recognition control unit 26, converts them into converted character string candidates using the character string conversion dictionary unit 29, and retains the converted candidates. When an acquisition request d14 is separately received from the handwritten input display control unit 23, the character string conversion control unit 28 transmits the retained converted character string candidates d15 to the handwritten input display control unit 23.

The character string conversion dictionary unit 29 is dictionary data for character string conversion. The character string conversion dictionary unit 29 receives the handwriting recognition character strings and the language-wise character string candidates d17 from the character string conversion control unit 28 and transmits the converted character string candidates d18 to the character string conversion control unit 28.

The predictive conversion control unit 30 receives the handwriting recognition character strings and the language-wise character string candidates d10 from the handwriting recognition control unit 26, and receives the converted character string candidates d16 from the character string conversion control unit 28. The predictive conversion control unit 30 converts each of the handwriting recognition character strings, the language-wise character string candidates d10, and the converted character string candidates d16 into predictive character string candidates using the predictive conversion dictionary unit 31. The predictive conversion character strings are character strings that are likely to be generated including the handwriting recognition character strings, the language-wise character strings or converted character strings. When an acquisition request d19 is separately received from the handwritten input display control unit 23, the predictive conversion control unit 30 transmits the predictive character string candidates d20 to the handwritten input display control unit 23.

The predictive conversion dictionary unit 31 is dictionary data for the predictive conversion. The predictive conversion dictionary unit 31 receives the handwriting recognition character strings, the language-wise character string candidates, and the converted character string candidates d21 from the predictive conversion control unit 30, and transmits the predictive character string candidates d22 to the predictive conversion control unit 30.

The operation command recognition control unit 32 receives the handwriting recognition character strings and the language-wise character string candidates d30 from the handwriting recognition control unit 26 and receives the converted character string candidates d28 from the character string conversion control unit 28. The operation command recognition control unit 32 receives the predictive character string candidates d29 from the predictive conversion control unit 30. Further, the operation command recognition control unit 32 transmits an operation command conversion request d26 to the operation command definition unit 33 for each of the handwriting recognition character strings, the language-wise character string candidates d30, the converted character string candidate d28, and the predictive character string candidates d29, and receives operation command candidates d27 from the operation command definition unit 33. The operation command recognition and control unit 32 retains the operation command candidates d27.

When the operation command conversion request d26 is partially matched with operation command definitions, the operation command definition unit 33 transmits the operation command candidates d27 to the operation command recognition control unit 32.

The operation command recognition control unit 32 receives pen operation data d24-1 from the handwritten input display control unit 23. The operation command recognition control unit 32 transmits a position information acquisition request d23 of a determined object that has been input in the past to the handwritten input storage unit 25. The operation command recognition control unit 32 retains the determined object specified by the pen operation data as a selected object (including position information). The operation command recognition control unit 32 identifies: a position of the pen operation data d24-1; and a selected object that satisfies a predetermined criteria. When an acquisition request d24-2 is received from the handwritten input display control unit 23, the operation command recognition control unit 32 transmits retained operation command candidates and the identified selected object d25 to the handwritten input display control unit 23.

The pen ID control data storage unit 36 retains the pen ID control data (may be referred to as a storage unit). Before the handwritten input display control unit 23 transmits the display data to the display unit 22, the pen ID control data storage unit 36 transmits the pen ID control data d41 to the handwritten input display control unit 23. The handwritten input display control unit 23 draws display data under the operating conditions stored in association with the pen ID. Further, before the handwriting recognition control unit 26 performs the handwriting recognition, the pen ID control data storage unit 36 transmits angle information d44 of the pen ID control data to the handwriting recognition control unit 26, and the handwriting recognition control unit 26 rotates the stroke with the angle information stored in association with the pen ID to perform the handwriting recognition.

After the handwriting recognition control unit 26 recognizes a straight line for setting angle information when a user handwrites characters or the like, the handwriting recognition control unit 26 transmits the angle information d43 of the pen ID control data to the pen ID control data storage unit 36 to store the angle information d43 in association with the pen ID. After the operation command for setting the angle information is executed by the handwritten input display control unit 23, the handwritten input display control unit 23 transmits the pen ID control data d42 to the pen ID control data storage unit 36 and stores an execution result of the operation command (the angle information set by the user) in association with the pen ID. Thereafter, the stroke of the pen ID is rotated with the set angle information, and handwriting recognition is performed.

Further, the handwriting recognition control unit 26 transmits stroke data d49, which is rotated clockwise with the angle information of the pen ID control data, to the handwritten signature authentication control unit 38. According to the above, it becomes possible to perform authentication of handwritten signature regardless of the user's position (from which direction the signature is handwritten with reference to the display apparatus 2).

The handwritten signature data storage unit 39 retains handwritten signature data. When the handwritten signature data storage unit 39 receives a handwritten signature data acquisition request d45 from the handwritten signature control unit 38, the handwritten signature data storage unit 39 transmits the handwritten signature data d46 to the handwritten signature control unit 38. It is assumed that the format of the handwritten signature data depends on the algorithm for handwritten signature authentication of the handwritten signature control unit 38. Data of the handwritten signature data storage unit 39 will be described with reference to FIG. 15.

In response to receiving stroke data d49, which is rotated clockwise, from the handwriting recognition control unit 26, the handwriting signature authentication control unit 38 transmits a handwritten signature data acquisition request d45 to the handwritten signature data storage unit 39 and the handwritten signature data storage unit 39 transmits the handwriting signature data d46 to the handwritten signature authentication control unit 38.

The handwritten signature authentication control unit 38 authenticates the user based on the handwritten signature data. Various algorithms have been devised for user authentication based on handwritten signature data, but in an embodiment of the present invention, techniques, which can achieve a recognition rate that does not hinder practical use, are used. For example, a feature vector is generated, the feature vector comprising elements of coordinates, pen pressure, time for writing strokes, and the like, constituting the handwritten signature data, and then the feature vector of the registered signature data is compared with a feature vector of the user's handwritten name at the time of signing in, with appropriate weighting of the elements. When a matching degree of the feature vectors is greater than or equal to a threshold value, it is determined to be successful authentication. When the matching degree is lower than the threshold value, it is determined to be unsuccessful authentication.

The handwritten signature authentication control unit 38 retains an authentication result of the handwritten signature that is a comparison result of the stroke data d49 and the handwritten signature data d46, and transmits the retained authentication result d47 of the handwritten signature to the handwritten input display control unit 23 when an acquisition request d48 is received from the handwritten input display control unit 23. The authentication result of the handwritten signature includes: whether or not the stroke data d49 and the handwritten signature data d46 are considered to be matched; and if they appear to be matched, a SignatureId described later, which is associated with the matched handwritten signature data d46.

When the handwriting recognition result of the handwriting recognition control unit 26 conforms to an operation command indicating the execution of the handwritten signature registration, the handwriting recognition control unit 26 acquires data d52 that is input to the handwritten signature registration form (a frame in which the handwritten signature data is input as described below) from the handwritten input storage unit 25 and transmits handwritten signature data d50 of the data d52 to the handwritten signature authentication control unit 38. The handwritten signature authentication control unit 38 transmits the received handwritten signature data d50 to the handwritten signature data storage unit 39 to register.

When the handwriting recognition result of the handwriting recognition control unit 26 is an instruction to cancel the handwritten signature, the handwriting recognition control unit 26 transmits a deletion request d51 of the handwritten signature registration form to the handwritten input storage unit 25 and deletes the handwritten signature registration form from the handwritten input storage unit 25.

When the handwriting recognition result of the handwriting recognition control unit 26 is an instruction to execute the user-defined data change, the handwriting recognition control unit 26 acquires the data d53, which is input to the user-defined data change form, from the handwritten input storage unit 25. The handwriting recognition control unit 26 transmits a change value d54 of the data d53 to the operation command definition unit 33 to change the user-defined data. The user-defined data will be described in FIG. 14.

When the handwriting recognition result of the handwriting recognition control unit 26 is an instruction to cancel the user-defined data change form, the handwriting recognition control unit 26 transmits a deletion request d55 of the user-defined data change form to the handwritten input storage unit 25 and deletes the user-defined data change form from the handwritten input storage unit 25.

The file transmission and reception control unit 37 stores in a storage medium and acquires: handwritten input originated data; or data that is not the handwritten input originated data, and communicates with external apparatuses (print request, display request, etc.). The file transmission and reception control unit 37 receives an execution request d64 for transmitting and receiving a file, from the handwritten input display control unit 23. At the time of storing or printing of a file, the handwritten input display control unit 23 transmits a file transmission request to the file transmission and reception control unit 37, and the file transmission and reception control unit 37 transmits an acquisition request of the handwritten input storage data d61 to the handwritten input storage unit 25.

In the case where the data is not handwritten input originated data, the handwritten input storage unit 25 transmits the color information retained by the data as it is.

In the case where the data is handwritten input originated data, the handwritten input storage unit 25 transmits the handwritten input storage data d62, which is converted to color data, to the file transmission and reception control unit 37 when the transmission destination is a color supporting apparatus (for example, a color printer).

In the case where the data is handwritten input originated data, the handwritten input storage unit 25 transmits the handwritten input storage data d62, which is converted to black-and-white data, to the file transmission and reception control unit 37 when the transmission destination is a black-and-white supporting apparatus (for example, a monochrome printer). In some cases, the black-and-white supporting apparatus is capable of converting color data into gray-scale data, and thus, the data may be converted to color data to be transmitted.

In the case where the transmission destination is a black-and-white highlighting supporting apparatus, the handwritten input storage data, which will be described later, is transmitted to the file transmission and reception control unit 37.

Further, in the case where the handwritten input storage unit 25 stores the handwritten input originated data in a file, the handwritten input storage unit 25 converts the handwritten input storage data d62 to color data according to the file format and attaches the handwritten input storage data as meta-data of the file. When storing data that is not handwritten input originated data in a file, the handwritten input storage data d62 is converted to color data according to the file format.

Information indicating the color supporting apparatus or the black-and-white supporting apparatus is stored in, for example, a MIB (Management Information Base) retained by a network apparatus, and the file transmission and reception control unit 37 can perform determination by acquiring the MIB. Similarly, it is possible to determine whether the apparatus is a black-and-white highlighting supporting apparatus based on the model name disclosed by the MIB.

At the time of reading a file, the handwritten input display control unit 23 transmits a file list acquisition request d65 to the file transmission and reception control unit 37, the file transmission and reception control unit 37 transmits the file list acquisition request to an external apparatus and acquires the file list d63, and the file transmission and reception control unit 37 transmits the acquired file list d63 to the handwritten input display control unit 23. The handwritten input display control unit 23 displays a file list on the display unit 22, the handwritten input unit 21 transmits a display position of a selected file to the handwritten input display control unit 23, and the handwritten input display control unit 23 transmits a file reception request d66 to the file transmission and reception control unit 37. The file transmission and reception control unit 37 acquires a file from an external apparatus and transmits the file d67 to the handwritten input storage unit 25. The handwritten input storage unit 25 analyzes meta-data of the file to determine whether or not the data is handwritten input originated data. If the data is handwritten input originated data, the handwritten input storage unit 25 retrieves the handwritten input storage data (black-and-white highlighting/color conversion enabled data, which will be described below). The handwritten input storage unit 25 converts the handwritten input originated data into a black-and-white highlighting display data, and does not perform conversion if the data is not handwritten input originated data, and transmits the converted or unconverted data to the handwritten input display control unit 23 (displayed in gray scale). The handwritten input display control unit 23 transmits the display data of a handwritten object to the display unit 22.

FIG. 6B is a functional block diagram illustrating a function of the pen 2500 in a block shape. The pen 2500 includes a pen event transmission unit 41. The pen event transmission unit 41 transmits event data items of pen-up, pen-down, and pen-coordinate, with a pen-ID, to the display apparatus 2.

<Defined Control Data>

Next, defined control data used for various processes of the display apparatus 2 will be described with reference to FIG. 7. FIG. 7 illustrates an example of the defined control data. The example of FIG. 7 shows the control data for each control item.

The selectable candidate display timer 401 defines the time until the selectable candidates are displayed. This is used for not displaying the selectable candidates during the handwriting. In FIG. 7, it is meant that the selectable candidates are displayed if a pen-down event does not occur within a TimerValue of 500 ms from a pen-up event. The selectable candidate display timer 401 is retained by the candidate display timer control unit 24. The selectable candidate display timer 401 is used at the start of the selectable candidate display timer in step S18-2 of FIG. 32 below.

The selectable candidate erase timer 402 defines the time until the displayed selectable candidates are erased. This is used for erasing the selectable candidates in the case where the user does not select the selectable candidates. In FIG. 7, it is meant that the selectable candidate display data is deleted if the selectable candidates are not selected within a TimerValue of 5000 ms from the display of the selectable candidates. The selectable candidate erase timer 402 is retained by the candidate display timer control unit 24. The selectable candidate erase timer 402 is used at the start of the selectable candidate erase timer in step S64 of FIG. 34.

A handwritten object neighboring rectangular area 403 defines a rectangular area considered to be near the handwritten object. In an example of FIG. 7, the handwritten object neighboring rectangular area 403 is a rectangular area in which the rectangular area of the handwritten object is expanded horizontally by 50% of the estimated character size, and is expanded vertically by 80% of the estimated character size. In an example illustrated in FIG. 7, ratios with respect to the estimated character size are defined (in %). However, if the unit of "mm", or the like, is used, fixed lengths may be defined. The handwritten object neighboring rectangular area 403 is retained by the handwritten input storage unit 25. The estimated character size 405 is used in step S10 of FIG. 31 to determine the overlap status of the handwritten object neighboring rectangular area and the stroke rectangular area.

Estimated writing character direction;/character size determination condition 404 defines constants for determining a writing character direction and a character size measurement direction. In an example of FIG. 7, when the difference between the time when the first stroke is added in the handwritten object rectangular area and the time when the last stroke is added, is equal to or greater than MinTime=1000 [ms], and the difference between the horizontal distance (width) and the vertical distance (height) of the handwritten object rectangular area, is equal to or greater than MinDiff=10 [mm], and the horizontal distance is longer than the vertical distance, the estimated writing character direction is determined to be "horizontal" and the estimated character size is determined to be the vertical distance. If the horizontal distance is shorter than the vertical distance, the estimated writing character direction is determined to be "vertical" and the estimated character size is determined to be the horizontal distance. If the above-described conditions are not met, the estimated writing character direction is determined to be "horizontal" (DefaultDir="Horizontal") and the estimated character size is determined to be the longer distance between the horizontal distance and the vertical distance. The estimated writing character direction/character size determination condition 404 is retained by the handwritten input storage unit 25. The estimated writing character direction/character size determination condition 404 is used in the estimated writing character direction acquisition in step S59 of FIG. 34 and in the character string object font acquisition in step S81 of FIG. 37.

An Estimated character size 405 defines data for estimating the size of a character or the like. In an example of FIG. 7, it is meant that the estimated character size determined by the estimated writing character direction/character size determination condition 404 is compared with a smaller character 405*a* (hereinafter referred to as the minimum font size) of the estimated character size 405 and a larger character 405*c* (hereinafter referred to as the maximum font size). If the estimated character size is smaller than the minimum font size, the estimated character size is determined to be the minimum font size. If the estimated character size is larger than the maximum font size, the estimated character size is determined to be the maximum font size. Otherwise, the estimated character size is determined to be a character size of the medium character 405*b*. The estimated character size 405 is retained by the handwritten input storage unit 25. The estimated character size 405 is used in the character string object font acquisition in step S81 of FIG. 37.

Specifically, the handwritten input storage unit 25 uses the font of the closest size by comparing the estimated character size determined by the estimated writing character direction/character size determination condition 404 with the FontSize of the estimated character size 405. For example, when the estimated character size is equal to or less than 25 [mm] (FontSize of the smaller character), it is determined to be "smaller character". When the estimated character size is more than 25 mm and equal to or less than 50 mm (FontSize of the medium character), it is determined to be "medium character". When the estimated character size is greater than 100 mm (FontSize of the larger character), it is determined to be "larger character". The Mincho typeface 25 mm font is used for "smaller character" 405*a* (FontStyle="明朝体" FontSize="25 mm"), Mincho typeface 50 mm font is used for "medium character" 405*b* (FontStyle="明朝体" FontSize="50 mm"), and Gothic type 100 mm font is used for "larger character"405*c* (FontStyle="ゴシック体" FontSize="100 mm"). If it is needed to increase font sizes or style types, types of the estimated character size 405 may be increased.

An extending-over line determination condition 406 defines the data used to determine whether multiple objects have been selected. In an example of FIG. 7, in the case where the handwritten object is a single stroke, where the length of the long side of the handwritten object is equal to or greater than 100 [mm] (MinLenLongSide="100 mm"), where the length of the short side is equal to or less than 50 [mm] (MaxLenShortSide="50 mm"), and where there are objects whose overlap rates with the handwritten object in the long side direction and in the short side direction are equal to or greater than 80 [%] (MinOverLapRate="80%"), a plurality of objects are determined to be selected (selected objects). The extending-over line determination condition 406 is retained by the operation command recognition control unit 32. The extending-over line determination condition 406 is used in the determination of the selected object in step S50 of FIG. 33.

An enclosing line determination condition 407 defines the data used to determine whether an object is an enclosing line. In an example of FIG. 7, the operation command recognition control unit 32 determines, as a selected object, a determined object whose overlap rates with the handwritten object in the long side direction and the short side direction are equal to or greater than 100% (MinOverLapRate="100%"). The enclosing line determination condition 407 is retained by the operation command recognition control unit 32. The enclosing line determination condition 407 is used in the enclosing line determination of the determination of the selected object in step S50 of FIG. 33.

It should be noted that any one of the determination using the extending-over line determination condition 406 and the determination using the enclosing line determination condition 407 may be performed with priority. For example, when the extending-over line determination condition 406 is relaxed (when it is made easier to select the extending-over line) and the enclosing line determination condition 407 is strictly made (when condition values are set in such a way that only enclosing lines can be selected), the operation command recognition control unit 32 may give priority to the determination using the enclosing line determination condition 407.

<Example of Dictionary Data>

Dictionary data will be described with reference to FIGS. 8 to 10. FIG. 8 is an example of dictionary data of the handwriting recognition dictionary unit 27. FIG. 9 is an example of dictionary data of the character string conversion dictionary unit 29. FIG. 10 is an example of dictionary data of the predictive conversion dictionary unit 31. It should be noted that each of these dictionary data sets is used in steps S33 to S41 of FIG. 33.

In an embodiment of the present invention, a conversion result of the dictionary data of the handwriting recognition dictionary unit 27 of FIG. 8 is called language-wise character string candidates, a conversion result of the dictionary data of the character string conversion dictionary unit 29 of FIG. 9 is called converted character string candidates, and a conversion result of the dictionary data of the predictive conversion dictionary unit 31 of FIG. 10 is called predictive character string candidates. "Before conversion" of each dictionary data indicates the character string to be searched for in the dictionary data, "after conversion" indicates the character string after conversion corresponding to the character string to be searched for, and "probability" indicates the probability with which the converted character string is selected by the user. The probability is calculated from the result of the user selecting each character string in the past. Therefore, the probability may be calculated for each user. Various algorithms have been devised to calculate the probability, but the probability may be calculated in an appropriate way, and the details will be omitted. According to an embodiment of the present invention, character string candidates are displayed in the descending order of the selection probability according to the estimated writing character direction.

In the dictionary data of the handwriting recognition dictionary unit 27 of FIG. 8, the handwritten "ぎ" is converted to "議" with a probability of 0.55 and converted to "技" with a probability of 0.4. The handwritten "ぎし" is converted to "技士" with a probability of 0.5 and converted to "技師" with a probability of 0.45. The same applies to other character strings of "before conversion". In FIG. 8, the character strings of "before conversion" are handwritten "hiragana" characters. However, it is permissible to register a string other than "hiragana" characters as "before conversion".

In the dictionary data of the character string conversion dictionary unit 29 of FIG. 9, the character string "議" is converted to "議事録" with a probability of 0.95, and the character string "技" is converted to "技量試" with a probability of 0.85. The same applies to other character strings of "before conversion".

In the dictionary data of the predictive conversion dictionary unit 31 of FIG. 10, the character string "議事録" is converted to "議事録の送付先" with a probability of 0.65, and the character string "技量試" is converted to "技量試を決裁" with a probability of 0.75. In an example of FIG. 10, all of the character strings before conversion are "kanji" characters (Chinese characters), but a character other than the "kanji" characters may be registered.

It should be noted that the dictionary data is language independent, and any character string may be registered as "before conversion" and "after conversion".

<Operation Command Definition Data Retained by Operation Command Definition Unit>

Next, the operation command definition data used by the operation command recognition control unit 32 will be described with reference to FIGS. 11A and 11B. FIGS. 11A and 11B illustrate examples of the operation command definition data and system definition data retained by the operation command definition unit 33.

FIG. 11A illustrates an example of operation command definition data. The operation command definition data illustrated in FIG. 11A is an example of operation command definition data when there is no selected object selected by the handwritten object, and all operation commands that operate the display apparatus 2 are targeted (included). The operation commands of FIG. 11A include operation command names (Name), character strings that partially match character string candidates (String), and operation command character strings (Command) to be executed. "%~%" in the operation command character strings is a variable and is associated with the system definition data as illustrated in FIG. 11B. In other words, "%-%" is replaced by the system definition data illustrated in FIG. 11B.

First, the operation command definition data 701 indicates that the name of the operation command is "議事録テンプレートを読み込む" (Read the minutes template), the character string that partially matches the character string candidates is "議事録" (Meeting minutes) or "テンプレート" (Template), and the operation command character string to be executed is "ReadFile https://% username %: % password %@server.com/templates/minutes.pdf". In this example, system definition data "%~%" is included in the operation command character string to be executed, and "% username %" and "% password %" are replaced by system definition data items 704 and 705, respectively. Therefore, the final operation command character string is "ReadFile https://taro.tokkyo: x2PDHTyS@server.com/template/minutes.pdf", indicating that the file "https://taro.tokkyo: x2PDHTyS@server.com/minutes.pdf" is read (ReadFile).

The operation command definition data 702 indicates that the name of the operation command is "議事録フォルダーに保存する" (save in the minutes folder), that the character string that partially matches the character string candidates is "議事録" (minutes) or "保存" (save), and that the operation command character string to be executed is "WriteFile https:/% username %:% password %@server-.com/minutes/% machinename%_% yyyyy-mm-dd.pdf". Similar to the operation command definition data 701, "% username %", % password %", and "% machinename %" in the operation command character string are replaced by system definition data items 704-706, respectively. It should be noted that "% yyyy-mm-dd %" is to be replaced by the current date. For example, if the current date is Sep. 26, 2018, it will be replaced by "2018-09-26". The final operating command to be executed is "WriteFile https://taro.tokkyo: x2PDHTyS@server.com/minutes/% My-Machine_2018-09-26.pdf" and indicates that the minutes are to be saved in the file "https://taro.tokkyo: x2PDHTyS@server.com/% Minutes/% My-Machine_2018-09-26.pdf" (WriteFile).

The operation command definition data 703 indicates that the name of the operation command is "印刷する" (print), the character string that partially matches the character string candidates is " " (print) or "プリント" (print), and that the operation command character string to be executed is "PrintFile https:/% username %:% password %@server-.com/print/% machiname%-% yyyy-mm-dd%.pdf". When the operation command character strings are replaced as in operation command definition data 702, the final operation command to be executed is "PrintFile https://taro.tokkyo: x2PDHTyS@server.com/print/% My-Machine_2018-09-26.pdf", indicating that the file "https://taro.tokkyo: x2PDHTyS@server.com/print/% My-Machine_2018-09-26.pdf" is printed (PrintFile). That is, the file is transmitted to the server. The user allows the printer to communicate with the server, and the printer prints the contents of the file on the paper when the file is specified.

As described above, because the operation command definition data sets 701 to 703 can be identified from the character string candidates, the operation command can be displayed based on the handwriting of the user. Further, in the case where the user authentication is successful, "% username %", % password %", etc., in the operation command definition data, are replaced by the user information, and thus, the input and output of the file can be performed in association with the user.

In the case where the user's authentication is not performed (including the case of authentication failure if the user can still use the display apparatus 2 after the authentication failure), the display apparatus 2 uses preset "% username %", % password %", etc., data of the display apparatus 2. Accordingly, even without user authentication, the input and output of the file can be performed in association with the display apparatus 2.

Operation command definition data items 709, 710, 711, 720, 721, 722 are operation commands to change the pen color. The pen color is the color of handwritten data entered with the pen used by the user. The operation command names of the operation command definition data items 709, 710, 711, 720, 721, and 722 are "黒ペン" (black pen), "赤ペン" (red pen), "青ペン" (blue pen), "緑ペン" (green pen), "マゼンタペン" (magenta pen), and, "シアンペン" (cyan pen). For example, in the case of the "黒ペン" (black pen), the character string that is partially matched to the character string candidates is, "くろ" (kuro) or, "ペン" (pen), and if the user writes, "くろ" (kuro), only the "黒ペン" (black pen) is displayed in the operation command candidates. On the other hand, because the "ペン" (pen) corresponds to a character string (String) that partially matches the character string candidates in, "赤ペン" (red pen), etc., if the user writes, "ペン" (pen), the "黒ペン" (black pen) to, "シアンペン" (cyan pen) are displayed in the operation command candidates. When these operation commands are executed, as illustrated in FIGS. 17A and 17B, the control data associated with the pen ID of the pen 2500 used by the user is updated, and the color of the pen ID (ColorId of the pen ID control data) is changed.

The operation command definition data 719 indicates that the name of the operation command is "ファイルを読み込む" (Read a file); the character string (String) that matches the character string candidates is "ファイル" (File), "読み込む" (Read), "読み込み" (Read), and the operation command to be executed is "ReadFile https:/% username %:% password %@server.com/files/". Similar to the operation command definition data 702, replacing the system definition data items results in "ReadFile https://taro.tokkyo: x2PDHTyS@server.com/files/" and it is indicated that the file at this address (folder) is read (ReadFile). When this operation command is executed, the file selection window as illustrated in FIG. 12 is displayed by the display apparatus 2. The file selection window of FIG. 12 displays the first page of the files stored in this address (folder) using thumbnails.

FIG. 12 is an example of a file list display data displayed in the display unit 22 in step S94 (file list display data) of FIG. 37. FIG. 12(*a*) is created from the file list information obtained by the file list information acquisition in step S91 of FIG. 37. The file list information has a list of file addresses, and the display unit 22 extracts a file name and a thumbnail from each file address and displays them in ascending order of the file name. In FIG. 12, the display unit 22 displays four sets of thumbnail and file name, and displays sets of thumbnail and file name before and after the currently displayed sets of thumbnail and file name through operations of the left and right arrow icons 99. When the displayed thumbnail or file name is pressed by the pen, the display unit 22 deletes the screen of FIG. 12, and the file transmission and reception control unit 37 receives the file from the file address at which the pen is pressed.

When the closing button 98 in the upper right corner is pressed down with the pen, the display unit 22 deletes the screen of FIG. 12 and the execution of the operation command definition data 719 is canceled. When a PDF file of FIG. 12(*a*)(*d*) is selected, the file transmission and reception control unit 37 receives the PDF file and stores it in the handwritten input storage unit 25 for analysis. The file transmission and reception control unit 37 stores the text data (with meta-data) that is the handwritten input originated data as the handwritten input storage data (black-and-white highlighting data and color conversion enabled data) such as the handwritten input storage data items 801 to 805 of FIG. 16. Black-and-white highlighting and color conversion enabled data is data (mainly handwritten input originated data) that is capable of black-and-white highlighting and converting to color. Text data that is not handwritten input originated data is converted into handwritten input storage data such as handwritten input storage data 806 of FIG. 16 for storage and is displayed on the display 220.

When a JPG file of FIG. 12(*b*)(*c*) is selected, the file transmission and reception control unit 37 receives an image file and stores the file as the handwritten input storage data such as the handwritten input storage data 807 of FIG. 16 in the handwritten input storage unit 25 and displays the file on the display 220.

Referring back to FIGS. 11A and 11B, descriptions will be provided. The operation command definition data 712 is an operation command for aligning the orientation of the text data in a constant direction. The operation command name of the operation command definition data 712 is "テキスト方向を揃える" (align the text direction), the character string that partially matches the character string candidates is "テキスト" (Text), "向き" (Direction), or "方向" (Direction), and the operation command character string is "AlignText-Direction". Directions of the text data items written by a user in a direction other than vertical direction are various directions so that it is difficult to read everything from one direction. When the user executes the operation command definition data 712, the display apparatus 2 aligns the handwriting recognized character strings in the same direction (for example, in a vertical direction). In this case, aligning means rotating the text data with angular information.

The operation command definition data 713 indicates that the name of the operation command is "手書きサイン登録する" (register a handwritten signature)," that the character strings that partially match the character string candidates are "サイン" (signature) and "登録" (register), and that the operation command character string is "RegisterSignature." When the RegisterSignature command is executed, a handwritten signature registration form is added to the handwritten input storage unit 25 and the handwritten signature registration form is displayed on an operation screen 101. An example of the handwritten signature registration form will be described later (see FIG. 27).

The operation command definition data 714 indicates that the operation command name is "手書きサインインする" (sign-in with handwriting), that the character string that partially matches the character string candidates is "% signature %", and that the operation command is "Signin". Here, "% signature %" is a reserved word of system definition data and represents the fact that the registered handwritten signature data and the stroke data such as the user name are conformed (matched). In other words, when conformed (matched), the operation command 512 based on the operation command definition data 714 is displayed in an operation guide 500 (see FIG. 28).

When the Signin command is executed, AccountId of the user with a SignatureID of the conformed (matched) handwritten signature data is saved in the pen ID control data of the pen 2500 that is used for handwriting the stroke data, such as the user name. According to the above, the pen ID is associated with the AccountId, and the user defined data identified by the AccountId can be used by the display apparatus 2 (see FIG. 17A).

The operation command definition data 715 indicates that the operation command name is "手書きサインアウトする" (handwritten signing out), that the character string that partially matches the character string candidate is "サイン" (signature) or "アウト" (out), and that the operation command is "Signout". When the Signout command is executed, the AccountId is deleted from the pen ID control data of the pen 2500 that is operated for the handwritten signout. According to the above, the association between the pen ID and the AccountId is released, and the pen 2500 can be used by any user.

The operation command definition data 716 indicates that the name of the operation command is "設定変更する" (changes the setting), that the character string that partially matches the character string candidate is "設定" (set) or "変更" (change), and that the operation command is "ConfigSettings". When the ConfigSettings command is executed, the user defined data change form is added to the handwritten input storage unit 25 and the user defined data change form is displayed on the operation screen 101. The user defined data change form will be described later (see FIG. 29).

Next, the operation command definition data with a selected object, that is, the operation command definition data related to editing and modification will be described. FIG. 13 illustrates an example of the operation command definition data when there is a selected object selected by a handwritten object. The operation command definition data illustrated in FIG. 13 has an operation command name (Name), a group name (Group) of the operation command candidates, and an operation command character string (Command) to be executed.

The operation command definition data 707 defines the operation commands related to editing (Group="Edit"), and is an example of the definition data of the operation command names related to editing, "消去" (Erase), "移動" (Move), "回転" (Rotate), and "選択" (Select). In other words, these operation commands are displayed for the selected object, allowing the user to select a desired operation command.

The operation command definition data 708 defines the operation commands related to modification (Group="Decorate"), and is an example of definition data of the operation command names related to modification, "太く" (thick), "細く" (thin), "大きく" (large), "小さく" (small), and "下線" (underline). These operation commands are displayed for the selected object, allowing the user to select a desired operation command. In addition, color operation commands may be displayed.

Accordingly, in response to the user selecting a selected object by a handwritten object, the operation command definition data 707 and 708 are identified. Therefore, it is possible to display operation commands by handwriting by the user.

<User Defined Data>

Next, user defined data will be described with reference to FIG. 14. FIG. 14 illustrates an example of the user defined data retained by the operation command definition unit 33. The user defined data of FIG. 14 is an example of the defined data for a single user. "AccountId" in user defined data 717 is user identification information that is automatically assigned to each user; "AccountUsername" and "AccountPassword" are a user name and a password; "SignatureId" is identification information of handwritten signature data that is automatically assigned at the time of handwritten signature data registration; and "username," "password" and "machinename" are character strings that are set to replace system definition data items 704 to 706, respectively, in operation command definition data items 701 to 703. According to the above, it becomes possible to execute an operation command using user defined data.

When a user handwrites a user name, etc., to sign in, the handwritten input display control unit 23 utilizes the fact that the pen ID and AccountId are associated with the pen ID control data (see FIG. 17A). The handwritten input display control unit 23 uses character strings of user defined data having AccountId associated with the pen ID of the pen 2500 used by the user at the time of execution of the operation command. After the user has signed out, the character string of the system defined data is used when executing the operation command, even if the pen 2500, which the user has used for signing in, is used.

User defined data 718 is the data used in the user defined data change form. "Name" is the item names of "AccountUsername", "AccountPassword", "username", "password", or "machinename" of user defined data 717, and "data" is the change values of "AccountUsername", "AccountPassword", "username", "password", or "machinename". In this example, the data for "名前" (name) is "% AccountName %". The data for "パスワード" (password) is "% AccountPassword %". The data for "フォルダーユーザー名" (folder user name) is "% username %". The data for "フォルダーパスワード" (folder password) is "% password". The data for "フォルダーファイル名" (folder file name) is "% machinname". Each item corresponds to each item of the user defined data 717. These items entered in the user defined data change form are reflected in the user defined data 717.

It is also possible for the user to register the color definition data described below in the user defined data 717, allowing the user to enter with the color definition data as defined by the user.

<Handwritten Signature Data>

Next, handwritten signature data will be described with reference to FIG. 15. FIG. 15 illustrates an example of handwritten signature data retained by the handwritten signature data storage unit 39. The handwritten signature data has data representing the handwritten signature associated with SignatureId. The SignatureId is identification information automatically assigned at the time of handwritten signature data registration, and the Data is data calculated by the handwritten signature authentication algorithm of the handwritten signature authentication control unit 38 from the stroke data received from the handwritten signature authentication control unit 38.

<Handwritten Input Storage Data Saved by Handwritten Input Storage Unit>

Next, the handwritten input storage data will be described with reference to FIG. 16. FIG. 16 illustrates an example of the handwritten input storage data stored in the handwritten input storage unit 25. A line in FIG. 16 represents a stroke, a sentence (text), or an image.

In the case where Type is "stroke", one handwritten input storage data has items of DataId, Type, PenId, ColorId, Angle, StartPoint, StartTime, EndPoint, EndTime, Point, and Pressure. DataId is identification of a stroke. Type is a type of handwritten input storage data. Type includes stroke (Stroke), group (Group), test (Text), and image (Image). The type of handwritten input storage data items 801 and 802 is "Stroke". The type of handwritten input storage data 803 is "Group". The type of handwritten input storage data items 804, 805, and 806 is "Text". The type of handwritten input storage data 807 is "Image".

"Group" means to group other strokes, and the handwritten input storage data with "Group" type specifies a stroke to be grouped with DataId. PenId, ColorId, and Angle are copied from the pen ID control data described below. StartPoint is the starting coordinate of the stroke and StartTime is the starting time of the stroke. EndPoint is the end coordinate of the stroke and EndTime is the end time of the stroke. Point is a sequence of coordinates from the start to the end, and Pressure is pen pressures from the start to the end. As shown in Angle, it is indicated that the handwritten input storage data items 804 and 805 are rotated clockwise by 180 degrees and 270 degrees, respectively, before being handwriting-recognized.

Further, Handwritten input storage data items 804, 805, and 806, whose type is "Text", have Text, FontName, FontSize. FontName is a font name of the text, FontSize is a character size, and Text is a content (character code) of the text.

Handwritten input storage data items 801-805 may be attached as handwritten input originated data as meta-data when the file is saved. Accordingly, the display apparatus 2 can obtain the handwritten input storage data 801 to 805 when the file is read. When the display apparatus 2 transmits the handwritten input storage data to an external apparatus, the display apparatus 2 may convert the handwritten input storage data to color data when the external apparatus is a color supporting apparatus, and may either convert or not convert the handwritten input storage data to color data when the external apparatus is a black-and-white supporting apparatus. When transmitting to the black and white highlighting supporting apparatus, the display apparatus 2 only needs to transmit the handwritten input storage data. As described above, the handwritten input storage data items 801-805 correspond to both black-and-white highlighting and color conversion.

The handwritten input storage data items 801-805 are handwritten input originated data items, while handwritten input storage data items 806 and 807 are not handwritten input originated data items. These are files read by the file reading command. What is described above is determined according to whether or not a color value defined by the color definition data described below is registered or not in ColorId. For example, ColorId of the handwritten input storage data 801 is "Black", while ColorId of the handwritten input storage data 806 is "#e6001200". "#e6001200" is represented by "#" and hexadecimal 8 digits. R (red), G (green), B (blue), and A (transparency) are represented in each of the two digits.

As described above, with respect to the text data that is handwritten input originated data, ColorId contains a character string representing color information, but, with respect to the text data that is not handwritten input originated data, ColorId contains "#color values". As described above, it is possible for the handwritten input storage unit 25 to determine whether the data is handwriting input originated data or text data, by paying attention to ColorId.

The handwritten input storage unit 25 stores the color of the text data of the file read by the file transmission and reception control unit 37 as ColorId="#e6001200". Therefore, the handwritten input storage data 806 does not correspond to black-and-white highlighting, but only corresponds to color conversion.

The handwritten input display control unit 23 determines whether or not the data is handwritten input originated data by using the ColorId, and calculates and displays the grayscale value from the RGBA when the data is not handwritten input originated data. If the display apparatus 2 is a color supporting apparatus, the RGBA is displayed as it is.

The handwritten input storage data 807 is also an image file read from a storage medium by a file reading command. If Type is "Image", the handwritten input storage data 807 has FileId and FileName. FileId is a control number in the handwritten input storage data, and FileName is an original file name. For example, when the file transmission and reception control unit 37 reads the file "color_chart.pdf" of FIG. 12A, the text of RGBCMY at the center is stored in the form of the handwritten input storage data 806 and the ring-shaped color portion is stored in the form of the handwritten input storage data 807 in the handwritten input storage unit 25. It should be noted that handwritten input storage data with Type="Image" is naturally not handwritten input originated data. Therefore, the handwritten input display control unit 23 may determine whether the data is handwritten input based on Type.

In FIG. 16, the value of ColorId is used to determine whether or not the data is handwriting input originated data. However, the handwriting input display control unit 23 may record whether or not the data is handwriting input originated data by using a dedicated flag or the like. Further, this is limited to the handwritten data with Type="Stroke", but it is possible to determine whether or not the data is handwritten input originated data from the shape by using machine learning. In this case, the learning apparatus learns the correspondence between: the teacher data of whether or not the data is handwritten input originated data; and the shape of character, and outputs the handwritten input-originated data or not based on the shape of the input character.

In addition, the handwritten input originated data may include not only text data converted from the handwritten data based on the character recognition, but also data converted based on the user's operations, such as a stamp displayed as a fixed character or mark such as "済" (completed) or "秘" (secret), a shape such as a circle or a star, and a straight line.

The handwritten input storage data is used in step S7 (pen coordinates and reception time) of FIG. 30, step S88 (acquisition of handwritten input storage data) of FIG. 37, step S96 (file storage) of FIG. 37, and the like.

<Pen ID Control Data Stored in Pen ID Control Data Storage Unit>

Next, the pen ID control data will be described with reference to FIGS. 17A and 17B. FIGS. 17A and B are diagrams illustrating pen ID control data stored in a pen ID control data storage unit 36. The pen ID control data controls the color, etc. of handwritten input originated data. FIGS. 17A and 17B illustrate that there are four pens 2500. A single row of FIG. 17A indicates the pen ID control data of a single pen. Further, FIG. 17B is a diagram illustrating angle information when a user performs handwriting with respect to the display apparatus 2. Angle information may be an angle of direction in which the user resides, may be an angle of direction in which the pen is used, or may be an angle related to the rotation of the character handwritten by the user. With the predetermined direction of the display apparatus 2 (e.g., vertical direction) as 0 degrees (reference), the angular information of each user is 45 degrees, 90 degrees, 135 degrees, 180 degrees, 225 degrees, 270 degrees, and 315 degrees counterclockwise.

It should be noted that the angle information is not automatically determined by the user's position. Each user enters (specifies) the angle information. The resolution of the angular information that can be specified (45 degrees in FIGS. 17A and 17B) is only an example and may be smaller, such as 5 degrees to 30 degrees. It should be noted that it is understood that, if the characters are rotated at about 45 degrees, the user will be able to read them.

Pen ID control data includes PenId, ColorId, Angle and AccountId. AccountId is mapped to the pen used by the user for signing in. PenId is identification information stored in the pen 2500. ColorId indicates the color selected by the user using the pen 2500 (can be changed by the user). A color ID of the color definition data described later is set to ColorId. Details and thickness of each color are defined in the color definition data.

Angle is angle information of stroke that is set to the pen 2500 (the user can change it arbitrarily). In an example of FIG. 17A, the angle information for each pen is 0 degrees, 90 degrees, 180 degrees, and 270 degrees counterclockwise. AccountId is identification information of the user. By associating the pen ID with AccountId, it is possible to identify AccountId that is associated with the pen ID of the pen 2500 used by the user, and to execute the operation command using the user defined data.

The pen ID control data 901 is pen ID control data having Pen Id of 1, and the color is black (Black), the angle information is 0 degrees, and AccountId=1. The user of AccountId=1 is the user of user defined data 717 of FIG. 14. It is indicated that the user has handwritten the user's name with the pen with PenId=1 to sign in, and selected black. Pen ID control data without AccountId indicates a signed out state (not associated with the user).

The pen ID control data is used in step S5 (acquiring the pen ID control data) of FIG. 30, step S20 (storing the angle information of the pen ID control data) of FIG. 32, step S21 (acquiring the angle information of the pen ID control data) of FIG. 32, and step S60 (acquiring the pen ID control data) of FIG. 34.

<Color Definition Data>

FIG. 18 illustrates an example of color definition data. A single row of color definition data defines a single color. The color definition data defines the black-and-white highlighting display (the display method of the black-and-white pattern and width (pattern) and border (Edged)) on the black-and-white supporting apparatus with respect to ColorId, and the color conversion method (the display method of the color information (Color) and the width (Width) on the color supporting apparatus). Color information is represented by # and hexadecimal 8 digits. Color information represents #R (red), G (green), B (blue), and A (transparency) for every two digits, and px represents the pixel width. It should be noted that the color definition data is only applied to handwritten input originated data.

Color definition data 1001 is a definition example of ColorId being "Black". Pattern indicates the contents of the edge of the stroke or text. Edged indicates the presence or absence of edges. Color indicates RGBA color information. Width indicates line width. The color definition data 1001 indicates that the black-and-white highlighting supporting apparatus displays the handwritten input storage data with a solid black 5 pixel width+no edge, and that the color supporting apparatus displays with the black 0% transparency+5 pixel width. Similarly, the color definition data 1002 indicates that the black-and-white supporting apparatus displays with the solid black 3 pixel width+the black edge 1 pixel width from the outside to the black edge 1 pixel width+the white edge 2 pixel width, and that the color supporting apparatus displays with the red transparency 0%+5 pixel width of the color chart. The color definition data 1003 indicates that the black-and white highlighting supporting apparatus displays with a solid white 4 pixel width+black edge 1 pixel width, and that the color supporting apparatus displays with a blue 0% transparency+5 pixel width of the color chart. Color definition data 1004 indicates that the black-and-white highlighting supporting apparatus displays with black dot pattern 4 pixel width+black edge 1 pixel width, and that the color supporting apparatus displays with green transparency 0%+5 pixel width of the color chart. Color definition data 1005 indicates that the black-and-white highlighting supporting apparatus displays with a black upper right oblique pattern with white transparent 5 pixel width+no border, and that the color supporting apparatus displays with magenta with 60% transparency of the color chart. Color definition data 1006 indicates that the black-and-white highlighting supporting apparatus displays with the black horizontal line pattern with white transparent 5 pixel width, and that the color supporting apparatus displays with cyan transparency 60% of the color chart.

As described above, the color definition data includes black-and-white highlighting and color conversion enabled data. The color definition data is retained by the handwritten input storage unit 25 and is used to convert the handwritten input storage data.

After signing in, the user can preferably modify the color definition by defining the color definition data in the system definition data and in the user definition data and by adding a form of changing the color definition data to the user definition data.

FIGS. 19A and 19B illustrate data highlighted in black and white and data displayed in a color display method using the color definition data of FIG. 18. FIG. 19A is a representation in which black and white highlighting is displayed by a black-and-white highlighting supporting apparatus, and FIG. 19B is a representation in which a color supporting apparatus displays with conversion to color. FIG. 19B also illustrates black and white (hatching) for the sake of drawing convenience.

The symbol C1 indicates the text of "black", "red", "blue", "green", "magenta", and "cyan", which are handwritten input originated data items. The symbols C2 indicates strokes (handwritings) of "black", "red", "green", "magenta", and "cyan". The symbol C3 indicates spring-shaped strokes (handwritings). The symbol C4 indicates a donut-shaped color chart (image). The symbol C5 indicates RGBCMY (text that is not handwritten input originated data) inside the color chart. Under the symbol C3 is the text "Transparent" in black, which is handwritten input originated data.

It is assumed that the color chart of the symbol C4 and the text RGBCMY of the symbol C5 are data read from PDF files, and are not the handwritten input originated data. Accordingly, when it is described as the handwritten input storage data stored by the handwritten input storage unit 25 illustrated in FIG. 16, the strokes (handwritings) of the symbol C2 are stored as the handwritten input storage data items 801 and 802 of FIG. 16. The texts, which are handwritten input originated data items, of the symbol C1 are stored as the handwritten input storage data items 804 and 805 of FIG. 16. The text, which is not handwritten input originated data, of the symbol C5 is stored as the handwritten input storage data 806 of FIG. 16. The image of the symbol C4 is stored as the handwritten input storage data, such as the handwritten input storage data 807 of FIG. 16. Color information for each handwritten input storage data is defined by ColorId.

As can be seen from the comparison between FIG. 19A and FIG. 19B, the red text "R" inside the color chart of the symbol C10 of FIG. 19B is not handwritten input originated data. Therefore, the text "R" is displayed in gray scale in FIG. 19A. On the other hand, because the text "red" of the symbol C6 is handwritten input originated data, the text is highlighted in black and white in FIG. 19A.

Also, because magenta and cyan are transmissive colors, "Transparent" is visible in FIG. 19B. Also illustrated in FIG. 19A, magenta and cyan are transparent because of the use of a transparent pattern of white. As described above, the black-and-white highlighting supporting apparatus can indicate the color used for emphasis using black-and-white highlighting display, while the color device can convert the data into color and displays it.

The color definition data is used in step S6 (coordinate complement display data) of FIG. 30, step S82 (character string object display data) of FIG. 37, and step S100 (object display data) of FIG. 37.

<Pen Color Selection Button Definition Data>

Next, a method for selecting a pen color by a user will be described with reference to FIG. 20 and FIGS. 21A and 21B. FIG. 20 is an example of a pen color selection button definition data. The pen color selection button definition data is data that associates the pen button displayed on the display 220 with ColorId. The pen color selection button definition data has a Pen button ID (PenButtonId), an icon file (Icon), a color ID (ColorId), and a font name (FontName).

FIGS. 21A and B are examples of pen buttons 81-86 displayed on a display. The pen buttons 81-86 are displayed by the icon file described above. It is assumed that the pen buttons 81-86 are displayed from left to right in the ascending order of the pen button ID.

Pen color selection button definition data 1101 is the definition data of the pen button 81 displayed at the left-most position. When the user presses the pen button 81 with the pen 2500, the ColorId will be "Black" for the stroke data handwritten with the pen 2500, and the font for the text after handwriting recognition will be "Ming". The pen color selection button data 1102 is a pen button 82, which is displayed at second from the left. ColorId of the stroke data is "Red" and the font of the text after handwriting recognition is "pop." Similarly, pen color select button definition data items 1103-1106 define display positions, ColorIds, and fonts of text, of the pen buttons 83-86.

FIG. 21A illustrates an example of a text font display highlighted in black and white based on the pen color selection button definition data. A text font display example is a descriptive display, but may be displayed when the user hovers the pen 2500. FIG. 21B illustrates an example of a text font displayed in color by a color supporting apparatus based on the pen color selection button definition data (should be displayed in color, but is shown in black and white for the sake of drawing convenience).

As illustrated in FIG. 21A, not only by using black-and-white highlighting but also by using the change of font, the black-and-white highlighting display can be more effective.

After the handwritten signature authentication, the user can preferably modify the pen color selection button by defining the pen color selection button definition data in the system definition data and in the user definition data and by adding a form of changing the pen color selection button definition data to the user definition data. Therefore, the correspondence between ColorId and fonts is only an example.

The pen color selection button is used in step S6 (coordinate complement display data) of FIG. 30, step S82 (character string object display data) of FIG. 37, and step S100 (object display data) of FIG. 37.

<Display Example of Selectable Candidates>

FIG. 22 is an example of an operation guide and a selectable candidate 530 displayed by the operation guide. The user handwrites the handwritten object 504 (due to the timeout of the selectable candidate display timer) so that the operation guide 500 is displayed. The operation guide 500 includes an operation header 520, an operation command candidate 510, a handwriting recognition character string candidate 506, a converted character string candidate 507, a character string/predictive conversion candidate 508, and a handwritten object rectangular area display 503. The selectable candidate 530 includes the operation command candidate 510, the handwriting recognition character string candidate 506, the character string/predictive conversion candidate 508. In this example, no language-wise converted character string is displayed. However, there is a case in which a language-wise converted character string is displayed. The selectable candidate 530, excluding the operation command candidate 510, is called the character string candidate 539.

The operation header 520 has buttons 501, 509, 502, and 505. The button 501 receives a switching operation between the predictive conversion and "kana" conversion. In an example of FIG. 22, when a user presses a button 509 indicating "prediction," the handwritten input unit 21 receives the button and notifies the handwritten input display control unit 23 thereof, and the display unit 22 changes the display to the button 509 indicating "Kana." After the change, the character string candidates 539 are arranged in descending probability order of "Kana Conversion".

The button 502 operates the candidate display page. In an example of FIG. 22, the candidate display page has three pages, and currently, the first page is displayed. The button 505 receives "erase" of the operation guide 500. When the user presses the button 505, the handwritten input unit 21 receives the button and notifies the handwritten input display control unit 23 thereof, and the display unit 22 erases the display other than the handwritten object. The button 509 receives a collective display deletion. When the user presses the button 509, the handwritten input unit 21 receives the button. The handwritten input unit 21 notifies the handwritten input display control unit 23 thereof. The display unit 22 deletes all the displays illustrated in FIG. 22, including the handwritten object, allowing the user to rewrite handwriting from the beginning.

The handwritten object 504 is a letter "ぎ" that is handwritten by the user. A handwritten object rectangular area display 503 surrounding the handwritten object 504 is displayed. The displaying procedure will be described with reference to sequence diagrams of FIG. 30 to FIG. 37. In an example of FIG. 22, the handwritten object rectangular area display 503 is displayed in a dotted frame.

In each of the handwriting recognition character string candidate 506, the converted character string candidate 507, and the character string/predictive conversion candidate 508, character string candidates are arranged in probability descending order. The "ぎ" of the handwriting recognition character string candidate 506 is a candidate of the recognition result. In this example, the display apparatus 2 has correctly recognized the "ぎ".

The converted character string candidate 507 is a converted character string candidate(s) converted from a language-wise character string candidate. In this example, "技量試" is an abbreviation of "技術量産試作" (technical mass production trial). The character string/predictive conversion candidate 508 is a language-wise character string candidate or a predictive character string candidate converted from a converted character string candidate. In this example, "技量試を決裁" (decision on technical mass production trial) and "議事録の送付先" (transmission destination of meeting minutes) are displayed.

Operation command candidates 510 are operation command candidates selected based on the operation command definition data 701-703, 709-716 of FIG. 11A. In an example of FIG. 22, the initial letter of line "》" 511 indicates an operation command candidate. In FIG. 22, with respect to the "ぎ", which is the handwritten object 504, because there is no selected object, and the "議事録", which is a character string candidate of the "ぎ", is partially matched with the operation command definition data items 701 and 702 illustrated in FIG. 11A, they are displayed as operation command candidates 510.

When the user selects "議事録テンプレートを読み込む" (Read the minutes template), the operation command defined by the operation command definition data 701 is executed, and when the user selects "議事録フォルダーに保存する" (Save in the minutes folder), the operation command defined by the operation command definition data 702 is executed. As described above, the operation command candidates are displayed when the operation command definition data items including the converted character string are found. Therefore, they are not always displayed.

As illustrated in FIG. 22, the character string candidates and the operation command candidates are displayed at the same time (together), so that the user can select either the character string candidate or the operation command the user wishes to enter.

<Example of Specifying Selected Object>

In the display apparatus according to an embodiment of the present invention, it is possible for a user to specify an selected object by selecting it by handwriting. The selected object becomes a target of editing or modification.

FIGS. 23A-23C are drawings illustrating an example of specifying a selected object. In FIGS. 23A-23C, a black solid line is used for displaying a handwritten object 11, gray highlighting is used for displaying a handwritten object rectangular area 12, a black line is used for displaying a determined object 13, and a dotted line is used for displaying a selected object rectangular area 14. It should be noted that lowercase alphabets appended to the symbol is used to distinguish between them. Further, as a determination condition (whether or not a predetermined relationship exists) for determining a determined object as a selected object, an extending-over line determination condition 406 or an enclosing line determination condition 407 of the defined control data illustrated in FIG. 7 is used.

FIG. 23A illustrates an example in which two determined objects 13*a* and 13*b* written horizontally are specified by a user using an extending-over line (handwritten object 11*a*). In this example, a length H1, of the shorter side of the rectangular area 12*a*, and a length W1, of the longer side of the rectangular area 12*a*, satisfy the condition of the extending-over line determination condition 406, and an overlap rate with the determined objects 13*a* and 13*b* satisfies the condition of the extending-over line determination condition 406. Therefore, both determined objects 13*a* and 13*b* ("議事録" and "ぎじ") are specified as selected objects.

FIG. 23B is an example in which the user specifies a determined object 13*c* written horizontally using an enclosing line (handwritten object 11*b*). In this example, only the the determined object 13*c*, which is "議事録" (minutes)," in which the overlap rate of the determined object 13*c* and the handwritten object rectangular area 12*c* satisfies the condition of the enclosing line determination condition 407, is specified as the selected object.

FIG. 23C is an example in which a plurality of determined objects 13*d* and 13*e* written vertically are specified by a extending-over line (handwritten object 11*c*). In this example, as in FIG. 23A, the length H1, of the shorter side of the handwritten object rectangular area 12*d*, and the length W1, of the longer side of the handwritten object rectangular area 12*d*, satisfy the condition of the extending-over line determination condition 406, and the overlap rates of the two determined objects 13*d* and 13*e* ("議事録" and "ぎじ"), respectively, satisfies the condition of the extending-over line determination condition 406. Therefore, both determined objects 13*d* and 13*e* ("議事録" and "ぎじ") are specified as selected objects.

FIG. 23D is an example in which the user specifies a determined object 13*f* written vertically using an enclosing line (handwritten object 11*d*). In this example, as in FIG. 23B, only the determined object 13*f* of "議事録" is specified as the selected object.

<Display Example of Operation Command Candidate>

FIGS. 24A and 24B illustrates a display example of operation command candidates based on the operation command definition data when the handwritten object is present, illustrated in FIG. 13. FIG. 24A is an operation command related to editing, and FIG. 24B is an operation command related to modification. FIG. 24A illustrates an example in which a selected object is specified using a handwritten object 11*a* in FIG. 23A.

As illustrated in FIGS. 24A and 24B, a main menu 550 includes operation command candidates that are displayed following the initial letter of line "》" 511. The main menu 550 displays the last executed operation command name or the first operation command name in the operation command definition data. The first line's initial character "》" 511*a* indicates an operation command candidate related to editing, and the second line's initial character "》" 511*b* indicates an operation command candidate related to modification.

"〉" 512 at the end of the line indicates that there is a sub-menu (an example of a sub-menu button). In line 1, "〉" 512*a* displays a sub-menu (last selected) that is an operation command related to editing. In line 2, "〉" 512*b* displays a remaining sub-menu that is an operation command candidates related to modification. When the user presses "〉" 512, a sub-menu 560 appears to the right. The sub-menu 560 displays all the operation commands defined in the operation command definition data. In a display example of FIG. 24A, the sub-menu 560 corresponding to the first line "〉" 512*a* is displayed when the main menu is displayed. The sub-menu 560 may be displayed by the pressing of the "〉" 512*a* button on the first line.

When the user presses any of the operation command names with a pen, the handwritten input display control unit 23 executes the command of the operation command definition data associated with the operation command name for the selected object. In other words, "Delete" is executed when "消去" 521 is selected, "Move" is executed when "移動" 522 is selected, "Rotate" is executed when "回転" 523 is selected, and "Select" is executed when "選択" 524 is selected.

For example, if the user presses "〉消去" 521 with a pen, the "議事録" and "ぎじ" can be deleted, and if "移動" 522, "回転" 523, and "選択" 524 are pressed, a bounding box (circumscribed rectangle of the selected object) is displayed. When the user presses "移動" 522 or "回転" 523, the bounding box can be moved or rotated by dragging the pen. When the user presses "選択" 524, other bounding box operations can be performed.

Character string candidates other than the operation command candidates "⟶" 541, "↘" 542, "~" 543, "→" 544 and "⇒" 545 are the recognition results of the extending-over line (handwritten object 11*a*). If the user intends to enter the character string instead of the operation command, the character string candidate can be selected.

In FIG. 24B, a sub-menu of FIG. 24B is displayed by pressing the "〉" 512*b* on the second line. In a display example of FIG. 24B, the main menu 550 and the sub menu 560 are shown at the same time as in FIG. 24A. When "太く" (thick) 531 is selected, the handwritten input display control unit 23 executes "Thick" on the selected object based on the operation command definition data of FIG. 13. When "細く" (thin) 532 is selected, the handwritten input display control unit 23 executes "Thin" on the selected object. When "大きく" (large) 533 is selected, the handwritten input display control unit 23 executes "Large" on the selected object. When "小さく" (small) 534 is selected, the handwritten input display control unit 23 executes "Small" on the selected object. When "下線" (underline) 535 is selected, the handwritten input display control unit 23 executes "Underline" on the selected object.

Further, fixed values are defined separately for: how thicken is to be achieved when "太く" (thick) 531 is selected; how thin is to be achieved when "細く" (thin) 532 is selected; how large is to be achieved when "大きく" (large) 533 is selected; how small is to be achieved when "小さく" (small) 534 is selected; line type when "下線" (underline) 535 is selected, and the like. Alternatively, when the sub-menu of FIG. 24B is selected, a selection menu may be opened to allow the user to adjust the values.

When the user presses the "太く" (thick) 531 with a pen, the handwritten input display control unit 23 thickens the lines constituting the determined objects 13*a* and 13*b* ("議事録" and "ぎじ"). When the user presses the "細く" (thin) 532 with a pen, the handwritten input display control unit 23 can narrow the lines constituting the determined objects 13*a* and 13*b* ("議事録" and "ぎじ"). When the user presses the "大きく" (large) 533 with a pen, the handwritten input display control unit 23 can increase the size. When the user presses down the "小さく" (small) 534 with a pen, the handwritten input display control unit 23 can reduce the size. When the user presses the "下線" (underline) 535 with a pen, the handwritten input display control unit 23 can add underlines.

FIGS. 25A and 25B illustrate a display example of operation command candidates based on the operation command definition data when the handwritten object is present, illustrated in FIG. 13. The difference from FIGS. 24A and 24B is that FIGS. 25A and 25B illustrate an example in which a selected object is specified by the handwritten object 11*b* (enclosing line) of FIG. 23B. As can be seen from the comparison of FIGS. 24A-24B and FIGS. 25A-25B, there is no difference in the displayed candidate operation commands depending on whether the handwritten object is an extending-over line or an enclosing line. This is because, when a selected object is specified, the handwritten input display control unit 23 displays the operation command candidates on the display unit 22. However, the handwriting input display control unit 23 may change the operation command candidates in accordance with the handwriting object by recognizing the handwritten object. In this case, the operation command definition data as shown in FIG. 13 is associated with the recognized handwritten object ("⟶", "○", etc.).

In FIGS. 25A-25B, "○" 551, "∞" 552, "0" 553, "00" 554, and "ロ" 555, which are character string candidates other than the operation command candidates, are the recognition results of the enclosing line (handwritten object 11*b*), and the character string candidate can be selected if the user intends to enter the character string instead of the operation command.

<Example of Input of Angle Information>

Next, a method for entering angle information will be described with reference to FIGS. 26A-26C. FIGS. 26A-26C are examples of a drawing illustrating an input method of angle information. FIGS. 26A-26C illustrate a case in which the user present in the 3 o'clock direction of the display apparatus 2 inputs the angle information. Because characters handwritten from the 3 o'clock direction are correctly recognized when they are rotated 90 degrees clockwise, it is preferable that 90 degrees angle information is entered.

FIG. 26A shows a state in which the operation guide 500 is displayed because a user present in the three o'clock direction of the display apparatus 2 handwrites "ぎ" in a state in which the angle information of the pen ID control data is 0 degrees (initial value). Because the display apparatus 2 recognizes a character "ぎ" that is handwritten from the 3 o'clock direction using angle information remaining at 0 degrees, a selectable candidate 530 that is different from the expectation is displayed.

When entering the angle information, the user handwrites a straight line from top to bottom as seen by the user in the operating guide 500. FIG. 26B illustrates an example of such a straight line 521. A counterclockwise angle α of the strait line 521, which is formed with reference to the 6 o'clock direction corresponding to the angle information of 0 degrees, is the angle information. In other words, a counterclockwise angle α, which is formed between the line 522 that is drawn from a starting point S downwards in the 6 o'clock direction, and the straight line 521 entered by the user, is the angle information. In a simple expression, the direction of the end point of the line 521 is the angular information. Therefore, the angle information entered by the user in FIG. 26B is 90 degrees.

It should be noted that, with respect to a method for detecting a straight line, for example, the coordinates from the starting point S to the end point E are converted into a straight line by the least squares method, and obtained correlation coefficient is compared with a threshold value to determine whether or not the straight line is used.

Immediately after the user starts writing the straight line 521 (immediately after the pen 2500 touches the starting point S of the straight line 521), the display apparatus 2 erases the operation guide 500. Immediately after the writing of the straight line 521 is completed (immediately after the pen 2500 is separated from the end point E of the straight line 521), the display apparatus 2 searches for the closest value of the above-described angle α from 45 degrees, 90 degrees, 135 degrees, 180 degrees, 215 degrees, 270 degrees, 315 degrees, and 360 degrees, and determines the value as the angle information. The angle α itself may be the angle information. The determined angle information is set to "Angle" of the pen ID control data. The pen event transmission unit 41 of the pen 2500 transmits the pen ID to the display apparatus 2 when the tip of the pen is pressed for handwriting or the like. Therefore, the display apparatus 2 can associate the angle information with the pen ID control data.

It should be noted that it is only the operation guide 500 that is capable of allowing the user to handwrite a strait line to enter the angle information. Accordingly, when the user handwrites the straight line outside the operation guide 500, the straight line is recognized as “1” or “ ⟶ ” or the like, and when the user handwrites the straight line inside the operation guide 500, the angle information can be entered. In other words, the handwriting recognition control unit 26 detects a straight line from a predetermined range and converts stroke data, which is handwritten outside the predetermined range, into text data.

FIG. 26C illustrates the operation guide 500 immediately after the operation of FIG. 26B. Because 90 degrees are set as the angle information (Angle) in the pen ID control data, the handwritten object (stroke data) is internally rotated in a clockwise direction by 90 degrees, handwriting recognition is performed for the rotated handwritten object, and the operation guide 500 is rotated in a counterclockwise direction by 90 degrees to be displayed. It should be noted that the angle information may be entered manually by the user from the menu.

<Example of Registering Handwritten Signature Data>

Next, an example of the registration of handwritten signature data will be described with reference to FIG. 27. FIG. 27 is a drawing illustrating a method of registering handwritten signature data. First, FIG. 27A is an example of a selectable candidate 530 displayed when the user handwrites “サイン” (signature). There are two operation commands 513 and 514 of “手書きサイン登録する” (perform handwritten signature registration) and “手書きサインアウトする” (perform handwritten sign out), and character string candidates “サイン” (signature), “サイン会” (signature session), and “サイン入り” (signed), displayed in the selectable candidate 530.” The two operation commands 513 and 514 are displayed because “サイン” is included in “String” of the operation command definition data 713 and 715 of FIGS. 11A and 11B.

When the user presses “手書きサイン登録する” (perform handwritten signature registration) with the pen 2500, the handwritten signature registration form 561 of FIG. 27B is added to the handwritten input storage unit 25 and is displayed on the operation screen 101. For example, the operation guide 500 of FIG. 27A is erased and the handwritten signature registration form 561 is displayed in the same location as the operation guide 500. The handwritten signature registration form 561 includes, from the top row, a name entry field 561*a*, a signature entry fields 561*b*-561*d*, and a registration confirmation field 561*e*. The user enters: a name text in the name entry field 561*a*; a first handwritten signature, a second handwritten signature, a third handwritten signature in the signature fields 561*b*-561*d*; and a check mark or a cancellation mark in the registration confirmation field 561*e*. The name text is a display name of the user, and is converted to text data. Three handwritten signatures are entered because the handwritten signature differs each time the user writes it. Each of the feature values of the handwritten signatures is registered base on the assumption that handwritten signature data items do not match perfectly.

It should be noted that, in general, the handwritten signature is a character related to the user, such as a name of the user, and may be, other than the name of the user, a number such as an employee number, a nick name, a portrait, or the like. In addition, the handwritten signature is not limited to a character related to the user, but may be some kind of handwritten object. For example, the handwritten signature may be a circle, a triangle, a square, a symbol, or combinations thereof. With respect to the handwritten signature, characteristic data is not limited to coordinates. Therefore, even if users with the same family name (e.g. Mr. Suzuki) both register the handwritten signature “すずき”, it is still possible to authenticate them correctly.

When the user enters handwritings in the handwritten signature registration form 561 according to the instructions, the handwritten signature registration form 561 should look as illustrated in FIG. 27C. When the user handwrites the “check mark” in the registration confirmation field 561*e*, the handwritten signature data is registered in the handwritten signature data storage unit 39 and the handwritten signature registration form 561 is erased. In response to the registration, a number is given to SignatureId. AccountId, to which a number is similarly given, and a name text in the name entry field 561*a* are associated with the SignatureID, and associated result is registered in the user definition data. When the user handwrites a user name and signs in, the SignatureId, which is associated with AccountId in the user defined data, is acquired, and is registered in the pen ID control data in association with the pen ID of the pen 2500 that is used in the handwritten sign-in. Thereafter, if the user uses the pen 2500, the pen ID is transmitted to the display apparatus 2, the pen ID control data can be used to identify the AccountId associated with the pen ID, and it is possible for the user to perform the operation command using the user defined data without intentional operation by the user.

If “×” is handwritten in the registration confirmation field 561*e*, the handwritten signature registration is canceled and the handwritten signature registration form 561 is erased. It should be noted that, if an error occurs in the registration, the error is displayed in the system reservation area of the operation screen 101.

As described above, the handwritten input display control unit 23 can receive the handwritten input without distinguishing between the handwritten input to the form and the handwritten input to other than the form.

<Example of Sign-In by Handwriting>

Next, a method for a user to sign in after the handwritten signature data is registered will be described with reference to FIG. 28. FIG. 28 is a drawing illustrating an example of an operation guide 500 displayed when a user handwrites “すずき” (suzuki) which is the handwritten signature data registered by the user. Since “すずき” (suzuki) is registered in the handwritten signature data storage unit 39 as handwritten signature data, the “すずき (suzuki)” matches the handwritten signature data. Accordingly, an operation command 512 of “手書きサインインする” (sign-in with handwriting) is displayed.

In addition, because the handwritten signature data is matched, SignatureId representing “すずき” (suzuki) is identified, and the user defined data with AccountId associated with the SignatureId is identified.

If the user selects the operation command 512, “手書きサインインする” (sign-in with handwriting), the AccountId of “すずき (suzuki)” is associated with the pen ID of the pen 2500 used by the user, and is added to the pen ID control data so that the user defined data of “すずき (suzuki)” can be used when the operation command is used.

The registration of the handwritten signature data using the handwritten signature registration form 561 of FIG. 28 is controlled in the same manner as a normal handwritten input of a character, etc. As a result, the handwritten signature registration form 561 is displayed on the same operation screen as the operation screen on which characters, etc., are handwritten. There is no difference in the handwritten operation inside and outside of the handwritten signature registration form 561 so that the user can complete the entry into the handwritten signature registration form 561 simply by handwriting into the areas delimited by ruled lines of the handwritten signature registration form 561.

<Example of Changing User Defined Data>

Next, a method of changing user defined data will be described with reference to FIGS. 29A-29B. FIGS. 29A-29B are drawings illustrating a method of changing user defined data. FIG. 29A is an example of the operation guide 500 displayed when a user handwrites "せ". In the operation command definition data 716 illustrated in FIGS. 11A and 11B, "設定" (setting) is defined in String, and the predictive character string of "せ" contains "設定" (setting). Therefore, the operation command "設定変更する" (Change the setting) is displayed.

When the user selects "設定変更する" (Change Settings) with the pen 2500 used for handwritten signin, the user's AccountId, which is associated with the pen ID of the pen 2500, is identified according to the pen ID control data. According to the above, the user defined data of the signed in user is identified, and the user defined data change form 562 of FIG. 29B is added to the handwritten input storage 25. The user defined data change form 562 is displayed on the operation screen 101. In examples of FIGS. 29A-29B, the user defined data change form 562 is created in accordance with the user defined data 718 of FIG. 14. The user defined data change form 562 includes a name field 562*a*, a password field 562*b*, a folder user name field 562*c*, a folder password field 562*d*, a folder file name field 562*e*, and a registration or cancellation field 562*f*.

It should be noted that, if the user has not signed in beforehand, the display apparatus 2 cannot identify the user's AccountId, resulting in an error, and an error message is displayed in the system reservation area of the operation screen 101.

The user handwrites a password in the password field 562*b* of the user defined data change form 562 of FIG. 29B. The user handwrites a folder user name in the folder user name field 562*c*. The user handwrites a folder password in the folder password field 562*d*. The user handwrites a folder file name in the folder file name field 562*e*. The user handwrites a check mark or "x" in the registration or cancellation field 562*f*. According to the above, the change of the user defined data is performed, and the user defined data change form 562 is erased.

As described above, it is possible for the user to cause the user defined data change form 562 to be displayed, by handwriting the stroke data used for displaying the user defined data change form 562, and it is possible to change the user defined data freely. The handwriting input display control unit 23 receives the handwritten input without distinguishing between the handwritten input in the form and the handwritten input outside the form.

It should be noted that an AccountUsername included in the user defined data is automatically displayed in the name field 562*a*. The user defined data change form 562 can be used not only for the change but also for the registration.

The change of the user defined data using the user defined data change form 562 of FIGS. 29A-29B is controlled in the same manner as normal handwritten input of characters. Therefore, the user defined data change form 562 is displayed on the same operation screen as the operation screen used for handwriting characters, etc. There is no difference between the handwriting operation inside of the user defined data change form 562 and the handwriting operation outside of the user defined data change form 562. The user can complete the input to the user defined data change form 562 simply by handwriting into the delimited areas of user defined data change form 562.

<Operation Procedure>

Operations of the display apparatus 2 will be described with reference to the above-described configurations and FIGS. 30 to 37. FIGS. 30 to 37 are sequence diagrams illustrating processes in which the display apparatus 2 displays character string candidates and operation command candidates. The processes illustrated in FIG. 30 start when the display apparatus 2 starts (when the application starts). It should be noted that, in FIGS. 30 to 37, the functions illustrated in FIGS. 6A and 6B are indicated by reference numerals for the sake of space convenience.

Before starting entering of handwritten data, the user has selected the pen buttons 81-86 (PenId has been identified). Therefore, a. The pen button ID, ColorID, and font are identified according to the pen color selection button definition data.

b. PenID and ColorID are registered in the pen ID control data.

S1: First, the handwritten input display control unit 23 transmits the start of the handwritten object to the handwritten input storage unit 25. The handwritten input storage unit 25 allocates a handwritten object area (a memory area for storing handwritten objects). The handwritten object area may be allocated after a user touches the handwritten input unit 21 with a pen.

S2: Next, the user touches the handwritten input unit 21 with a pen. The handwritten input unit 21 detects the pen-down and transmits it to the handwritten input display control unit 23.

S3: The handwritten input display control unit 23 transmits a stroke start to the handwritten input storage unit 25, and the handwritten input storage unit 25 allocates a stroke area.

S4: When the user moves the pen in contact with the handwritten input unit 21, the handwritten input unit 21 transmits pen coordinates to the handwritten input display control unit 23.

S5: The handwritten input display control unit 23 specifies the pen ID received from the pen 2500 at the same time as a coordinate input, and acquires the current pen ID control data stored in the pen ID control data storage unit 36. Because the pen ID is transmitted at the time of the coordinate input, the stroke and the pen ID are associated with each other. The pen ID control data storage unit 36 transmits the pen ID control data (ColorId (angle information is set to zero, no AccountId)) to the handwritten input display control unit 23. It should be noted that the angle information is still zero as an initial value. There is no AccountId because the user has not signed in.

S6: The handwritten input display control unit 23 transmits the pen coordinate complement display data (data interpolating discrete pen coordinates) to the display unit 22. The display unit 22 interpolates the pen coordinates with the pen coordinate complement display data, and identifies the line type and thickness from the color definition data based on the ColorId to display a stroke.

S7: The handwritten input display control unit 23 transmits pen coordinates, the reception time thereof, ColorId, and the angle information to the handwritten input storage unit 25. The handwritten input storage unit 25 adds the pen coordinates to the stroke. While the user is moving the pen, the handwritten input unit 21 repeats transmissions of the pen coordinates to the handwritten input display control unit 23 periodically. Processing of steps S4 to S7 is repeated until the pen-up.

S8: When the user releases the pen from the handwritten input unit 21, the handwritten input unit 21 transmits the pen-up to the handwritten input display control unit 23.

S9: The handwritten input display control unit 23 transmits the end of the stroke to the handwritten input storage unit 25, and the handwritten input storage unit 25 determines the pen coordinates of the stroke. After the determination of the pen coordinates of the stroke, the pen coordinates cannot be added to the stroke.

S10: Next, the handwritten input display control unit 23 transmits, to the handwritten input storage unit 25, an acquisition request for an overlap status between the handwritten object neighboring rectangular area and the stroke rectangular area based on the handwritten object neighboring rectangular area, The handwritten input unit 25 calculates the overlap status, and transmits the overlap status to the handwritten input display control unit 23.

Subsequent steps S11 to S17 are performed when the handwritten object neighboring rectangular area and the stroke rectangular area are not overlapped with each other.

S11: When the handwritten object neighboring rectangular area and the stroke rectangular area are not overlapped with each other, one handwritten object is determined. Therefore, the handwritten input display control unit 23 transmits a retained data clear to the handwriting recognition control unit 26.

S12 to S14: The handwriting recognition control unit 26 transmits the retained data clear to the character string conversion control unit 28, the predictive conversion control unit 30, and the operation command recognition control unit 32, respectively. The handwriting recognition control unit 26, the character string conversion control unit 28, the predictive conversion control unit 30, and the operation command recognition control unit 32 clear the data pertaining to the character string candidates and the operation command candidates that have been retained. It should be noted that, at the time of clearing, the last handwritten stroke is not added to the handwritten object.

S15: The handwritten input display control unit 23 transmits the completion of the handwritten object to the handwritten input storage unit 25. The handwritten input storage unit 25 determines the handwritten object. The determination of a handwritten object means that one handwritten object has been completed (no more strokes are added).

S16: The handwritten input display control unit 23 transmits a start of a handwritten object to the handwritten input storage unit 25. In preparation for the handwriting start (pen down) of the next handwritten object, the handwritten input storage unit 25 allocates a new handwritten object area.

S17: Next, the handwritten input display control unit 23 transmits a stroke addition with respect to the stroke completed in step S9 to the handwritten input storage unit 25. When steps S11 to S17 are executed, the additional stroke is the first stroke of the handwritten object, and the handwritten input storage unit 25 adds the stroke data to the handwritten object being started. If steps S11-S17 have not been performed, the additional strokes are added to the handwritten objects that has been being handwritten.

S18: Subsequently, the handwritten input display control unit 23 transmits the stroke addition to the handwriting recognition control unit 26. The handwriting recognition control unit 26 adds the stroke data to a stroke data retaining area (an area in which stroke data is temporarily stored) in which character string candidates are stored.

S19: The handwriting recognition control unit 26 performs gesture handwriting recognition on the stroke data retaining area. The gesture handwriting recognition refers to recognition of angle information from a straight line. It should be noted that, because the gesture handwriting recognition is performed inside the operation guide 500, the handwriting recognition control unit 26 detects a straight line inside the operation guide 500. The position information of the operation guide 500 is transmitted to the handwriting recognition control unit 26 in step S67, which will be described later.

S20: When a straight line in the operating guide 500 is detected, a counterclockwise angle α, which is formed between the line 522, which is drawn from a starting point of the straight line downwards to the 6 o'clock direction, and the straight line 521, which is entered by the user, is determined in units of 45 degrees. Further, the handwriting recognition control unit 26 stores the determined angle information in the pen ID control data storage unit 36 by associating the determined angle information with the pen ID included in the stroke data of the straight line 521. It should be noted that step S20 is performed when a straight line is detected in the operation guide 500.

S20-2: The handwriting recognition control unit 26 clears a selectable candidate display rectangle.

S21: Next, the handwriting recognition control unit 26 specifies the pen ID received from the handwritten input unit 21 and acquires the angle information of the current pen ID control data from the pen ID control data storage unit 36.

S22: The handwriting recognition control unit 26 rotates, in a clockwise direction with the acquired angle information, the stroke data in the stroke data retaining area.

S23: The handwriting recognition control unit 26 transmits the stroke data after rotation to the handwritten signature authentication control unit 38. As described above, the stroke data is always transmitted to the handwritten signature authentication control unit 38 under the condition in which it is unclear whether or not the stroke data is a handwritten signature.

S24: The handwritten signature authentication control unit 38 receives the stroke data and receives the registered handwritten signature data from the handwritten signature data storage unit 39. Further, the handwritten signature authentication control unit 38 compares the stroke data with the handwritten signature data (matching) and retains the handwritten signature authentication result so as to obtain the authentication result of the handwritten signature in step S61 in the later stage. When authentication is successful, AccountId is registered in the pen ID control data.

S25: Next, the handwriting recognition control unit 26 performs handwriting recognition on the stroke data, and performs processing of the form when the registration or cancellation field of the form is "check mark" or "×", and, otherwise, performs processing of the normal handwriting recognition.

S26: When the registration or cancellation field of the handwritten signature data registration form is a "check mark," the handwriting recognition control unit 26 transmits the handwritten signature data (the stroke data) input by the user for the handwritten signature registration form to the handwritten signature authentication control unit 38. The handwritten signature registration form is generated in the handwritten input storage unit 25 by the handwritten input display control unit 23 in step S86, which will be described later.

S27: The handwritten signature authentication control unit 38 registers the received handwritten signature data (stroke data) in the handwritten signature data storage unit 39. According to the above, a number is given to SignatureId. The SignatureId is returned to the handwriting recognition control unit 26. When the SignatureId and the name entered in the name entry field 561*a* of the handwritten signature registration form 561 are not included in the user defined data, the handwriting recognition control unit 26 newly adds the user defined data. Further, the handwriting recognition control unit 26 assigns a number for AccountId and stores SignatureId in the user defined data. If the name entered in the name field 561*a* is included in the user defined data, the SignatureId is saved in the user defined data. This process associates AccountId with SignatureId. It should be noted that, when user defined data is newly added, other values are not set, but it is possible for the user to perform registration and change through the user defined data change form.

S28: The handwriting recognition control unit 26 deletes the handwritten signature registration form 561 from the handwritten input storage unit 25 upon registration of the handwritten signature data.

S29: When the registration or cancellation field of the user defined data change form is "check mark", the handwriting recognition control unit 26 transmits the change values, which are input to the user defined data change form 562, to the operation command definition unit 33. The user defined data change form 562 is generated by the handwritten input display control unit 23 in the handwritten input storage unit 25 in step S86, which will be described later.

S30: Upon execution of the user defined data change, the handwriting recognition control unit 26 deletes the user defined data change form 562 from the handwritten input storage unit 25.

S31: When the registration or cancellation field of the form added in step S86, which will be described later, is "×", the handwriting recognition control unit 26 deletes the form added in step S86 from the handwritten input storage unit 25.

S33: When it is not the form processing, the handwriting recognition control unit 26 transmits the handwriting recognition character string candidates, which is the execution result, to the handwriting recognition dictionary unit 27. The handwriting recognition dictionary unit 27 transmits language-wise character string candidates, which are linguistically assumed to be correct, to the handwriting recognition control unit 26.

S34: The handwriting recognition control unit 26 transmits the handwriting recognition character string candidate and the received language-wise character string candidates to the character string conversion control unit 28.

S35: The character string conversion control unit 28 transmits the handwriting recognition character string candidates and the language-wise character string candidates to the character string conversion dictionary unit 29. The character string conversion dictionary unit 29 transmits the converted character string candidates to the character string conversion control unit 28.

S36: The character string conversion control unit 28 transmits the received converted character string candidates to the predictive conversion control unit 30.

S37: The predictive conversion control unit 30 transmits the received converted character string candidates to the predictive conversion dictionary unit 31. The predictive conversion dictionary unit 31 transmits the predictive character string candidates to the predictive conversion control unit 30.

S38: The predictive conversion control unit 30 transmits the received predictive character string candidates to the operation command recognition control unit 32.

S39: The operation command recognition control unit 32 transmits the received predictive character string candidates to the operation command definition unit 33. The operation command definition unit 33 transmits operation command candidates to the operation command recognition control unit 32. Accordingly, it is possible for the operation command recognition control unit 32 to acquire the operation command candidates corresponding to the operation command definition data having a character string (String) matching the predictive string candidates.

Thereafter, the display apparatus 2 performs processing in the similar manner until the transmission of the operation command candidates described in steps S40 to S47.

S40: The character string conversion control unit 28 transmits the received converted character string candidates to the operation command recognition control unit 32.

S41: The operation command recognition control unit 32 transmits the received converted character string candidates to the operation command definition unit 33. The operation command definition unit 33 transmits the operation command candidates to the operation command recognition control unit 32. Accordingly, it is possible for the operation command recognition control unit 32 to acquire the operation command candidates corresponding to the operation command definition data having a character string (String) matching the converted character string candidates.

S42: The handwriting recognition control unit 26 transmits the handwriting recognition character string candidates and the language-wise character string candidates to the predictive conversion control unit 30.

S43: The predictive conversion control unit 30 transmits the handwriting recognition character string candidates and the received language-wise character string candidates to the predictive conversion dictionary unit 31. The predictive conversion dictionary unit 31 transmits the predictive character string candidates to the predictive conversion control unit 30.

S38: The predictive conversion control unit 30 transmits the received predictive character string candidates to the operation command recognition control unit 32.

S39: The operation command recognition control unit 32 transmits the received predictive character string candidates to the operation command definition unit 33. The operation command defining unit 33 transmits the operation command candidates to the operation command recognition control unit 32. Accordingly, it is possible for the operation command recognition control unit 32 to acquire the operation command candidates corresponding to the operation command definition data having a character string (String) matching the predictive string candidates.

S46: The handwriting recognition control unit 26 transmits the handwriting recognition character string candidates and the received language-wise character string candidates to the operation command recognition control unit 32.

S47: The operation command recognition control unit 32 transmits the handwriting recognition character string candidates and the received language-wise character string candidates to the operation command definition unit 33. The operation command defining unit 33 transmits the operation command candidates to the operation command recognition control unit 32. Accordingly, it is possible for the operation command recognition control unit 32 to acquire the operation command candidates corresponding to the operation command definition data having a character string (String) matching the language-wise character string candidates.

S48: Next, the handwriting recognition control unit 26 transmits the stroke addition to the operation command recognition control unit 32.

S49: The operation command recognition control unit 32 transmits a request for position information of the determined object to the handwritten input storage unit 25. The handwritten input storage unit 25 transmits the position information of the determined object to the operation command recognition control unit 32.

S50: The operation command recognition control unit 32 determines whether or not the position information of the stroke, which is received from the handwriting recognition control unit 26 in the stroke addition of step S48, is in a predetermined relationship with the position information of the determined object, which is received from the handwritten input storage unit 25, based on the extending-over line determination condition 406 and the enclosing line determination condition 407. According to the above, the operation command recognition control unit 32 determines the selected object. The operation command recognition control unit 32 stores, as a selected object, a determined object that can be determined to be selected. Further, in this case, because the selected object is identified, the operation command candidates related to input and output are acquired from the operation command definition unit 33.

Further, the handwriting recognition control unit 26, the character string conversion control unit 28, the predictive conversion control unit 30, and the operation command recognition control unit 32 retain: the handwriting recognition character string candidates; the language-wise character string candidates; the converted character string candidates; the predictive character string candidates; the operation command candidates; and the data related to the selected object, so that the data can be acquired in steps S55 to S58 of the subsequent stage, respectively.

S18-2: Right after transmitting the stroke addition to the handwriting recognition control unit 26 in step S18, the handwritten input display control unit 23 transmits the start of the selectable candidate display timer to the candidate display timer control unit 24. The candidate display timer control unit 24 starts the timer.

The subsequent steps S51-S53 are performed when a pen-down occurs before a certain period of time elapses (before the timer expires).

S51: When the user contacts the handwritten input unit 21 with a pen before the timer expires, the handwritten input unit 21 transmits a pen-down (the same event as in step S2) to the handwritten input display control unit 23.

S52: The handwritten input display control unit 23 transmits a stroke start (the same as in step S3) to the handwritten input storage unit 25. The subsequent sequence is the same as in step S3 and thereafter.

S53: Further, the handwritten input display control unit 23 transmits the selectable candidate display timer stop to the candidate display timer control unit 24. The candidate display timer control unit 24 stops the timer. This is because a pen-down was detected, and the timer is not necessary.

Steps S54-S103 are performed when there is no pen-down (before the timer times out) before a certain period of time has elapsed. Accordingly, the operation guide 500 illustrated in FIG. 22 is displayed.

S54: The candidate display timer control unit 24 transmits a timeout to the handwritten input display control unit 23 when the user does not contact the handwritten input unit 21 with a pen while the selectable candidate display timer is running.

S55: The handwritten input display control unit 23 transmits an acquisition of the handwriting recognition character string/language-wise character string candidates to the handwriting recognition control unit 26. The handwriting recognition control unit 26 transmits the currently retained handwriting recognition character string/language-wise character string candidates to the handwritten input display control unit 23.

S56: The handwritten input display control unit 23 transmits an acquisition of the converted character string candidates to the character string conversion control unit 28. The character string conversion control unit 28 transmits the currently retained converted character string candidates to the handwritten input display control unit 23.

S57: The handwritten input display control unit 23 transmits an acquisition of the predictive character string candidates to the predictive conversion control unit 30. The predictive conversion control unit 30 transmits the currently retained predictive character string candidates to the handwritten input display control unit 23.

S58: The handwritten input display control unit 23 transmits an acquisition of the operation command candidates to the operation command recognition control unit 32. The operation command recognition control unit 32 transmits the currently retained operation command candidates and the selected object to the handwritten input display control unit 23.

S59: Further, the handwritten input display control unit 23 transmits an acquisition of an estimated writing character direction to the handwritten input storage unit 25. The handwritten input storage unit 25 determines the estimated writing character direction from the stroke addition time, the horizontal distance, and the vertical distance of handwritten object rectangular area, and transmits the estimated writing direction to the handwritten input display control unit 23.

S60: Next, the handwritten input display control unit 23 specifies the pen ID received from the handwritten input unit 21 and acquires ColorId, AccountId, and angle information of the current pen ID control data from the pen ID control data storage unit 36.

S61: The handwritten input display control unit 23 acquires the authentication result of the handwritten signature from the handwritten signature authentication control unit 38. Accordingly, SignatureId of the user is acquired, and, when the operation command described below is executed, the pen ID control data is registered with the pen ID associated with AccountId. When the user signs in, the color definition data, which is associated with the user defined data identified by AccountId, is identified. The display apparatus 2 can display: the handwritten data in which the color information of the user defined data is highlighted in black and white; or the text data converted from the handwritten data.

S62: The handwritten input display control unit 23 produces the selectable candidate display data as shown in FIG. 22 from: the handwriting recognition character string candidates ("せ" in FIG. 22); the language-wise character string candidates (e.g., "議" not displayed in FIG. 22); the converted character string candidates ("議事録" and "技量試" in FIG. 22); the predictive character string candidates ("技量試を決済" and "議事録の送付先" in FIG. 22); the operation command candidates ("議事録テンプレ

ートを読み込む" and "議事録フォルダーに保存する" in FIG. 22); each selection probability; and the estimation writing character direction. Further, the handwritten input display control unit 23 rotates counterclockwise the selectable candidate display data (the operation guide 500) based on the angle information acquired in step S60, and transmits the rotated selectable candidate display data (the operation guide 500) to the display unit 22 to be displayed.

S63: Further, the handwritten input display control unit 23 rotates counterclockwise the rectangular area display data (a rectangular frame) (a handwritten object rectangular area display 503 in FIG. 22) of the handwritten object and the selected object with the angle information acquired in step S60 and transmits the rotated data to the display unit 22 to be displayed.

S64: The handwritten input display control unit 23 transmits the start of the selectable candidate display deletion timer to the candidate display timer control unit 24 in order to erase the selectable candidate display data after a certain time from the display. The candidate display timer control unit 24 starts the timer.

Steps S65 to S70 are performed when, while the selectable candidate deletion timer is running, the user erases the selectable candidate display that is displayed on the display unit 22, or when a change occurs in the handwritten object (that is, when a stroke of the handwritten object is added, deleted, moved, deformed or divided), or when a candidate is not selected before the timeout.

Further, steps S65-S67 are performed when the candidate display is deleted or a change in the handwritten object occurs.

S65: The handwriting input unit 21 transmits the selectable candidate display deletion or the occurrence of the change of the handwritten object to the handwritten input display control unit 23.

S66: The handwritten input display control unit 23 transmits a selectable candidate delete timer stop. The candidate display timer control unit 24 stops the timer. This is because the timer is not required because the handwritten object is operated within a certain period of time.

S67: The handwritten input display control unit 23 stores the position information of the operation guide 500 in the handwriting recognition control unit 26 so that the position information can be used in gesture determination of the gesture handwriting recognition of step S19. The positional information may be, for example, the coordinates of the upper left corner and the lower right corner or their equivalent coordinates. According to the above, the handwriting recognition control unit 26 can determine whether the straight line used for inputting the angle information is within the operation guide 500.

S69: The handwritten input display control unit 23 transmits the deletion of the selectable candidate display data to the display unit 22 to erase the display.

S70: The handwritten input display control unit 23 transmits the deletion of the rectangular area display data of the handwritten object and the selected object to the display unit 22 to erase the display. Therefore, if the display of the operation command candidate is deleted under conditions other than the selection of the operation command candidate, the display of the handwritten object is maintained.

S68: On the other hand, when no selectable candidate display deletion occurs or no handwritten object change occurs while the selectable candidate deletion timer is running (when the user did not perform the pen operation), the candidate display timer control unit 24 transmits the timeout to the handwritten input display control unit 23.

Similarly, after the timeout of the selectable candidate display deletion timer, the handwritten input display control unit 23 executes step S69 and step S70. This is because the selectable candidate display data and the rectangular area display data of the handwritten object and the selected object may be deleted after a certain period of time.

When the user selects a selectable candidate while the selectable candidate erase timer is running, steps S71-S103 are executed.

S71: When the user selects the selectable candidate while the selectable candidate erase timer is running, the handwritten input unit 21 transmits the candidate selection of the character string candidates or the operation command to the handwritten input display control unit 23.

S71-2: The handwritten input display control unit 23 transmits a stop of the selectable candidate display delete timer to the candidate display timer control unit 24. The candidate display timer control unit 24 stops the timer.

S72: Next, the handwriting input display control unit 23 transmits the retained data clear to the handwriting recognition control unit 26.

S73: The handwriting recognition control unit 26 transmits the retained data clear to the character string conversion control unit 28.

S74: The handwriting recognition control unit 26 transmits the retained data clear to the predictive conversion control unit 30.

S75: The handwriting recognition control unit 26 transmits the retained data clear to the operation command recognition control unit 32. The handwriting recognition control unit 26, the character string conversion control unit 28, the predictive conversion control unit 30, and the operation command recognition control unit 32 clear the data pertaining to the character string candidates and the operation command candidates that have been retained.

S76: Next, the handwritten input display control unit 23 transmits the deletion of the selectable candidate display data to the display unit 22 to erase the display.

S77: The handwritten input display control unit 23 transmits the deletion of the rectangular area display data of the handwritten object and the selected object to the display unit 22 to erase the display.

S78: The handwritten input display control unit 23 erases the display by transmitting the delete of the handwritten object display data and the delete of the pen coordinate complement display data, which is transmitted in step S6, to the display unit 22. This is because a character string candidate or an operation command candidate has been selected and the handwritten objects, etc., are not needed any more.

S79: The handwritten input display control unit 23 transmits the handwritten object deletion to the handwritten input storage unit 25.

When a character string candidate is selected, steps S80-S82 are executed.

S80: When a character string candidate is selected, the handwriting input display control unit 23 transmits the addition of the character string object to the handwritten input storage unit 25.

S81: Further, the handwritten input display control unit 23 transmits the character string object font acquisition to the handwritten input storage unit 25. The handwritten input storage unit 25 identifies a font associated with the PenId of the pen ID control data from the pen color selection button definition data, and transmits the estimated character size of the handwritten object to the handwritten input display control unit 23.

S82: Next, the handwritten input display control unit 23 transmits the character string object display data, which is displayed at the same position as the handwritten object, to the display unit 22 using the defined font received from the handwritten input storage unit 25, to display the character string object display data. The handwritten input display control unit 23 identifies the line type and the thickness from the color definition data based on the Color Id of the pen ID control data, and displays the text (character string object) that is rotated with the angle information.

When a operation command candidate is selected, steps S83 through S101 are executed. Steps S83-S85 are executed when a selected object is present.

S83: When an operation command candidate for the selected object is selected (when the selected object exists), the handwritten input display control unit 23 transmits the deletion of the selected object display data to the display unit 22 to erase the display. This is to delete the original selected object.

S84: Next, the handwritten input display control unit 23 transmits the operation command execution for the selected object to the handwritten input storage unit 25. The handwritten input storage unit 25 transmits display data (display data after editing or modification) of a newly selected object to the handwritten input display control unit 23.

S85: Next, the handwritten input display control unit 23 transmits the selected object display data to the display unit 22 so that the selected object after execution of the operation command is displayed again.

S86: When "手書きサイン登録する" (to register a handwritten signature) of the operation command definition data 713 or "設定変更する" (to change the setting) of the operation command definition data 716 is specified, the handwritten input display control unit 23 adds the handwritten signature registration form 561 or the user defined data change form to the handwritten input storage unit 25.

S87: When the operation command candidate "ファイル保存" (file saving) or "印刷" (printing) is selected, the handwritten input display control unit 23 transmits a file transmission request to the file transmission and reception control unit 37.

S88: The file transmission and reception control unit 37 transmits an acquisition request for the handwritten input storage data to be transmitted to the handwritten input storage unit 25.

S89: The handwritten input storage unit 25 determines whether the transmission destination is a color supporting apparatus according to the MIB or the like.

In the case of the color supporting apparatus, the handwritten input storage unit 25 transmits the handwritten input storage data converted to color to the file transmission and reception control unit 37. In other words, the handwritten input storage unit 25 determines whether or not the data is the handwritten input originated data based on the ColorId of the handwritten input storage data, acquires the color information associated with the ColorId from the color definition data, and converts the handwritten input originated data to the color information. Because the color information is stored in the data that is not the handwritten input originated data, the handwritten input storage unit 25 transmits the stored color information. It is not limited to the ColorID that is used for the determination of the handwritten input originated data (handwritten data drawn by the display apparatus 2) as long as it is possible for the handwritten input storage unit 25 to determine whether the data is the handwritten input originated data. Further, information, which indicates whether or not the handwritten input originated data, may be a value indicating a device indicating whether or not the handwritten data is drawn by the display apparatus 2.

In the case where the transmission destination is a black-and-white supporting apparatus, the handwritten input storage unit 25 may simply transmit a sequence of coordinate points or text by ignoring the color information associated with the ColorId of the handwritten input storage data. Further, the handwritten input storage unit 25 may acquire the color information associated with the Color Id from the color definition data and convert the handwritten input originated data to the color information. It should be noted that the handwritten input storage unit 25 may acquire the color information associated with the ColorId from the color definition data and convert it to a black-and-white highlighting display (line type and thickness) to be transmitted. Because the color information is stored in the data that is not the handwritten input originated data, the handwritten input storage unit 25 transmits the stored color information.

When the transmission destination is a black-and-white highlighting supporting apparatus, the handwritten input storage unit 25 transmits only the handwritten input storage data or the handwritten input storage data and the color definition data to the file transmission and reception control unit 37. When the handwritten input storage unit 25 transmits only the handwritten input storage data, the line type and the thickness are determined according to the color definition data retained by the black-and-white highlighting supporting apparatus of the transmission destination. When the handwritten input storage unit 25 transmits both the handwritten input storage data and the color definition data, the line type and the thickness are determined according to the color definition data retained by the black-and-white highlighting supporting apparatus of the transmission source. It should be noted that the transmission source of the black-and-white highlighting supporting apparatus may convert it to the black-and-white highlighting display, and the handwritten input storage unit 25 may transmit the converted data.

Further, when the file transmission and reception control unit 37 writes to a file, for example, a PDF file or the like, the color information associated with the ColorID is acquired from the color definition data, and the handwritten input originated data is set to the PDF file according to the format of the PDF file. The same applies to the font, font size, etc. The file transmission and reception control unit 37 further stores the whole or a part of the handwritten input storage data (for example, ColorId, FontName, or the like) in the meta-data of the PDF file. Because the reader of the PDF file ignores the meta-data, there is no effect on the display, and if the display apparatus 2 reads the PDF file, it is possible to regenerate the handwritten input storage data from the meta-data. In the case of data that is not the handwritten input originated data, the file transmission and reception control unit 37 sets the color information, font, and character size stored in the handwritten input storage data to the PDF file according to the format of the PDF file.

S90: The file transmission and reception control unit 37 transmits the handwritten input data received from the handwritten input storage unit to a destination or writes it to a file.

S91: When the operation command candidate of "ファイル読み込み" (File reading) is selected, the handwritten input display control unit 23 transmits an acquisition request for the file list information to the file transmission and reception control unit 37.

S92: The file transmission and reception control unit 37 receives the file list information from a storage medium such as a USB memory, a network storage, a web server, or an external apparatus.

S93: The file transmission and reception control unit 37 transmits the file list information to the handwritten input display control unit 23.

S94: The handwritten input display control unit 23 transmits the file list display data to the display unit 22. Accordingly, the display unit 22 displays a file list on a display as shown in FIG. 12.

S95: When the user selects a file and the handwritten input unit 21 receives the selection, the handwritten input unit 21 transmits the file selection to the handwritten input display control unit 23.

S96: The handwritten input display control unit 23 transmits a file reception request for the selected file to the file transmission and reception control unit 37.

S97: The file transmission and reception control unit 37 acquires a file from an external apparatus.

S98: The file transmission and reception control unit 37 stores the file in the handwritten input storage unit 25.

S99: The handwritten input storage unit 25 analyzes the file received from the file transmission and reception control unit 37 and converts the handwritten input originated data into the handwritten input storage data (black-and-white highlighting/color conversion enabled data). In other words, the handwritten input storage unit 25 determines the presence or absence of meta-data. When the meta-data is present, the handwritten input storage unit 25 determines whether or not it is possible to convert the meta-data to the handwritten input storage data (whether or not there is a ColorId or the like) and stores the meta-data as the handwritten input storage data. Further, the handwritten input storage unit 25 reads the ColorId with respect to the handwritten input originated data, and converts the data into a black-and-white highlighting display corresponding to the ColorId by referring to the color definition data. The handwritten input storage unit 25 transmits the display data of the handwriting object to the handwritten input display control unit 23. In the case of data that is not handwritten input originated data, the handwritten input storage unit 25 reads the color information, font, and character size according to the file format and stores the data as the handwritten input storage data.

S100: The handwritten input display control unit 23 displays the display data of the handwritten input data on the display unit 22. According to the above, the display unit 22 displays the handwritten input originated data as black-and-white highlighted handwriting data, and displays the data that is not the handwritten input originated data in black and white using the conventional brightness conversion.

It should be noted that, when the operation command 512 for signing-in is executed, the handwritten input display control unit 23 acquires the pen ID received by the display apparatus 2 when the operation command 512 is executed. The handwritten input display control unit 23 identifies the user defined data including the SignatureId acquired in step S61 and acquires the AccountId from the user defined data. Further, the handwritten input display control unit 23 registers the AccountId in the pen ID control data by associating the AccountID with the pen ID. As a result, the pen 2500 and the user are associated with each other, and the display apparatus 2 can perform processing using the user defined data.

When a user performs handwriting or reads a file after signing in, the handwritten input display control unit 23 acquires the AccountId associated with the pen ID received by the display apparatus 2 from the pen ID control data at the time of execution of the operation command. The handwritten input display control unit 23 identifies the user defined data according to the AccountId and sets the color defined data or the like to "%~%" in the operation command to execute the operation command.

S101: When the operation command related to input and output is selected, the handwritten input display control unit 23 executes the operation command character string (command) of the operation command definition data corresponding to the operation command selected by the user.

S102: When the user enters the angle information manually, the handwritten input display control unit 23 stores the received angle information in the pen ID control data storage unit 36 by associating the angle information with the pen ID received from the pen 2500 when the rotation operation button 511 is pressed.

S103: The handwritten input display control unit 23 transmits the start of the handwritten object to the handwritten input storage unit 25 for the next handwritten object. The handwritten input storage unit 25 allocates a handwritten object area. Thereafter, the process of steps S2 to S103 is repeated.

Summary

As described above, a display apparatus 2 according to an embodiment of the present invention associates handwritten input originated data with an indication, and is capable of detecting that the data is the handwritten input originated data. According to the above, even in the case where the display apparatus 2 acquires a file from an external apparatus, when displaying the handwritten input originated data, it is possible to perform black-and-white highlighting based on the color information associated with the handwritten data. Further, in the case where the handwritten input originated data is transmitted to an external apparatus, it is possible to display the data without determining whether the data is handwritten input originated data.

Embodiment 2

In an embodiment of the present invention, a display apparatus 2 for converting handwritten data into English will be described. It should be noted that the configuration of the display apparatus 2 is the same as that of the first embodiment except that the conversion dictionary or the operation command definition data corresponds to the English language. Therefore, the difference from the first embodiment when the handwritten data is converted into English (hereinafter, referred to as the English conversion) will be described.

FIG. 38 is a drawing illustrating an overview of a display method of handwritten input originated data by a display apparatus 2 according to an embodiment of the present invention in case of English conversion. It should be noted that, in the description of FIG. 38, the difference from FIG. 2 will be mainly explained.

(1) First, it is possible for a user to select, by using a button, which color is used for entering handwritten data. In FIG. 2, the user can select colors of Bk, R, B, G, M, and C.

(2) The display apparatus 2 displays handwritten data in a manner corresponding to the color when the user handwrites, for example "hand-written". The manner corresponding to the color refers to displaying using different line types depending on the color. By displaying with the line type corresponding to the color in this way, it is possible to perform black-and-white highlighting display. The display apparatus 2 can convert handwritten data to text (character code). The handwritten data items 4 and 5 of FIG. 2 are converted to text, and the handwritten data 6 is unconverted handwritten data.

(3) The display apparatus according to an embodiment of the present invention has, for each handwritten data item, indication of whether it is handwritten input originated data or not and color information. The handwritten data 4 is handwritten input originated data and the color information is Bk. The handwritten data 5 is handwritten input originated data and the color information is R. The handwritten data 6 is handwritten input originated data and the color information is B. Text (character code) converted from handwritten data, such as handwritten data 4 or handwritten data 5, also retains indication of whether or not it is handwritten input originated data. Therefore, it is possible for the display apparatus 2 to display with a line type corresponding to the specified color when displaying the handwritten input originated data.

(4) When the display apparatus 2 converts handwritten data into a PDF file, etc., the display apparatus 2 sets the color information of handwritten data or text data according to the PDF format, and attaches indication of handwritten input originated data and the color information as meta data. When the display apparatus 2 reads this PDF file from a storage medium (USB memory, etc.), it is possible to display the handwritten input originated data with the line type corresponding to the color information based on the meta data.

As described above, the display apparatus 2 according to an embodiment of the present invention can perform black-and-white highlighting display based on the color information associated with the handwritten data when displaying the handwritten input originated data even if the user handwrites English.

It should be noted that FIG. 39 is a drawing illustrating an overview of a display method of handwritten input originated data by a display apparatus 2 according to an embodiment of the present invention in case of Chinese conversion. "手写的" means "handwriting". In this way, Chinese can be converted in the same way. Further, the display apparatus 2 according to an embodiment of the present invention is independent from the language, and can correspond to other languages in the same manner.

<Example of Operation Command Definition Data>

FIGS. 40A-40B are examples of operation command definition data when there is no selected object. The description of FIGS. 40A-40B mainly explains the difference from FIGS. 11A and 11B. The contents of each operation command are the same as in FIGS. 11A and 11B, but the English expressions are associated with the Name and string. Accordingly, users can handwrite operation commands in English and select operation commands in English.

FIG. 41 is an example of operation command definition data when there is a selected object. The description of FIG. 41 mainly explains the difference from FIG. 13. The contents of each operation command are the same as in FIG. 13, but the English expression is associated with the Name. Accordingly, users can select operation commands in English.

FIG. 42 is an example of user defined data. The description of FIG. 42 mainly explains the difference from FIG. 14. The contents of user defined data are the same as in FIG. 14, but AccountUsername is "Bob". In addition, English expressions are associated with Names. Therefore, the user can select the user defined data in English.

It should be noted that the handwritten signature data retained by the handwritten signature data storage unit 39 may be the same as that of FIG. 15, and the handwritten input storage data may be the same as that of FIG. 16. The pen ID control data may be the same as that of FIGS. 17A and 17B, and the color definition data may be the same as that of FIG. 18.

<Example of Dictionary Data>

Dictionary data in the case of English conversion will be described with reference to FIGS. 43 to 45. The description of FIGS. 43-45 mainly illustrates the differences from FIGS. 8-10. FIG. 43 is an example of dictionary data of the handwriting recognition dictionary unit 27. The dictionary data of the handwriting recognition dictionary unit 27 of FIG. 43 indicates that the handwritten "a (in a state of the stroke data)" is converted to "a" with a probability of 0.90 and converted to "o" with a probability of 0.10.

FIG. 44 is an example of dictionary data of the character string conversion dictionary unit 29. In the dictionary data of the character string conversion dictionary unit 29 of FIG. 44, the character string "a" is converted to "ab" with a probability of 0.55, and the character string "a" is converted to "AI" with a probability of 0.45. The same applies to other character strings of "before conversion".

FIG. 45 is an example of dictionary data of the predictive conversion dictionary unit 31. In the dictionary data of the predictive conversion dictionary unit 31 of FIG. 45, the character string "agenda" is converted to "agenda list" with a probability of 0.55 and to "agenda template" with a probability of 0.30.

It should be noted that the dictionary data is language independent, and any character string may be registered as "before conversion" and "after conversion".

<Data Highlighted in Black and White and Data Displayed by a Color Display Method>

FIGS. 46A-46B illustrate data highlighted in black and white and data displayed in a color display method using the color definition data of FIG. 18. The description of FIGS. 46A-46B mainly explains the difference from FIGS. 19A and 19B.

The symbol C21 indicates the text of "Bk", "R", "B", "G", "magenta", and "cyan", which are handwritten input originated data items. The symbol C22 indicates strokes (handwritings) of "Bk", "R", "B", "G", "magenta", and "cyan". The symbol C23 indicates spring-like strokes (handwritings). The symbol C24 indicates a donut-like color chart (image). The symbol C25 indicates RGBCMY (text that is not handwritten input originated data) inside the color chart. Under the symbol C23, there are texts of the handwritten input originated data items, "Transparent" in black.

Accordingly, it is similar to FIGS. 19A and 19B, except that the Japanese words "黒", "赤", "青", "緑", "マゼンタ", and "シアン" are changed to "Bk", "R", "B", "G", "magenta", and "cyan". The same applies to FIG. 46B.

As can be seen from the comparison between FIG. 46A and FIG. 46B, the red of text "R" inside the color chart of the symbol C30 of FIG. 46B is not handwritten input originated data. Therefore, the text "R" is displayed in gray scale in FIG. 46A. On the other hand, because the text "R" of the symbol C26 is handwritten input originated data, the text is highlighted in black and white in FIG. 46A.

Further, because magenta and cyan are transmissive colors, "Transparent" is visible in FIG. 46B. Also illustrated in FIG. 46A, magenta and cyan are transparent because of the use of a transparent pattern of white. As described above, the black-and-white highlighting supporting apparatus can indicate the color used for emphasis using black-and-white highlighting display, while the color device can convert the data into color and displays it.

<Display Example of Selectable Candidates>

FIG. 47 is an example of an operation guide 500 and selectable candidates displayed by the operation guide 500, in case of English conversion. The description of FIG. 47 mainly explains the difference from FIG. 22. In FIG. 47, the user handwrites "a" as a handwritten object 504. Based on the "a", operation command candidates 510, a handwriting recognition character string candidate 506, converted character string candidates 507, and character string/predictive conversion candidates 508 are displayed. Accordingly, it may be similar to FIG. 22 except that the Japanese language of FIG. 22 is changed to English.

The operation command candidates 510 are, for example, operation command candidates including "agenda" in the string in the operation command definition data of FIG. 40A (operation command definition data items 701 and 702).

As described above, the user can also display the operation guide 500 in the case of English conversion.

<Example of Specifying Selected Object>

FIGS. 48A-48B are drawings illustrating an example of specifying a selection object in the case of English conversion. It should be noted that, in the description of FIGS. 48A-48B, the difference from FIG. 23 will be mainly explained.

FIG. 48A shows an example in which two determined objects 13a2 and 13b2 in horizontal writing are specified by a user using an extending-over line (handwritten object 11a2). I In this example, a length H1, of the shorter side of the rectangular area 12a2, and a length W1, of the longer side of the rectangular area 12a2, satisfy the condition of the extending-over line determination condition 406, and an overlap rate with the determined objects 13a2 and 13b2 satisfies the condition of the extending-over line determination condition 406. Therefore, both determined objects 13a2 and 13b2, "agenda" and "ag", are specified as selected objects.

FIG. 48B is an example in which the user specifies a determined object 13c2 written horizontally using an enclosing line (handwritten object 11b2). In this example, only the determined object 13c2, "agenda", in which the overlap rate of the determined object 13c2 and the handwritten object rectangular area 12c2 satisfies the condition of the enclosing line determination condition 407, is specified as a selected object.

As described above, in the case of English conversion, the user can also select the selected object.

<Display Example of Operation Command Candidate>

FIGS. 49A-49B illustrate a display example of operation command candidates based on the operation command definition data when the selected object is present, illustrated in FIGS. 48A-48B. The description of FIG. 49A-49B mainly explains the difference from FIGS. 24A and 24B.

FIG. 49A is an operation command candidate related to editing, and FIG. 49B is an operation command candidate related to modification. Further, FIG. 49A shows an example in which a selected object is specified by the handwritten object 11a2 of FIG. 48A. As illustrated in FIGS. 49A and 49B, a main menu 550 includes operation command candidates that are displayed following the initial letter of line "》" 511.

In FIG. 49A, a sub-menu 560 of FIG. 49A is displayed by pressing ">" 512a of the first line. When the user presses any of the operation command names with a pen, the handwritten input display control unit 23 executes the Command of the operation command definition data associated with the operation command name for the selected object. In other words, when "Delete" 521b is selected, the handwritten input display control unit 23 executes "Delete." When "Move" 522b is selected, the handwritten input display control unit 23 executes "Move." When "Rotate" 523b is selected, the handwritten input display control unit 23 executes "Rotate." When "Select" 524b is selected, the handwritten input display control unit 23 executes "Select." When the user presses "Delete" 511b with a pen, the handwritten input display control unit 23 erases the determined objects 13a2 and 13b2, "agenda" and "ag". When the user presses "Move" 522b with a pen, the handwritten input display control unit 23 receives the move of the determined objects 13a2 and 13b2, "agenda" and "ag." When the user presses "Rotate" 523b with a pen, the handwritten input display control unit 23 rotates the determined objects 13a2 and 13b2, "agenda" and "ag" with a certain angle. When the user presses "Select" 524b with a pen, the handwritten input display control unit 23 receives the select of the determined objects 13a2 and 13b2, "agenda" and "ag." Character string candidates other than the operation command candidates "—" 541b, "-" 542b, "~" 543b, "→" 544b, and "⇒" 545b are the recognition results of the extending-over line (handwritten object 11a2). If the user intends to enter the character string instead of the operation command, a character string candidate can be selected.

In FIG. 49B, a sub-menu of FIG. 49B is displayed by pressing the "〉" 512b on the second line. In a display example of FIG. 49B, the main menu 550 and the sub menu 560 are shown at the same time as in FIG. 49A. When "Thick"531b is selected, the handwritten input display control unit 23 executes "Thick" on the selected object based on the operation command definition data of FIG. 41. When "Thin"532b is selected, the handwritten input display control unit 23 executes "Thin" on the selected object. When "Large"533b is selected, the handwritten input display control unit 23 executes "Large" on the selected object. When "small"534b is selected, the handwritten input display control unit 23 executes "Small" on the selected object. When "Underline"535b is selected, the handwritten input display control unit 23 executes "Underline" on the selected object.

When the user presses "Thick" 531b with a pen, the handwritten input display control unit 23 thickens the lines constituting the determined objects 13a2 and 13b2, "agenda" and "ag." When the user presses "Thin" 532b with a pen, the handwritten input display control unit 23 narrows the lines constituting "agenda" and "ag." When the user presses "Large" 533b with a pen, the handwritten input display control unit 23 increases the object size. When the user presses "Small" 534*b* with a pen, the handwritten input display control unit 23 reduces the object size. When the user presses "Underline" 535*b* with a pen, the handwritten input display control unit 23 can add underlines.

As described above, the user can have the operation commands displayed when there are selected objects, even in the case of English conversion.

<Example of Input of Angle Information>

Next, FIGS. 50A-50C are examples of a drawing explaining a method for inputting angle information of 90 degrees. In the case of English conversion, the method of entering the angle information is the same as that of Japanese conversion. The description of FIGS. 50A-50C mainly explain the difference from FIGS. 26A-26C.

FIG. 50A shows a state in which the operation guide 500 is displayed because a user present in the three o'clock direction of the display apparatus 2 handwrites "a" in a state in which the angle information of the pen ID control data is 0 degrees (initial value). Because the display apparatus 2 recognizes a character "a" that is handwritten from the 3 o'clock direction using angle information remaining at 0 degrees, a selectable candidate 530 that is different from the expectation is displayed.

When entering the angle information, the user handwrites a straight line from top to bottom as seen by the user in the operation guide 500. FIG. 50B illustrates an example of such a straight line 521*b*. A counterclockwise angle α of the strait line 521*b*, which is formed with reference to the 6 o'clock direction corresponding to the angle information of 0 degrees, is the angle information.

FIG. 50C illustrates the operation guide 500 immediately after the operation of FIG. 50B. Because 90 degrees are set as the angle information (Angle) in the pen ID control data, the handwritten object (stroke data) is internally rotated in a clockwise direction by 90 degrees, handwriting recognition is performed for the rotated handwritten object, and the operation guide 500 is rotated in a counterclockwise direction by 90 degrees to be displayed. It should be noted that the angle information may be entered manually by the user from a menu.

As described above, the user can enter angular information in the case of English conversion.

<Example of Registering Handwritten Signature Data>

Next, FIGS. 51A-51C are drawings illustrating a method of registering handwritten signature data. The description of FIGS. 51A-51C mainly explain the difference from FIG. 27. First, FIG. 51A is an example of a selectable candidate 530 displayed when the user handwrites "Sign". There are two operation commands 513*b* and 514*b* based on the operation command definition data 713 and 715, "Register handwritten signature" and "Hand sign out," which are partially matched with the character string "Sign," and character string candidates of "Sign," "Signature session," and "Signed."

When the user presses "Register handwritten signature" with the pen 2500, the handwritten signature registration form 561 of FIG. 51B is added to the handwritten input storage unit 25 and is displayed on the operation screen 101. For example, the operation guide 500 of FIG. 51A is erased and the handwritten signature registration form 561 is displayed in the same location as the operation guide 500.

The user enters: a name text in the name entry field 561*a*; a first handwritten signature, a second handwritten signature, a third handwritten signature in the signature fields 561*b*-561*d*; and a check mark or a cancellation mark in the registration confirmation field 561*e*.

When the user enters handwritings in the handwritten signature registration form 561 according to the instructions, the handwritten signature registration form 561 should look as illustrated in FIG. 51C.

As described above, the handwritten input display control unit 23 can receive the handwritten input without distinguishing between the handwritten input to the form and the handwritten input to other than the form. Users can register handwritten signature data using English.

<Example of Sign-In by Handwriting>

FIG. 52 is an example of an operation guide 500 that is displayed when the user handwrites "Bob", which is the handwritten signature data registered by the user, in the English conversion. The description of FIG. 52 mainly explains the difference from FIG. 28.

Because "Bob" is registered in the handwritten signature data storage unit 39 as handwritten signature data, the "Bob" matches the handwritten signature data. Therefore, the "Hand Sign in" operation command 512 is displayed.

Further, because the handwritten signature data is matched, SignatureId representing "Bob" is identified, and user defined data including AccountId that is associated with the SignatureId is identified.

When the user selects the operation command 512 "Hand Sign in", the pen ID of the Pen 2500 is associated with the AccountID of "Bob" and added to the pen ID control data so that the user defined data of "Bob" is used when the operation command is used.

As described above, the user can sign in using English.

<Example of Change Operation of User Defined Data>

FIGS. 53A-53B are drawings illustrating a method of changing user defined data in case of English conversion. The description of FIGS. 53A-53B mainly explains the difference from FIGS. 29A-29B. FIG. 53A is an example of an operation guide 500 displayed when a user handwrites "set". The operation command definition data 716 defines "set" in String, and the operation command "Change settings" is displayed.

When the user selects the "Change settings" with the pen 2500 that has been used for the sign-in by handwriting, the AccountID of the user, which is associated with the pen ID of the pen 2500 by the pen ID control data, is identified. According to the above, the user defined data of the user who has signed in is identified, and the user defined data change form 562 of FIG. 53B is added to the handwritten input storage unit 25 to be displayed on the operation screen 101. Each item of the user defined data change form 562 is similar to that in FIG. 29B.

As described above, the user can change the user definition in the case of English conversion in the same manner as Japanese conversion.

It should be noted that the operation procedure may be the same as that shown in FIG. 30 to FIG. 37 of the first embodiment.

Embodiment 3

In the first embodiment, the display apparatus 2 is described as having a large touch panel, but the display apparatus is not limited to those having a touch panel. In an embodiment of the present invention, a projector-type display apparatus will be described.

<Another Configuration Example of Display Apparatus>>

FIG. 54 is a drawing illustrating another configuration example of a display apparatus. In FIG. 54, a projector 411 is located above a typical white board 413. The projector 411 corresponds to a display apparatus. The typical white board 413 is not a flat panel display integrated with a touch panel, but rather a white board that a user writes directly with a marker. It should be noted that the white board may be a blackboard, and only a flat surface large enough to project images.

The projector 411 has an optical system with an ultra-short focal point so that images of less distortion can be projected from about 10 cm onto the white board 413. The images may be transmitted from a wirelessly or wiredly connected PC 400-1 or may be stored by the projector 411.

The user handwrites on a white board 413 using a dedicated electronic pen 2501. The electronic pen 2501 has a light emitting unit at a tip portion, for example, where the light emitting unit is turned on when the user presses against the white board 413 for handwriting. The light wavelength is near-infrared or infrared, so it is invisible to the user. The projector 411 includes a camera that captures the light emitting unit and analyzes the captured image to determine the direction of the electronic pen 2501. Further, the electronic pen 2501 emits a sound wave together with a light emission, and the projector 411 calculates a distance according to the time of arrival of the sound wave. Projector 411 can determine the position of the electronic pen 2501 from the direction and the distance. A stroke is drawn (projected) at the position of the electronic pen 2501.

Projector 411 projects menu 430, so when a user presses a button with the electronic pen 2501, the projector 411 identifies the pressed button from the position of the electronic pen 2501 and the ON signal of a switch. For example, when a save button 431 is pressed, the stroke handwritten by the user (a set of coordinates) is stored by the projector 411. The projector 411 stores handwritten information in a predetermined server 412 or a USB memory 2600 or the like. The handwritten information is stored for each page. The coordinates are saved instead of image data, allowing the user to perform re-editing. It should be noted that the menu 430 may not be displayed because operation commands can be invoked by handwriting.

<<Another Configuration Example 2 of Display Apparatus>>

FIG. 55 is a drawing illustrating yet another configuration example of a display apparatus 2. In an example of FIG. 55, the display apparatus 2 includes a terminal apparatus 600, an image projection apparatus 700A, and a pen operation detection apparatus 810.

Terminal apparatus 600 is connected with wire to the image projection apparatus 700A and the pen operation detection apparatus 810. The image projection apparatus 700A causes the image data input by the terminal apparatus 600 to be projected onto a screen 800.

The pen operation detection apparatus 810 is in communication with an electronic pen 820 and detects operations of the electronic pen 820 in the vicinity of the screen 800. Specifically, the electronic pen 820 detects coordinate information indicating a point indicated by the electronic pen 820 on the screen 800, and transmits the detected coordinate information to the terminal apparatus 600.

The terminal apparatus 600 generates image data of a stroke image input by the electronic pen 820 based on the coordinate information received from the pen operation detection apparatus 810. The terminal apparatus 600 causes the image projection apparatus 700A to draw a stroke image onto the screen 800.

The terminal apparatus 600 generates superimposed image data representing a superimposed image composed of a background image projected by the image projection apparatus 700A and the stroke image input by the electronic pen 820.

<<Another Configuration Example 3 of Display Apparatus>>

FIG. 56 is a drawing illustrating a configuration example of a display apparatus. In an example of FIG. 56, the display apparatus 2 includes a terminal apparatus 600, a display 800A, and a pen operation detection apparatus 810.

The pen operation detection apparatus 810 is positioned in the vicinity of the display 800A. The pen operation detection apparatus 810 detects coordinate information indicating a point indicated by the electronic pen 820A on the display 800A and transmits the detected coordinate information to the terminal apparatus 600. It should be noted that, in an example of FIG. 56, the electronic pen 820A may be charged by the terminal apparatus 600 via a USB connector.

The terminal apparatus 600 generates image data of a stroke image input by the electronic pen 820A based on the coordinate information received from the pen operation detection apparatus 810. Terminal apparatus 600 displays the stroke image on display 800A.

<<Another Configuration Example 4 of Display Apparatus>>

FIG. 57 is a drawing illustrating a configuration example of a display apparatus. In an example of FIG. 57, the display apparatus 2 includes a terminal apparatus 600 and an image projection apparatus 700A.

The terminal apparatus 600 performs wireless communication (such as Bluetooth) with the electronic pen 820B and receives coordinate information of a point indicated by the electronic pen 820B on the screen 800. The terminal apparatus 600 generates image data of a stroke image input by the electronic pen 820B based on the received coordinate information. The terminal apparatus 600 causes the image projection apparatus 700A to project the stroke image.

Further, the terminal apparatus 600 generates superimposed image data representing a superimposed image composed of a background image projected by the image projection apparatus 700A and the stroke image input by the electronic pen 820.

As described above, each of the above-described embodiments can be applied in various system configurations.

Other Application Examples

As described above, while preferred embodiments of the present invention have been described with reference to examples, various modifications and substitutions may be made thereto without departing from the spirit and scope of the invention.

For example, display methods of the embodiments are suitably applicable to an information processing apparatus having a touch panel. Apparatuses having the same function as the display apparatuses are also referred to as electronic blackboards, electronic whiteboards, electronic information boards, and interactive boards. The information processing apparatus having a touch panel mounted therein may be, for example, an output apparatus such as a PJ (Projector), a digital signage, an HUD (Head Up Display) apparatus, an industrial machine, an imaging apparatus, a sound collector, a medical apparatus, a network home appliance, a personal computer, a cellular phone, a smartphone, a tablet terminal, a game machine, a PDA (Personal Digital Assistant), a digital camera, a wearable PC, or a desktop PC.

Further, according to an embodiment of the present invention, a part of the processing performed by the display apparatus 2 may be performed by a server. For example, the display apparatus transmits stroke information to the server and acquires and displays information to be displayed with the operation guide 500.

Further, coordinates of the pen are detected by the display apparatus 2 by a method of detecting the coordinates of the pen tip by the touch panel in an embodiment of the present invention, but the coordinates of the pen tip may be detected by ultrasonic waves. The pen emits ultrasonic waves together with the light emission, and the display apparatus 2 calculates the distance according to the time of arrival of the ultrasonic waves. The display apparatus 2 can determine the position of the pen according to the direction and the distance. The display apparatus 2 draws (projects) the trajectory of the pen as a stroke.

Further, in an embodiment of the present invention, when there is a selected object, operation command candidates related to editing and modification are displayed, and when there is no selected object, operation command candidates related to input and output are displayed. However, the display apparatus 2 may simultaneously display the operation command candidates related to editing and modification and the operation command candidates related to input and output.

Further, the display apparatus 2 may not have the user's handwritten signature data. It may be retained by an information processing apparatus on the cloud or within the company.

Further, a configuration example such as FIGS. 6A and 6B is divided according to a main function in order to facilitate understanding of processing by the display apparatus 2. The present invention is not limited by the dividing way of the processing units or the names of the processing units. The processing of the display apparatus 2 can be divided into more processing units depending on the processing contents. Further, one processing unit may be further divided to include more processes.

Further, the functions of the embodiments described above may also be implemented by one or more processing circuits. Here, "processing circuitry" includes processors programmed to perform each function by software, such as processors implemented in electronic circuits, devices designed to perform each function as described above, such as ASICs (Application Specific Integrated Circuit), DSPs (digital signal processors), FPGAs (field programmable gate arrays), and conventional circuit modules.

Numerous additional modifications and variations are possible in light of the above teachings. It is therefore to be understood that, within the scope of the appended claims, the disclosure of this patent specification may be practiced otherwise than as specifically described herein. As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

The present application is based on and claims the benefit of priority of Japanese Priority Application No. 2019-188188 filed on Oct. 11, 2019, and Japanese Priority Application No. 2020-168992 filed on Oct. 6, 2020, the entire contents of which are hereby incorporated by reference.

The invention claimed is:

1. An apparatus, comprising:

a display;

processing circuitry configured to receive, from a user, a selection of a color among a plurality of colors to display handwriting data in black and white in a manner corresponding to color information indicating the selected color, the manner being a visually different manner for each of the plurality of colors, receive handwriting input from the user, convert the handwriting input into the handwriting data, associate the converted handwriting data with the color information, the color information indicating the selected color, display, on the display, the handwriting data in black and white in the manner corresponding to the color information associated with the handwriting data, and transmit data based on the handwriting data and the color information to an external apparatus.

2. The display apparatus according to claim 1, wherein:

the display includes electronic paper that displays an image in black and white.

3. The display apparatus according to claim 1, wherein the processing circuitry is further configured to:

convert the handwriting data into text data by applying handwriting recognition to the handwriting data based on a position of an input that is in contact with a touch panel; and wherein the text data is displayed by the display in the manner corresponding to the color information associated with the handwriting data.

4. The display apparatus according to claim 3, wherein the processing circuitry is further configured to:

receive a specification of a font, and cause the display to display the text data so that the color information is highlighted in black and white, and the font received is used when displaying the text data converted by the processing circuitry.

5. The display apparatus according to claim 3, wherein the processing circuitry is further configured to:

sign in the user to the display apparatus, wherein:

definition data includes identification information of the user associated with color information, and after the user has signed in to the apparatus, the processing circuitry causes the display to display the handwriting data or the text data that is converted from the handwriting data so that the color information, which is registered in the definition data, is highlighted in black and white.

6. The apparatus according to claim 3, wherein the processing circuitry is further configured to:

save, according to a file format to be saved, the handwriting data handwritten in the touch panel or the text data converted by the processing circuitry, along with color information received which is converted to color information.

7. The apparatus according to claim 3, wherein the processing circuitry is further configured to:

save, according to a file format to be saved, the handwriting data handwritten in the touch panel or the text data converted by the processing circuitry, along with color information received which is converted to color information, and the color information received is attached to meta-data of the file.

8. The display apparatus according to claim 3, further comprising:

a transmitter to transmit the handwriting data to an apparatus that outputs the data in which color information is highlighted in black and white.

9. The apparatus according to claim 3, further comprising:

a transmitter to transmit the handwriting data to an apparatus that supports color in a format which includes color information corresponding to the color selection.

10. The apparatus according to claim 3, further comprising:

a transmitter to transmit the handwriting data to a black-and-white supporting apparatus, and to convert color of the handwriting data to the color information that has been received by the circuitry configured to record.

11. The apparatus according to claim 6, wherein;

the display displays an indication of the handwriting data in such a way that the color information, which is included in meta-data attached to the file, is displayed by highlighting in black and white.

12. The apparatus according to claim 11, wherein:

the handwriting data is text data.

13. The apparatus according to claim 11, wherein:

the display displays, in a case where data included in a read file is not the handwriting data, the data in such a way that color information of the data is converted to gray scale information.

14. The apparatus according to claim 1, wherein the handwriting data includes handwritten input data originated that is either stroke data or text data converted from the stroke data using recognition.

15. The apparatus according to claim 1, wherein the handwriting data includes the handwriting input from the user or text data converted from the handwriting data.

16. The apparatus according to claim 1, wherein the visually different manner for each of the plurality of colors includes a different line type for each of the plurality of colors.

17. The apparatus according to claim 1, wherein the processing circuitry is configured to receive the selection of the color among the plurality of colors from the user by the user using a pen, and receive the handwriting input from the user by the user using the pen.

18. The apparatus according to claim 1, wherein the processing circuitry is further configured to:

receive, from the user, a selection of another color among the plurality of colors to display another handwriting data in black and white in another manner corresponding to another color information indicating the selected another color, the another manner being another visually different manner in black and white indicating each of the plurality of colors, receive another handwriting input from the user, convert the another handwriting input into the another handwriting data, associate the converted another handwriting data with another color information, the another color information indicating the selected another color, display, on the display, the another handwriting data in black and white in the another manner corresponding to the another color information associated with the another handwriting data, and transmit other data based on the another handwriting data and the another color information to the external apparatus.

19. The display apparatus according to claim 1, wherein the processing circuitry is further configured to display, on the display, the handwriting data in black and white in the manner corresponding to the color information associated with the handwriting data, the manner is a visually different manner in black and white indicating each of the plurality of colors by using black and white patterns, widths, and borders.

20. The apparatus according to claim 1, wherein the processing circuitry is further configured to:

in case that a selection of a predetermined command candidate is received, convert the handwriting data into color data by the associated color information, and transmit the converted color data to the external apparatus.

21. The apparatus according to claim 1, wherein the processing circuitry is configured to:

in case that the external apparatus is a color supporting apparatus, convert the handwriting data into color data by the associated color information, and transmit the converted color data to the color supporting apparatus, and in case that the external apparatus is a black and white supporting apparatus, not convert the handwriting data into color data by the associated color information, and transmit the handwriting data to the black and white supporting apparatus.

22. The apparatus according to claim 1, wherein the data is a PDF file, the PDF file is written from the handwritten data, in which the color information associated with the handwritten data is set.

23. An external apparatus configured to display:

the data transmitted from the apparatus according to claim 1, wherein the data is displayed in the selected color.

24. A display method performed by a display apparatus that includes a display to display data and processing circuitry, the method comprising:

receiving, by the processing circuitry and from a user, a selection of a color among a plurality of colors to display handwriting data in black and white in a manner corresponding to color information indicating the selected color, the manner being a visually different manner for each of the plurality of colors;

receiving, by the processing circuitry, handwriting input from the user;

converting, by the processing circuitry, the handwriting input into the handwriting data;

associating, by the processing circuitry, the converted handwriting data with the color information, the color information indicating the selected color;

displaying, on the display, the handwriting data in black and white in the manner corresponding to the color information associated with the handwriting data; and transmitting, by the processing circuitry, data based on the handwriting data and the color information to an external apparatus.

25. The display method according to claim 24, wherein the data is a PDF file, the PDF file is written from the handwritten data, in which the color information associated with the handwritten data is set.

26. A non-transitory recording medium storing a program that causes a display apparatus that displays data to perform a method comprising:

receiving, from a user, a selection of a color among a plurality of colors to display handwriting data in black and white in a manner corresponding to color information indicating the selected color, the manner being a visually different manner for each of the plurality of colors;

receiving handwriting input from the user;

converting the handwriting input into the handwriting data;

associating the converted handwriting data with color information, the color information indicating the selected color;

displaying, on a display, the handwriting data in black and white in the manner corresponding to the color information associated with the handwriting data; and transmitting data based on the handwriting data and the color information to an external apparatus.

27. The non-transitory recording medium according to claim 26, wherein the data is a PDF file, the PDF file is written from the handwritten data, in which the color information associated with the handwritten data is set.

* * * * *